(12) United States Patent
Gumennik et al.

(10) Patent No.: US 11,692,855 B2
(45) Date of Patent: Jul. 4, 2023

(54) VERY LARGE SCALE INTEGRATION FOR FIBERS (VLSI-FI)

(71) Applicant: THE TRUSTEES OF INDIANA UNIVERSITY, Indianapolis, IN (US)

(72) Inventors: Alexander Gumennik, Bloomington, IN (US); Mengxin Zheng, Bloomington, IN (US); Camila Faccini de Lima, Bloomington, IN (US); Veda Narayana Koraganji, Indianapolis, IN (US)

(73) Assignee: THE TRUSTEES OF INDIANA UNIVERSITY, Indianapolis, IN (US)

( * ) Notice: Subject to any disclaimer, the term of this patent is extended or adjusted under 35 U.S.C. 154(b) by 119 days.

(21) Appl. No.: 17/239,100

(22) Filed: Apr. 23, 2021

(65) Prior Publication Data
US 2021/0333131 A1    Oct. 28, 2021

Related U.S. Application Data

(60) Provisional application No. 63/014,207, filed on Apr. 23, 2020, provisional application No. 63/014,208, filed on Apr. 23, 2020.

(51) Int. Cl.
*G01D 5/353*    (2006.01)
*C03B 37/025*   (2006.01)
*G02F 1/01*     (2006.01)

(52) U.S. Cl.
CPC ....... *G01D 5/35354* (2013.01); *C03B 37/025* (2013.01); *G02F 1/0115* (2013.01)

(58) Field of Classification Search
CPC .............. G01D 5/35354; C03B 37/025; C03B 37/01282; C03B 37/01288; C03B 37/15; G02F 1/0115; B33Y 80/00
See application file for complete search history.

(56) References Cited

U.S. PATENT DOCUMENTS

| | | | |
|---|---|---|---|
| 10,338,000 B2 | 7/2019 | Gumennik et al. | |
| 2010/0316088 A1* | 12/2010 | Bayindir | C03C 25/54 374/100 |
| 2017/0036398 A1 | 2/2017 | Gumennik et al. | |

OTHER PUBLICATIONS

Zhong, et al., "Nanophotonic rare-earth quantum memory with optically controlled retrieval," 2017, Science, 357 pp. 1392-1395.
(Continued)

*Primary Examiner* — Tony Ko
(74) *Attorney, Agent, or Firm* — Barnes & Thornburg LLP

(57) ABSTRACT

In some examples, a microstructured fiber comprises a cladding material surrounding at least one core material, wherein the at least one core material comprises an array of discrete devices contacted in parallel. A method of producing a microstructured fiber may include 3D-printing a fiber preform, thermally drawing the fiber preform into a fiber that preserves the cross-sectional geometry of the fiber preform, and axially patterning the fiber into a microstructured fiber comprising an array of discrete devices contacted in parallel. In some embodiments, microstructured fibers may be integrated into a sensory textile that includes at least one of an electrooptic portion, a sonar portion, a magnetic gradiometer portion, and a piezogenerating portion. In some embodiments, microstructured fibers may be formed into an in-fiber integrated quantum device circuit or an in-fiber ion trap.

20 Claims, 29 Drawing Sheets

(56) References Cited

OTHER PUBLICATIONS

Wei, et al., "Optoelectronic Fibers via Selective Amplification of In-Fiber Capillary Instabilities," 2017, Advanced Materials, 29(1).
Gumennik, et al., "Confined in-fiber solidification and structural control of silicon and silicon-germanium microparticles," 2017, Proceedings of the National Academy of Sciences of the United States of America, 114(28) pp. 7240-7245.
Gumennik, et al., "Silicon-in-silica spheres via axial thermal gradient in-fibre capillary instabilities," 2013, Nature Communications, 4 pp. 2216.
Williams, et al., "Etch rates for micromachining processing—Part II," 2003, Journal of Microelectromechanical Systems, 12(6) pp. 761-778.
Colombe, et al.,"Single-mode optical fiber for high-power, low-loss UV transmission," 2014, Optics Express, 22(16) pp. 19783.
Faccini de Lima, et al., "Towards Digital Manufacturing of Smart Multimaterial Fibers," 2019, Nanoscale Research Letters, 14(209) pp. 1-16.
Zhu, et al., "Electrochemical sensors and biosensors based on nanomaterials and nanostructures," 2015, Analytical Chemistry, 87 pp. 230-249.
Maleki, et al., "Whispering gallery mode lithium niobate microresonators for photonics applications," 2003, Proceedings of SPIE, 5104.
Van der Elst, et al., "3D Printing in Fiber-Device Technology," 2021, Advanced Fiber Materials.
Monro et al., "Sensing with Suspended-Core Optical Fibers," 2010, Opt. Fiber Technology, 16(6):343-356).
Rapp BE, Kotz F, Keller N, Sachsenheimer K, Kirschner N, Nargang T, Richter C et al. "Next generation 3D printing of glass: The emergence of enabling materials," Conference Presentation. Published in Proceedings of SPIE 10544, Advanced Fabrication Technologies for Micro/Nano Optics and Photonics XI, 1054414. 2018.
Powers et al. "Propagation of a topological transition: the Rayleigh instability", 1998, Phys Fluids 10(5):1052-1057.
Chaussabel, et al., "Assessing the human immune system through blood transcriptomics," 2010, BMC Biology, 8 pp. 1-14.
Gumennik, A. and Sen, C., "Hierarchically vascularized organoids by fiber-embedding bioprinting," 2020, Wellcome Leap Solicitation for Human Organs, Physiology, and Engineering.
Lee, J., et al., "Conductive fiber-based ultrasensitive textile pressure sensor for wearable electronics," 2015, Advanced Materials, 27(15) pp. 2433-2439.
Song, et al., "Vascular Tissue Engineering: Progress, Challenges, and Clinical Promise," 2018, Cell Stem Cell, 22(3) pp. 340-354.
Farajikhah, et al., "Thermally drawn biodegradable fibers with tailored topography for biomedical applications," 2020, Journal of Biomedical Materials Research Part B Applied Biomaterials, 109(5) pp. 733-743.
Shadman, et al., "Microstructured Biodegradable Fibers for Advanced Control Delivery," 2020, Advanced Functional Materials, 30(13) pp. 1-9.
Vieira, et al., "Degradation and viscoelastic properties of PLA-PCL, PGA-PCL, PDO and PGA fibres," 2010, Materials Science Forum, 636-637 pp. 825-832.
Schaaf, et al., "Defining the role of the tumor vasculature in antitumor immunity and immunotherapy," 2018, Cell Death and Disease, 9(2).

\* cited by examiner

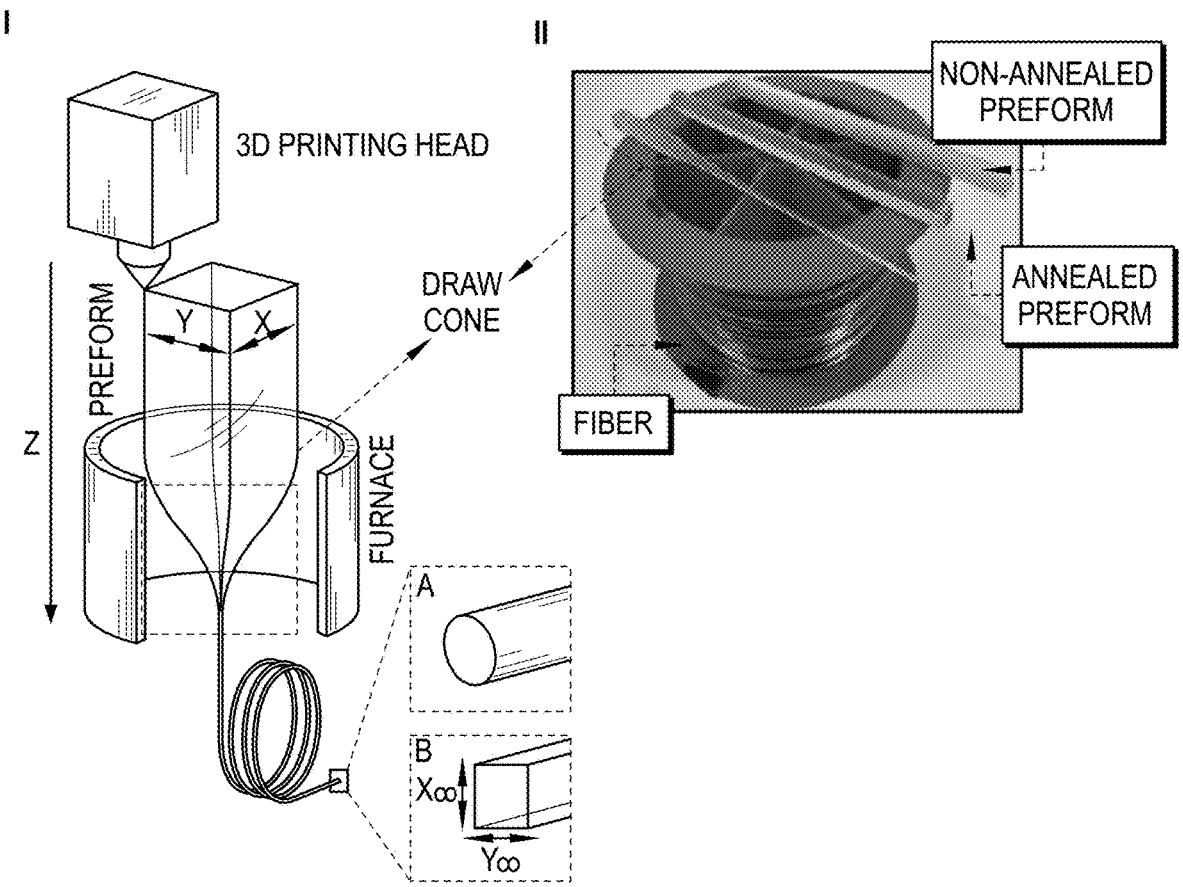
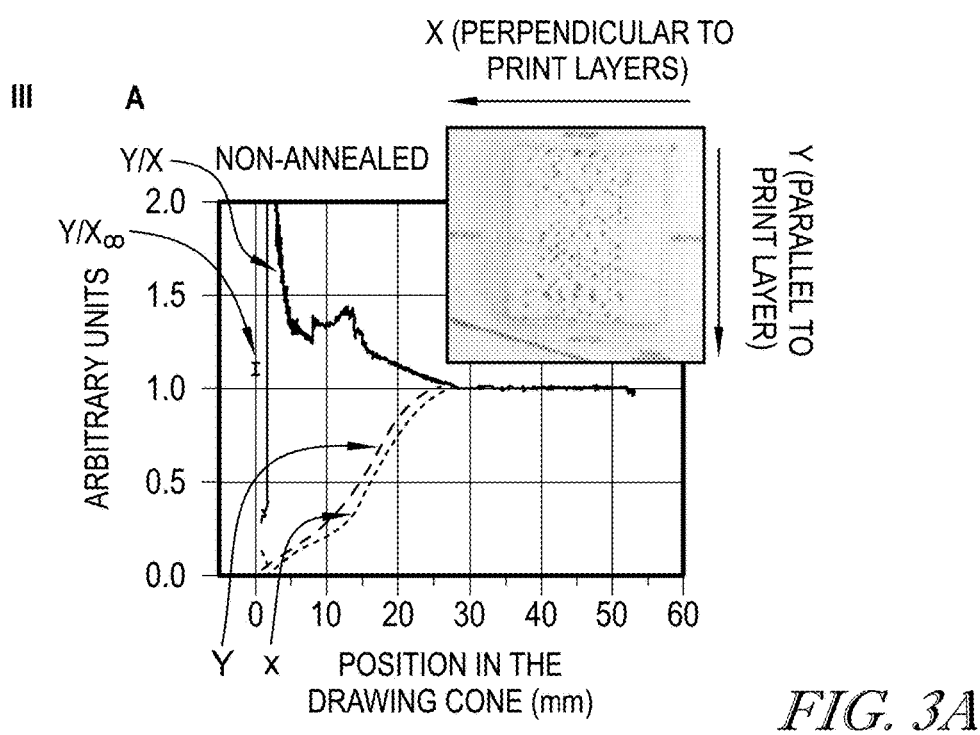
FIG. 3A

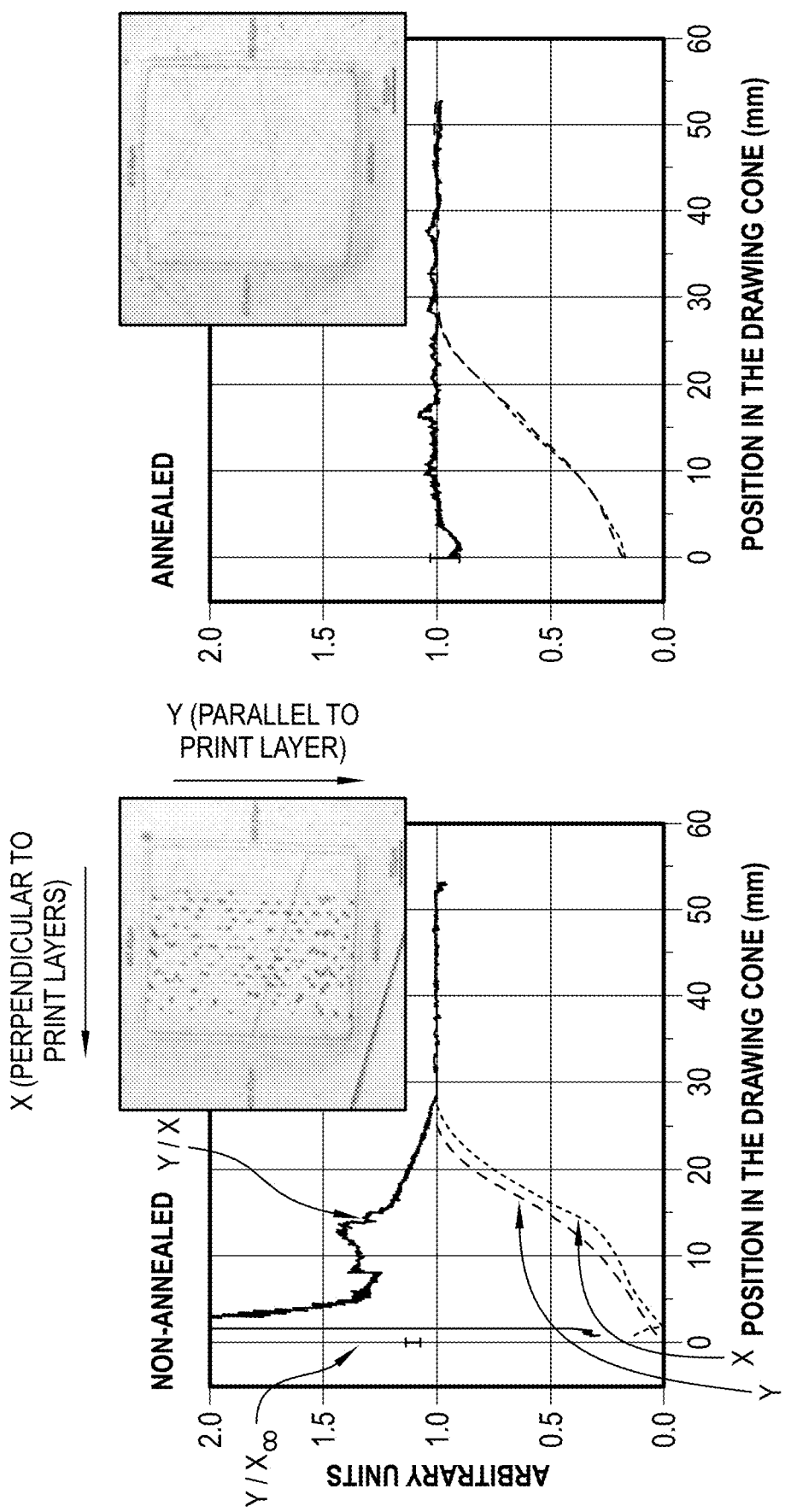
FIG. 3A (Contd.)

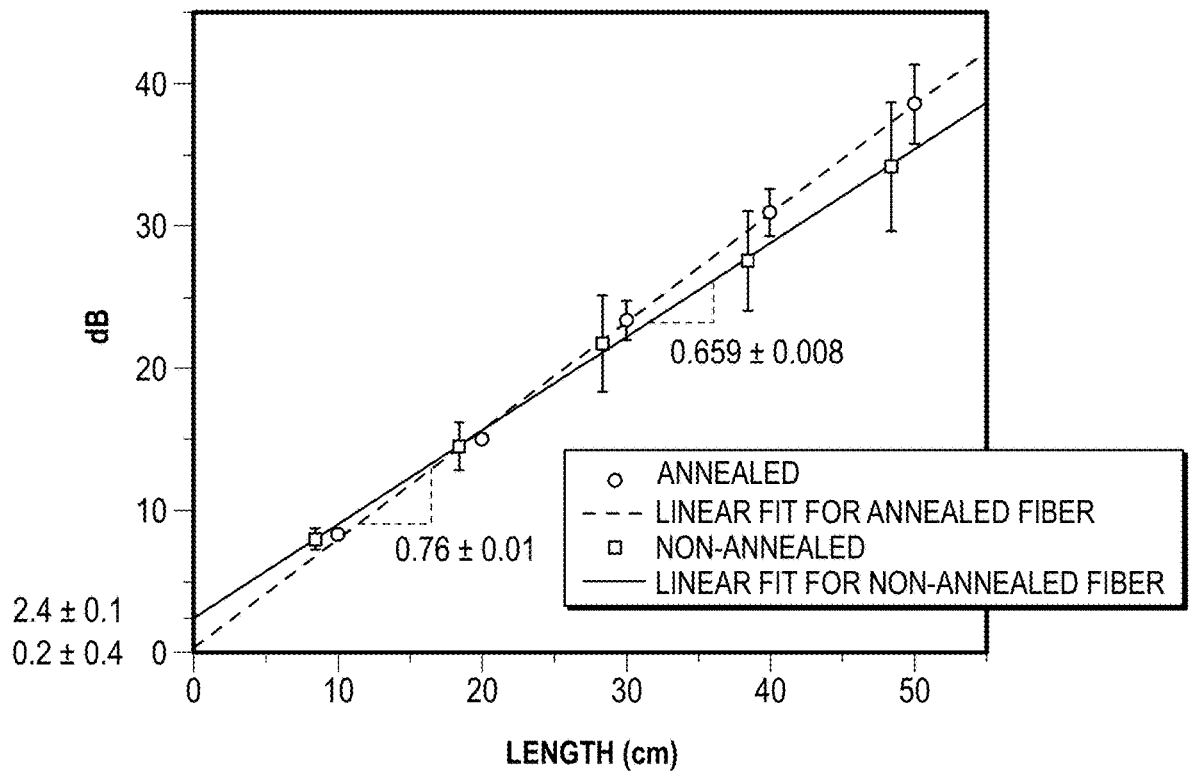
FIG. 3A (Contd.1)

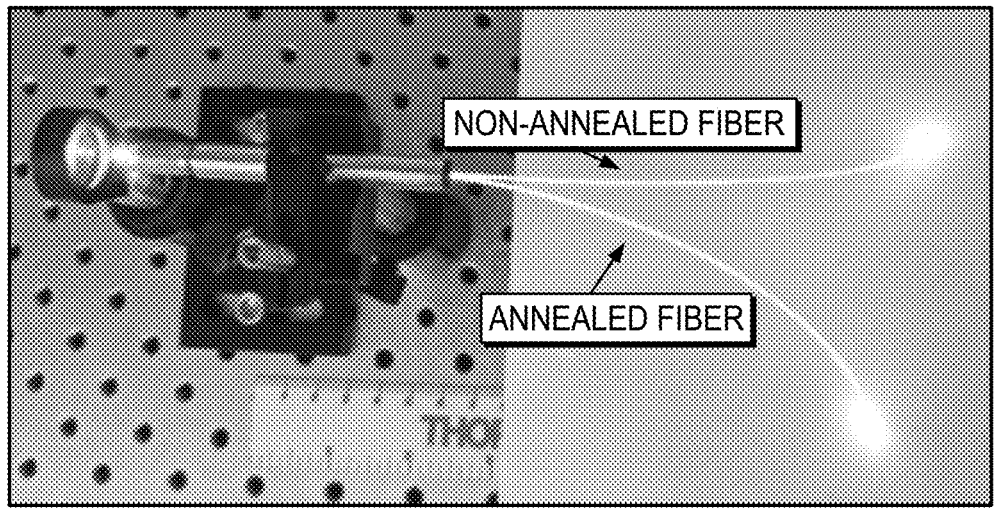
*FIG. 3A(Contd.2)*
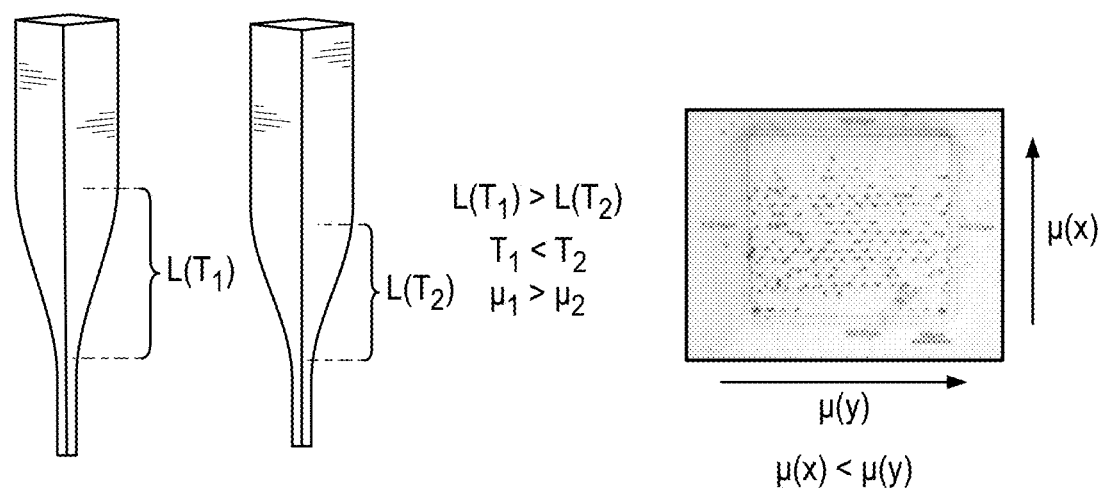
*FIG. 3B*

I
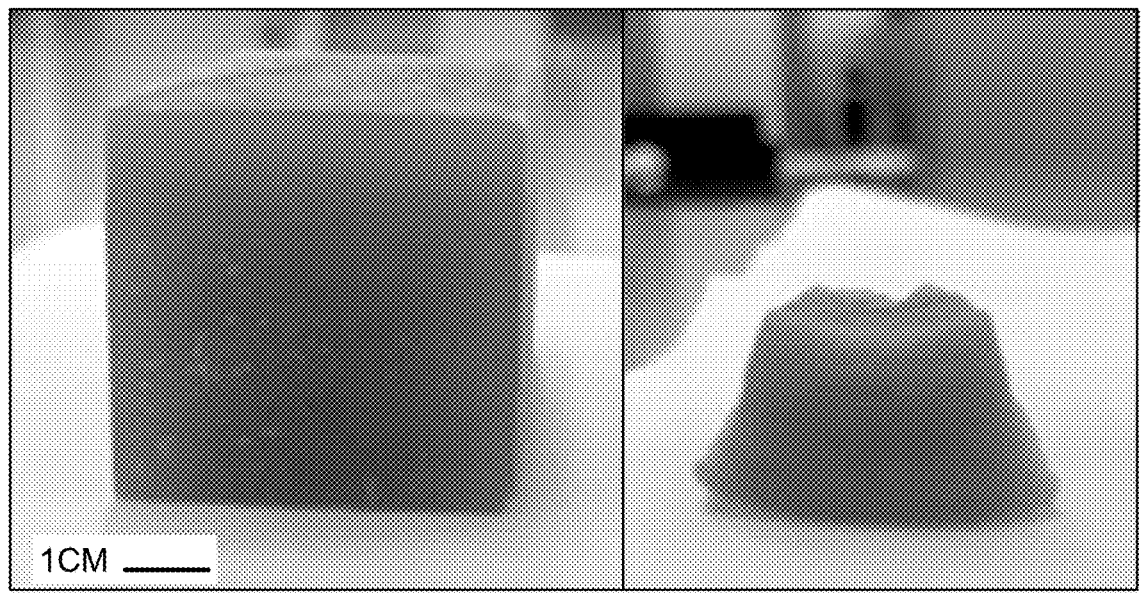
II
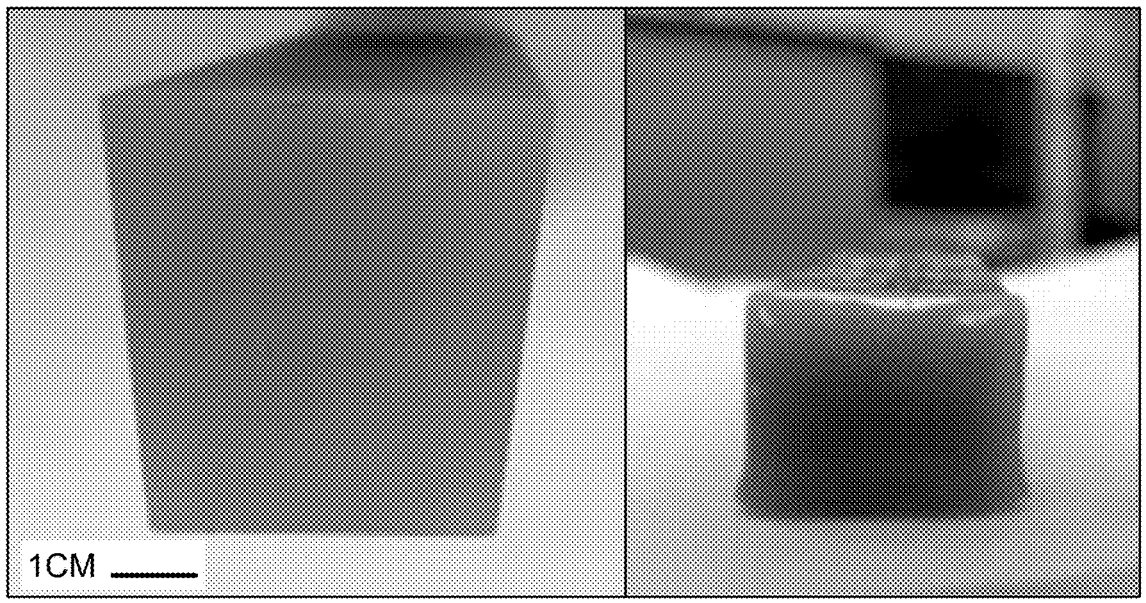
*FIG. 4G*

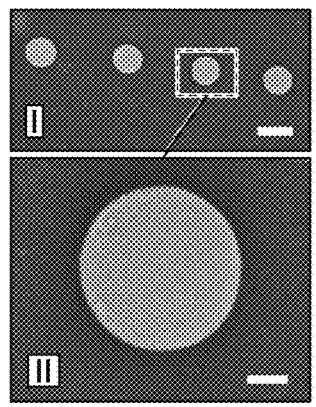 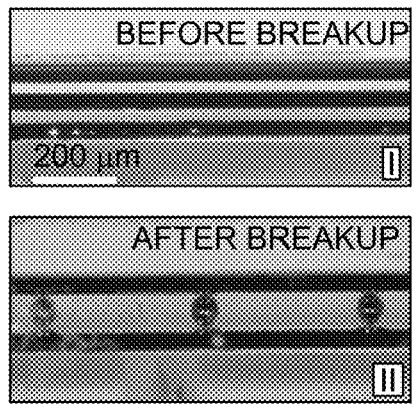 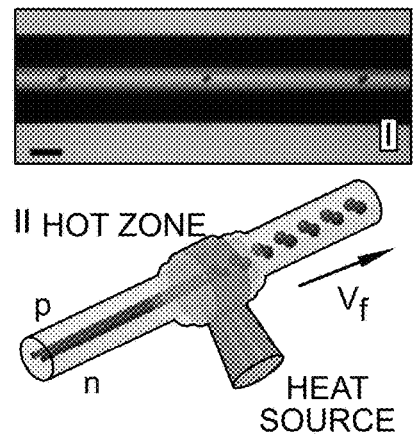
*FIG. 5A*  *FIG. 5B*  *FIG. 5C*
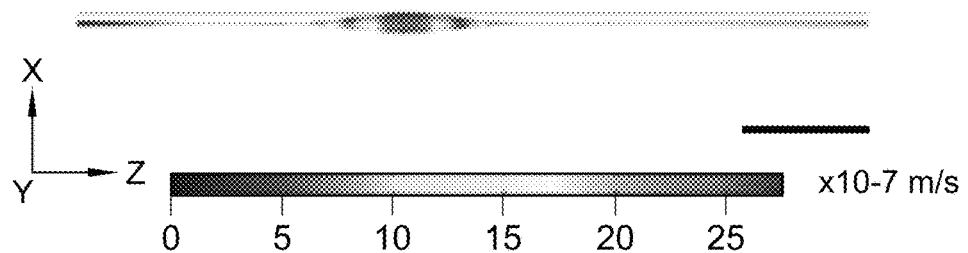
*FIG. 6A*
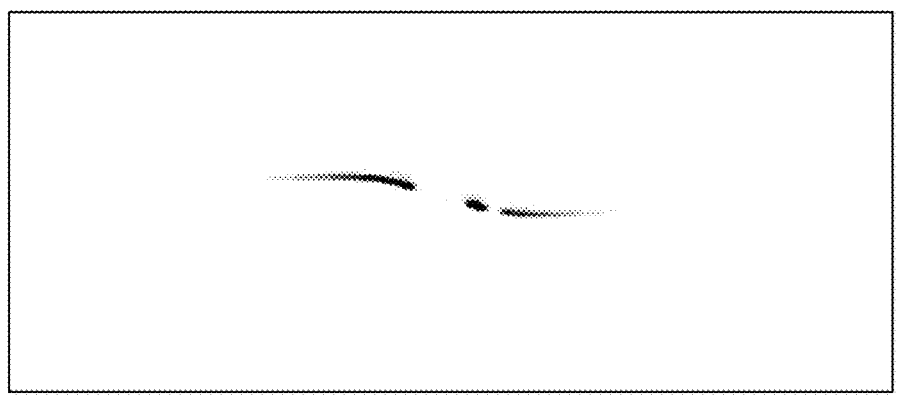
*FIG. 6B*

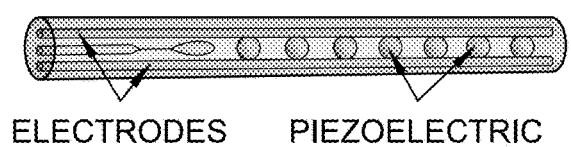
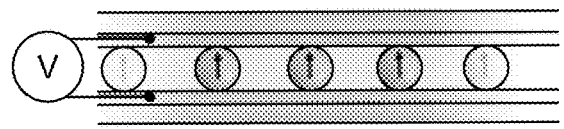
FIG. 12A
FIG. 12B
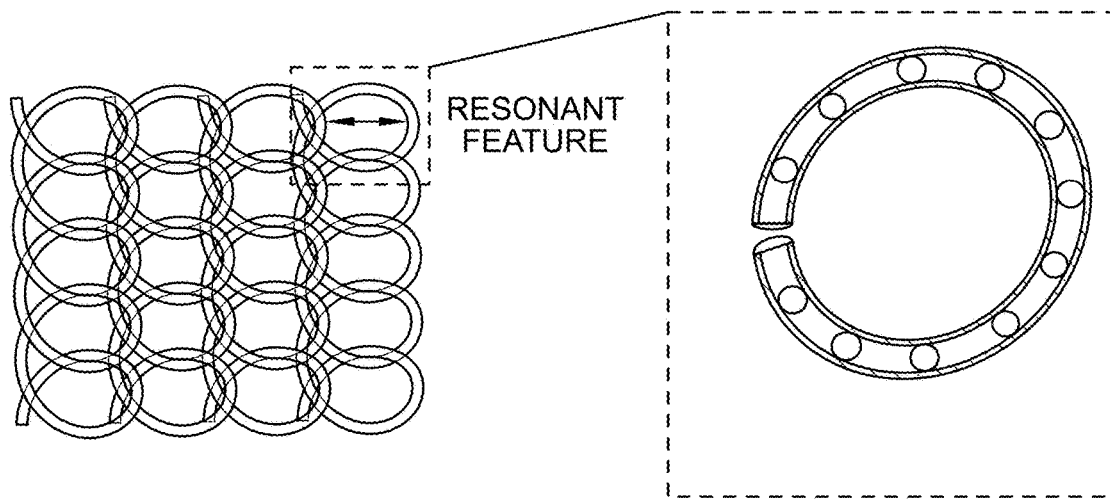
FIG. 12C
FIG. 12D
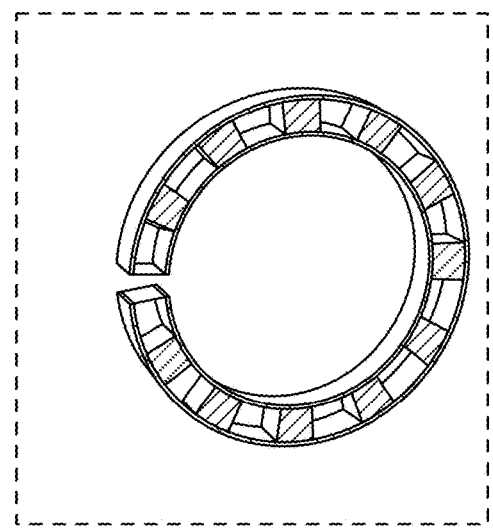
FIG. 12E

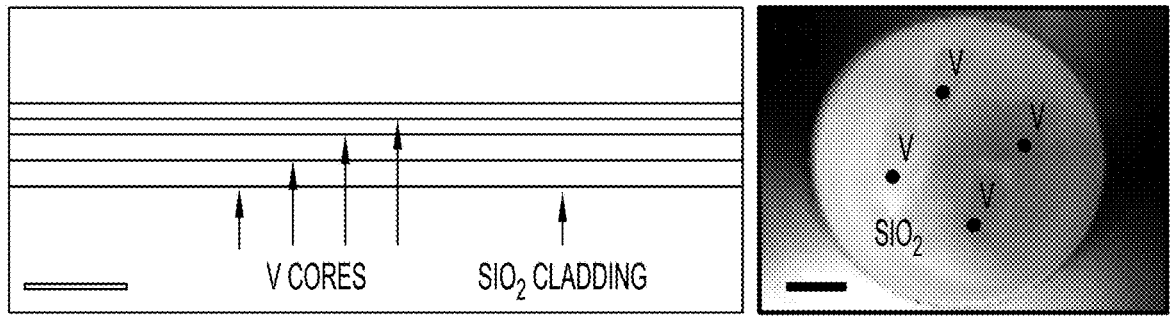
*FIG. 16A (Contd)*
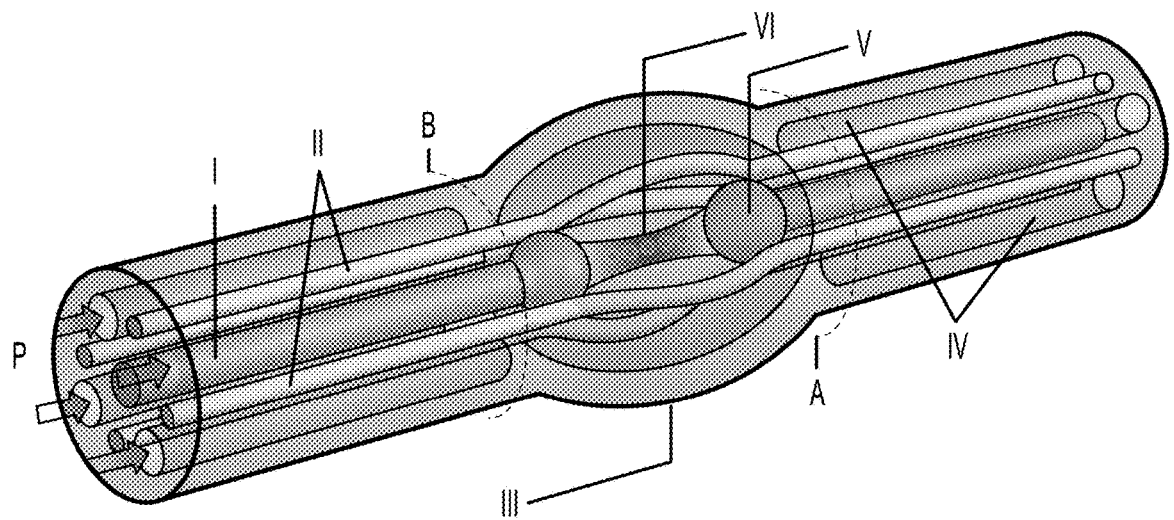
*FIG. 16B*

VERY LARGE SCALE INTEGRATION FOR FIBERS (VLSI-FI)

CROSS REFERENCE TO RELATED APPLICATIONS

This application claims priority to the following: U.S. Provisional Application Ser. No. 63/014,207, filed on Apr. 23, 2020, and U.S. Provisional Application Ser. No. 63/014,208, filed on Apr. 23, 2020, the disclosures of which are expressly incorporated by reference in their entirety.

Cross reference is made to co-pending U.S. application Ser. No. 17/239,322, filed Apr. 23, 2021, titled "METHODS FOR CREATING THREE DIMENSIONAL BIOSYNTHETIC TISSUE". Cross-reference is made to co-pending U.S. application Ser. No. 17/238,833, filed Apr. 23, 2021, titled "A GUT BIOREACTOR AND METHODS FOR MAKING THE SAME". The contents of each of these applications are incorporated herein by reference in their entireties. Neither of these cross-referenced applications is admitted to be prior art with respect to present application by its mention in the cross-reference section.

BACKGROUND

Fibers are ubiquitous and usually passive. Although glass-drawn fibers date back to the Roman times, the first functional optical fibers were manufactured in 1792 by the French Chappe brothers for communication purposes. In 1842, Jean-Daniel Colladon, a Swiss physicist, showed that light could be guided internally through a water jet. These two discoveries sprouted decades of optical and material engineering improvements leading to today's efficient fibers, enabling high-speed telecommunication and data storage across kilometers of distance around the world, such as the 25,000-km-long trans-Pacific undersea cable completed in 1996. Moreover, fiber optic sensors are used for a wide variety of biomedical, oil and gas, marine, architectural, chemical, and aerospace applications.

The control and improved performance of light propagation using photonic crystal fibers developed in 1996 by Philip Russel opened the doors for research in more complex fiber internal functional structures. New microstructures also welcomed the integration of material diversity in their constitution to design smart fibers for electronics, optoelectronics, in-fiber synthesis, microfluidics, microelectromechanical systems, and biosynthetic interfacing.

Smart fibers differ from traditional fibers by including a non-traditional function beyond optical communication and the typical usage of fibers in commercial fabrics. Smart fibers can be used for esthetics in electronic textiles by controlling the colored appearance of the fibers due to optical interference in their microstructure or for enhancing performance, for example in the case of conventional optical fiber guides and dielectric mirror lining allowing light guidance through air.

To make a fiber functional, it should be comprised of materials with varying electronic properties, its architecture should be specifically designed to perform a given function, and its internal features should be reduced at the nanoscale, orders of magnitude smaller than the core of current telecommunication fibers. Fibers are typically created by optical fiber fabrication methods, that is, being thermally drawn from macroscopic cylindrical or cuboid rods called "preforms". The fabrication process begins with a selection of appropriate core and cladding materials, such as metals, insulators, and semiconductors. For example, the first fiber including metal insulator-semiconductor structures was developed in 2004 for photodetection. Materials for the preform are selected such that their viscosities, $\mu$, are comparable at draw temperature, falling roughly in the window of $4<\log(\mu)[\text{poise}]<6$. This is required to prevent shear flows and capillary instabilities that otherwise distort the fiber device geometry. Materials for which this requirement is unattainable, such as metals or crystalline semiconductors that are very thin in their liquid form during the fiber draw, must be confined to channels with a low aspect ratio, with geometry close to equilibrium.

Fibers can be weaved into fabrics or nets to attain collective functionality that surpasses that of an individual fiber. Designed through biomimicry, fibers can be shaped according to nature's useful features to enhance the fabric's functionality, such as hydrophobicity. The fibers can also be conceived as synthesis platforms for inexpensive material production such as the conversion of aluminum cores into silicon in silica-cladded fibers or thermally induced fabrication of porous structures by phase separation. Fibers can also serve remote and distributed signal detection, such as environmental chemical sensing of hazardous volatiles. The flexibility in fiber design is such that multiple functional modalities can be integrated in one fiber for complex applications such as deep spinocortical stimulation and monitoring in mice for neurodegenerative diseases research. These examples show some of the variety of domains in which smart fibers are the natural solution.

However, the realization of high-performance electronics in a fiber remains a demanding challenge due to the elusiveness of a material processing strategy that would allow the wrapping of devices made in crystalline semiconductors, such as silicon, into a fiber in an ordered, addressable, and scalable manner. Different approaches addressing this challenge have been proposed, with efforts mostly focused on low-temperature materials. For example, high-pressure chemical vapor deposition has been used to integrate compound semiconductors in microstructured optical fibers, as well as to create flexible silicon p-i-n junction fibers. Alternatively, a $CO_2$ laser was used for the recrystallization of SiGe core in silica fibers to engineer their electronic properties. These current fiber-sensor fabrication approaches either are non-scalable or limit the choice of semiconductors to the amorphous ones, such as chalcogenide glasses, inferior to silicon in their electronic performance, resulting in limited bandwidth and sensitivity of such sensors when compared to a standard silicon photodiode. Thus, a need exists for systems and methods for the scalable manufacturing functional or "smart" fibers with integrated high-performance microelectronic systems, such as, but not limited to, optoelectronic systems realized in a fiber.

SUMMARY

The present disclosure is directed to systems and methods for controlling the 3D architecture of fibers. For example, the present disclosure substantiates a universal in-fiber manufacturing of logic circuits and sensory systems analogous to very large-scale integration (VLSI), which enabled the emergence of the modern microprocessor. The present disclosure describes the development of a versatile hybrid-fabrication methodology that assembles in-fiber material architectures typical to integrated microelectronic devices and systems in silica, silicon, and high-temperature metals. This methodology, dubbed "VLSI for Fibers," or "VLSI-Fi," combines 3D printing of preforms, a thermal draw of fibers, and post-draw assembly of fiber-embedded integrated devices by means of material-selective spatially coherent capillary breakup of the fiber cores. This method is intended to deliver a new class of durable, low cost, pervasive fiber devices, and sensors, enabling integration of fabrics met with human-made objects, such as furniture and apparel, into the Internet of Things. Furthermore, it will boost innovation in 3D printing, extending the digital manufacturing approach into the nanoelectronics realm.

As such, a technique for controlling the 3D architecture of fibers is described herein. Since the intricacy of the final fiber correlates to the complexity of the preform cross section, free-form fabrication of preforms enables fiber device functionalities unattainable otherwise. Moreover, 3D printing is widely accessible, making it a cost-effective and user-friendly technological alternative to traditionally employed methods, allowing for a wide range of materials, from thermoplastics to high-temperature materials, as well as biomaterials.

In addition, the ability to process high-temperature materials, alongside the more traditional use of thermoplastics in additive manufacturing, allows advantage to be taken of properties such as the high electron mobility in Si/Ge, as well as the future use of lead zirconate titanate (PZT)/ $BaTiO_3$ composites for piezoelectric applications having large piezoelectric coefficients compared to polymers and higher acoustic bandwidth.

With these challenges in mind, the present disclosure presents optimization solutions using additive manufacturing to achieve faster and more complex preform fabrication, capillary breakup simulations to optimize axial control of the fiber, and combinations of the fibers of the present disclosure with tissue engineering. These strategies enable the creation of realistic biomedical platforms with biosensing and biofunctionalizing capabilities for drug and treatment analysis in vitro as one of the promising fiber device applications.

The present disclosure is also directed to implementations of the fibers produced by the VLSI-Fi approach described herein.

One such implementation takes advantage of recent maturation of Direct Digital Manufacturing (DDM) approaches, such as 3D printing, allows the redesign of materials to enhance their functionality on the macroscale. DDM approaches have been increasingly applied to impart active functionalities to ubiquitous objects, by printing electronic circuits on the object surface or even directly on the human skin. An example of pliable material easily applicable to upholster any existing object is a textile. Textiles still await a property-enhancement transformation that would impart them with active modalities. As described herein, one implementation of the "smart" fibers produced by the VLSI-Fi approach is to transform textiles into "smart" objects by imparting active sensing functionalities to them. This would inaugurate a new span of distributed sensing applications: virtually any object upholstered by such a sensing fabric would automatically become a sensor. The VLSI-Fi approach to manufacturing smart fibers described herein imparts sensing capabilities to fibers by providing a DDM methodology for embedding integrated systems of individually addressable densely packed devices into fibers and fabrics.

Another implementation of the smart fibers manufactured according to the VLSI-Fi approach described herein addresses known issues with quantum device engineering. Device integration will clearly be a central issue in quantum device engineering. The importance of this issue can already be seen in the initial efforts directed at large-scale integrated quantum computers, which may be limited by the lack of a unified material processing approach that would allow an integration of individual building blocks into a highly interconnected system. Quantum computing is not the only area that can benefit from quantum device integration. Decoherence in rare-earth ion (REI)-based quantum memories, can be used for quantum sensing in devices such as magnetometers and gyroscopes. The use of entanglement in photons resulting from qubit sources, such as Kerr frequency combs, can further boost measurement sensitivity for gyroscopes, and is currently examined for use in applications such as contrast enhancement in transmission microscopy of weakly absorbing objects. Realization of integrated quantum circuits with standard microelectronic processing approaches in hybrid material platforms has drawn a lot of attention from the scientific community. The present disclosure proposes an alternative and potentially revolutionary approach to a material-agnostic integration of multiple quantum components to realize new types of quantum devices. The processing approach is based on a thermal draw of preforms commonly used for a fabrication of telecom optical fibers. Cores of the fiber preforms can be axially patterned to create high contrast photonic gratings that will serve as building blocks for resonant cavities, essential for the realization of photonic quantum devices.

Another implementation of the smart fibers manufactured according to the VLSI-Fi approach described herein is an in-fiber ion trap comprising an Integrated Fiber-Ion Quantum Machine (IFIQM) for optimized quantum simulation and prediction of physical properties of strongly correlated, topological, and complex materials. While several technologies for building quantum computers have been proposed and are actively developed, the full power of a truly universal quantum computer remains elusive in the near future. Nevertheless, the power of quantum information processing to solve problems beyond the reach of classical computers can be harnessed by quantum simulators: the quantum system of interest is modelled by the simulator, effectively solving the associated Schrödinger equation through its own dynamics. In this way, whole families of classically intractable problems can be solved, with great potential to expand our understanding, design, and engineering of quantum materials.

In some embodiments, a microstructured fiber comprises a cladding material surrounding at least one core material, wherein the at least one core material comprises an array of discrete devices contacted in parallel.

In some embodiments, a method of producing a microstructured fiber comprises 3D-printing a fiber preform; thermally drawing the fiber preform into a fiber that preserves the cross-sectional geometry of the fiber preform; and axially patterning the fiber into a microstructured fiber comprising an array of discrete devices contacted in parallel.

In some embodiments, a sensory textile comprises at least one of an electrooptic portion configured to function as an imaging array, comprising: at least one first microstructured fiber comprising a cladding material surrounding at least one core material, the at least one core material comprising a p-doped Si core comprising a first plurality of microspheres and an n-doped Si core comprising a second plurality of microspheres, wherein the at least one first microstructured fiber of the electrooptic portion further comprises two metallic electrodes collectively surrounding the p-doped silicon core and the n-doped silicon core; a sonar portion configured for ultrasound generation and transduction, comprising: a plurality of second microstructured fibers comprising a cladding material surrounding a core material, the at least one core material comprising a piezoelectric material, wherein each of the plurality of microstructured fibers of the sonar portion further comprises two metallic electrodes collectively surrounding the piezoelectric material, wherein each of the plurality of microstructured fibers of the sonar portion comprises a series of substantially circular loops and wherein the plurality of microstructured fibers of the sonar portion are woven together; a magnetic gradiometer portion comprising: at least one third microstructured fiber comprising a cladding material surrounding a core material and defining a central hollow capillary, the core material comprising a nanodiamond-doped silica central core, wherein the at least one third microstructured fiber of the magnetic gradiometer portion further comprises: two metallic electrodes collectively surrounding the central core; and two optical cores collectively surrounding the central core; and a piezogenerating portion configured to generate a voltage, comprising: at least one fourth microstructured fiber comprising a cladding material surrounding a core material, and defining a central hollow capillary, the core material comprising a piezoelectric core positioned off-center with respect to a longitudinal axis defined by the at least one microstructured fiber, wherein the at least one microstructured fiber of the piezogenerating portion further comprises: two pairs of metallic cores collectively surrounding the piezoelectric core and comprising an inner pair and an outer pair, wherein a melting temperature of the metal of the inner pair is lower than the melting temperatures of both the piezoelectric core and the metal of the outer pair, wherein the metal of the inner pair is axially broken up into a second plurality of spheres and wherein the metal of each metallic core of the outer pair is continuous.

In some embodiments, an in-fiber integrated quantum device circuit comprises: a microstructured fiber comprising a plurality of cores extending longitudinally through the microstructured fiber, the plurality of cores comprising: a first core comprising metal silicide nanowires; a second core comprising rare-earth-ion doped $LiNbO_3$; and a third core comprising Si and indium-tin-oxide nanowires, wherein the microstructured fiber is configured to function as a qubit source, a nano-cavity gate, and a quantum memory.

In some embodiments, an in-fiber ion trap, comprising: a microstructured fiber comprising a plurality of cores extending longitudinally through the microstructured fiber, the plurality of cores comprising: an optical core formed in two longitudinal segments with a vacuum micro-chamber defined therebetween, wherein the ends of the two longitudinal segments that face one another and define the vacuum micro-chamber each comprise a spherical micro-lens; and a plurality of metallic electrodes surrounding the optical core, wherein the vacuum micro-chamber encloses an array of trapped ions configured to be probed by a laser emission when the laser emission is guided along the optical core and coupled into and out of free space within the vacuum micro-chamber using the spherical micro-lenses.

Additional embodiments, features, and advantages of the disclosure will be apparent from the following detailed description and through practice of the disclosure. The compounds of the present disclosure can be described as embodiments in any of the following enumerated clauses. It should be understood that any of the embodiments described herein can be used in connection with any other embodiments described herein to the extent that the embodiments do not contradict one another.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 4B, FIG. 4C, FIG. 4D, FIG. 4E, FIGS. 4F, and 4G illustrate additional aspects of 3D-printing and post-processing of preforms in accordance with this disclosure.

FIG. 5A, FIG. 5B, and FIG. 5C illustrate aspects of a spatially coherent, material-selective capillary breakup process in accordance with this disclosure.

FIG. 6A, FIG. 6B, FIG. 6C, and FIG. 6D illustrate capillary breakup simulations in accordance with this disclosure.

FIG. 12A, FIG. 12B, FIG. 12C, FIG. 12D, and FIG. 12E illustrate aspects of fishnet sonar in accordance with this disclosure.

FIGS. 16A and 16B illustrate aspects of an in-fiber ion micro-trap in accordance with this disclosure.

DETAILED DESCRIPTION

Definitions

Figure 1A:
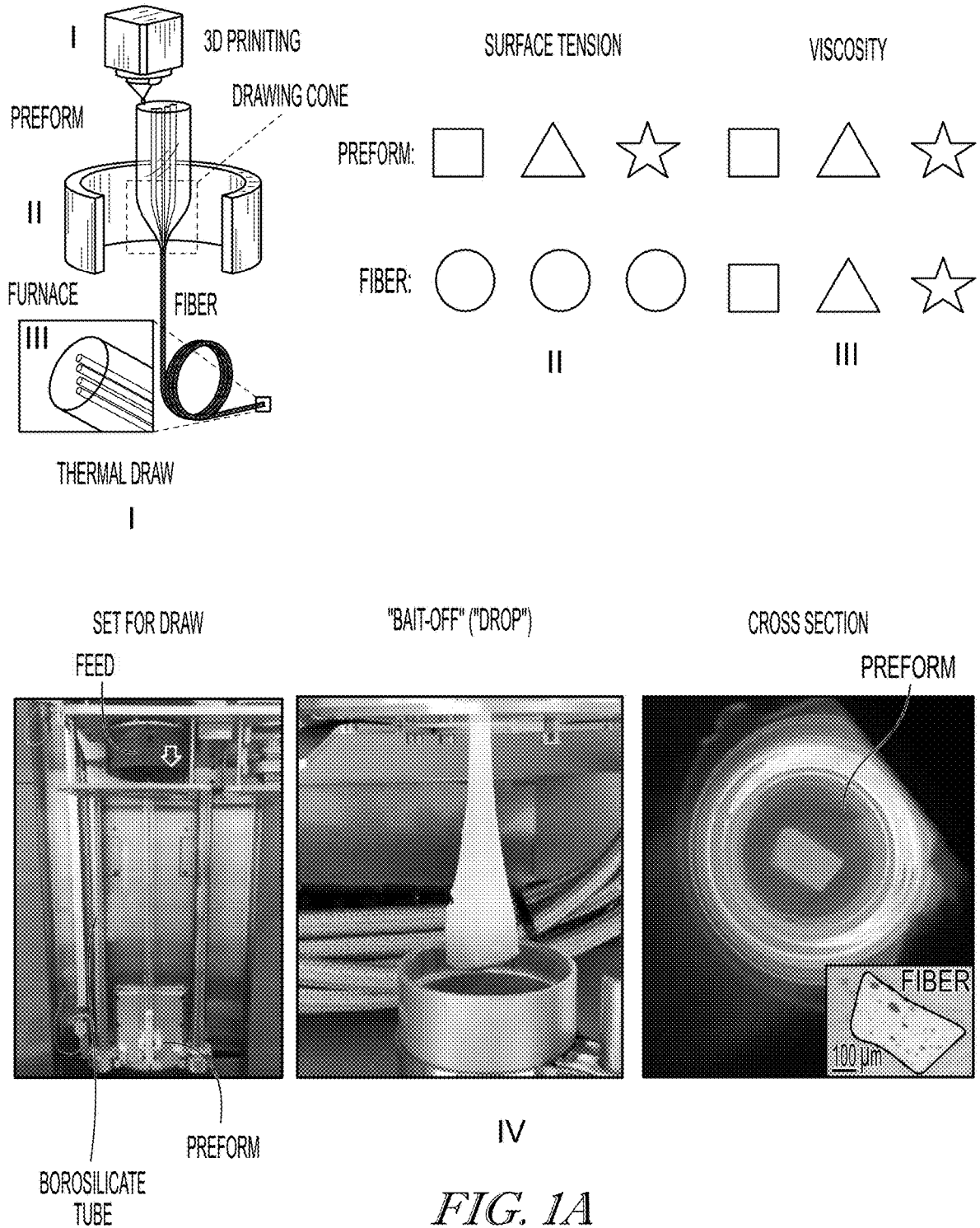
FIG. 1A, FIG. 1B, FIG. 1C, FIG. 1D, and FIG. 1E are conceptual schematics of a VLSI-Fi technique for manufacturing fibers in accordance with a method of this disclosure.

Before the present disclosure is further described, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in a patent, application, or other publication that is herein incorporated by reference, the definition set forth in this section prevails over the definition incorporated herein by reference.

Each of the terms "about" and "approximately," as used herein, mean greater or lesser than the value or range of values stated by 10 percent, but is not intended to designate any value or range of values to only this broader definition. Each value or range of values preceded by the term "about" or the term "approximately" also is intended to encompass the embodiment of the stated absolute value or range of values.

As used herein, the terms "including," "containing," and "comprising" are used in their open, non-limiting sense.

As used herein, the term "axial patterning" means an axial arrangement of discrete devices (e.g., spherical microstructures, or "microspheres") contacted in parallel within a fiber resulting from capillary breakup of initially continuous, separate cores into arrays of the discrete devices.

As used herein, the abbreviation "CAD" means "computer-aided design."

As used herein, the abbreviation "CMOS" means "complementary metal-oxide semiconductor."

As used herein, the abbreviation "DDM" means "direct digital manufacturing."

As used herein, the abbreviation "IFIQM" means "integrated fiber-ion quantum machine."

As used herein, the abbreviation "ITO" means "indium-tin oxide."

As used herein, the abbreviation "NV" means "nitrogen vacancy."

As used herein, the abbreviation "PENG" means "piezoelectric nanogenerators."

As used herein, the abbreviation "PZT" means "lead zirconate titanate."

As used herein, the abbreviation "REI" means "rare-earth ion."

As used herein, the abbreviation "RF" means "radio frequency."

As used herein, the abbreviation "SLA" means "stereolithography."

As used herein, the abbreviation "TDR" means "time domain reflectometry."

As used herein, the abbreviation "UV" means "ultraviolet."

As used herein, the abbreviation "VLSI" means "very largescale integration."

As used herein, the abbreviation "VLSI-Fi" means "very large-scale integration for fibers."

Disclosed herein is a method of producing a fiber with a segmented device is provided. The method comprises providing a preform, thermally drawing the preform to form a fiber, and inducing capillary breakup to form a segmented device having a transduction functionality. In some embodiments, the method comprises a) providing a preform having a cross-sectional geometry, the preform comprising a core extending along a first axis and a cladding extending along the first axis, and wherein the cladding surrounds the core; b) thermally drawing the preform to form a fiber, wherein the cross-sectional geometry of the preform remains in the fiber; and (c) inducing capillary breakup in a first portion of the fiber and not in a second portion of the fiber adjacent the first portion of the fiber so that a segmented device having a transduction functionality forms in the first portion of the fiber and does not form in the second portion of the fiber.

The step of inducing may be performed by applying heat or UV to the first portion of the fiber. In some embodiments, the heat or UV is focused on the first portion of the fiber. The temperature or wavelength is selected based on its ability to melt the core and melt or soften the cladding material around the core. In some embodiments, heat is applied using a flame having a width of between about 1 mm to about 5 mm, or 3 mm to about 3.5 mm.

In some embodiments, the heat is applied by a hydrogen oxygen torch or a laser wherein the beam is controlled to have a sharp boundary or a soft boundary. The laser can apply a heat in an area of less than a millimeter.

In some embodiments, the step of applying heat to a first portion of the fiber liquefies the core and the surrounding cladding of the first portion so that the liquefied core and surrounding cladding undergo capillary breakup to generate a segmented device. In some embodiments, heating the first portion of the fiber liquefies the core in the first portion of the fiber and the heating softens the cladding surrounding the core in the first portion of the fiber. During the step of heating, the second portion of the fiber is not liquefied or softened.

In some embodiments, the cladding surrounds each segmented device as it forms by capillary breakup. In some embodiments, the cladding comprises silica, polycarbonate, a polymer, glass, resin, or a combination thereof.

In some embodiments, the core comprises Si and the cladding comprises $SiO_2$.

In some embodiments, the core comprises Si/Ge, and wherein the Si/Ge forms a Janus particle. In some embodiments, a Si portion of a first spheroid is located between a Ge portion of the first spheroid and a Ge portion of a second spheroid.

In some embodiments, the fiber further includes at least two metallic cores extending along the first axis and comprising an electrode material selected from the group consisting of platinum, vanadium, and titanium. The metallic cores may be incorporated into the preform and then thermally drawn with the cladding and the core during the production of the fiber. In the preform, the metallic cores may not contact the core. In other aspects, the metallic cores may contact the core in the preform.

In some embodiments, the core comprises a semiconducting material of Si with fused silica cladding.

The core may comprise a piezoelectric core of PMN-PT or $BaTiO_3$. Additionally, the fiber may further comprise two metallic cores.

In some embodiments, the cladding may comprise pyrex, the core may comprise a piezoelectric material that is positioned off-center. Additionally, the preform may further comprise two metallic cores.

In some embodiments, the core may be selected from ferroelectrics, garnets, Nd:YAG, and metal silicide nanowires such as ITO or NbSix/WSix.

The method may further comprise 3D printing the preform. In some embodiments, the method comprises using a 3D printer having a print bed and printing each layer of the preform at an angle of about 0° to about 45° from the 3D printer print bed. In some embodiments, the each layer of the preform is printed at an angle of about 0°, about 5°, about 10°, about 15°, about 20°, about 25°, about 30°, about 35°, about 40°, or about 45° from the 3D printer print bed.

The method may further comprise annealing the preform prior to the step of thermally drawing. In some aspects, the step of annealing provides stability and strength to the preform prior to the thermal draw. The parameters for annealing a material is dependent upon the type of material, thickness, and desired properties. One of ordinary skill in the art will understand the parameters to properly anneal the preform.

In some embodiments, the cladding comprises a first material and the core comprises a second material having a difference in melting temperatures of about 400° C. or less compared to the first material. In some embodiments, the difference in melting temperature between the cladding comprising a first material and the core comprising a second material is about 400° C., about 350° C., about 300° C., about 250° C., about 200° C., or about 150° C. 100° C., about 95° C., about 90° C., about 85° C., about 80° C., about 75° C., about 70° C., about 65° C., about 60° C., about 55° C., about 50° C., about 45° C., about 40° C., about 35° C., about 30° C., about 25° C., about 20° C., about 15° C., about 10° C., about 5° C., or about 0° C.

The step of heating may occur at a temperature below 2230° C. In some embodiments, the heat temperature to induce capillary breakup is selected to melt the core material. In some embodiments, the heating melts or softens the cladding. In illustrative embodiments, the heating temperature may not melt or soften the metallic cores.

Due to fluid and thermodynamics, the capillary breakup results in periodic segmented devices. In some embodiments, the segmented devices have spherical or roughly spherical shapes.

During the step of inducing, the surrounding cladding of the first portion of fiber may surround the segmented device as it forms by capillary breakup and separate the segmented device from the core.

In some embodiments, the method may further comprise applying heat to a second portion of the fiber to generate a second segmented device located spaced apart along the first axis from the first segmented device. Further, the surrounding cladding of the second portion may surround the second segmented device as it forms by capillary breakup and separates the second segmented device from the core. In some embodiments, the segmented device and the second segmented device are spaced apart along the first axis by an intermediate region, wherein the intermediate region comprises cladding. The length of the intermediate region may be controlled by the materials of the core and cladding, the applied localized heat, the resulting viscosities of the liquefied core and cladding, and the surface tension between the cladding and the core. In some embodiments, the intermediate region ranges from 0.001 mm to about 10 mm along the first axis. In some embodiments, the intermediate region ranges from about 100 nm to about 30 mm along the first axis.

In some embodiments, the preform comprises a first core and a second core extending along the first axis. In one illustrative aspect, the first core and the second core are not in contact with each other. In some embodiments, the first core and the second core are in contact with each other. In some embodiments, the first core and the second core are in contact within the preform.

The first core and the second core may comprise the same material. In some embodiments, the first core and the second core may consist essentially of the same material. Alternatively, the first core and second core may not comprise the same material. In some embodiments, the first core and the second core may not consist essentially of the same material.

In one aspect, the first core, the second core, and the cladding comprise materials having a difference in melting temperatures of about 400° C. or less from each other. In some embodiments, the first core and the second core comprise materials having a difference in melting temperatures of about 400° C. or less from each other. In some embodiments, the difference in melting temperature between the cladding and the first and second core is about 400° C., about 350° C., about 300° C., about 250° C., about 200° C., or about 150° C. In some embodiments, the first core and the second core comprise materials having a difference in melting temperatures of about is about 400° C., about 350° C., about 300° C., about 250° C., about 200° C., about 150° C., about 100° C., about 95° C., about 90° C., about 85° C., about 80° C., about 75° C., about 70° C., about 65° C., about 60° C., about 55° C., about 50° C., about 45° C., about 40° C., about 35° C., about 30° C., about 25° C., about 20° C., about 15° C., about 10° C., about 5° C., or about 0° C. In some embodiments, the cladding and cores comprise materials having a difference in melting temperature of about 100° C. or less from each other. In some embodiments, the cladding and the cores comprise materials having a difference in melting temperatures of about 100° C., about 95° C., about 90° C., about 85° C., about 80° C., about 75° C., about 70° C., about 65° C., about 60° C., about 55° C., about 50° C., about 45° C., about 40° C., about 35° C., about 30° C., about 25° C., about 20° C., about 15° C., about 10° C., about 5° C., or about 0° C.

In an illustrative aspect, the applied heat to a first portion of the fiber liquefies the first core, the second core, and the surrounding cladding of the first portion of the fiber to induce capillary breakup. This breakup generates a first segmented device and a second segmented device each having a having a transduction functionality. Illustratively, the first segmented device forms in the first portion of the fiber and does not form in the second portion of the fiber. In some embodiments, the first segmented device and the second segmented device are roughly spherical or spherical having about the same radius.

In some embodiments, the first segmented device contacts the second segmented device. Additionally, the surrounding cladding of the first portion may surround and separate the first segmented device from the first core and the second segmented device from the second core. In some embodiments, the first segmented device and the second segmented device extend along a second axis about perpendicular with the first axis. In some aspects, the method further comprises applying heat to a second portion of the fiber to liquefy the first core, the second core, and liquefy or soften the surrounding cladding of the second portion and to induce capillary breakup to generate a third segmented device and a fourth segmented device. In this embodiments, the surrounding cladding of the second portion surrounds the third segmented device as it forms by capillary breakup from the first core and surrounds the fourth segmented device as it forms by capillary breakup from the second core.

In some embodiments, the third segmented device contacts the fourth segmented device. In an alternative embodiment, the third segmented device does not contact the fourth segmented device. Further, the third segmented device and the fourth segmented device may be spherical or roughly spherical having a similar radius, and wherein the third segmented device and fourth segmented device extend along the second axis. In some embodiments, the third segmented device and fourth segmented device are spaced apart from the first segmented device and second segmented device along the first axis by an intermediate region, wherein the intermediate region comprises cladding.

In some embodiments, the length of the intermediate region is controlled by the materials of the first core, second core, and cladding, the applied localized heat, the resulting viscosities of the liquefied core and the cladding, and the surface tension between the cladding and the core.

In some embodiments, the preform further comprises a first metallic core and a second metallic core. In some embodiments, the preform comprises a first metallic core, a second metallic core, and a third metallic core. In some embodiments, the preform includes at least two metallic cores, at least three metallic cores, or at least four metallic cores.

In some embodiments, the segmented device contacts the first metallic core and the second metallic core. In some embodiments, the first segmented device contacts the first metallic core and the second segmented device contacts the second metallic core.

In some embodiments a fiber is provided. In some embodiments, the fiber comprises a cladding having an outer surface. Illustratively, the cladding extends along a first axis. In some embodiments, a segmented core is coextensive with the cladding along the first axis and surrounded by the cladding. In some embodiments, the segmented core comprises a transducing device, a first spacer, and a second spacer, wherein the device is located between the first and second spacer. The fiber may further comprise two metallic cores extending along the first axis and positioned to each contact the transducing device. In some embodiments, each of the metallic cores comprise vanadium, chromium, platinum, titanium, copper, aluminum or a combination thereof In some embodiments, the transducing device has a melting temperature of less than a melting or softening temperature of the cladding. In some embodiments, the transducing device has an average diameter of between about 0.1 nm to about 300 microns, about 0.1 nm to about 1 nm, about 1 nm to about 50 nm, about 50 nm to about 1 micron, about 1 micron to about 20 microns, about 5 microns to about 25 microns, about 10 microns to about 15 microns, about 20 microns to about 50 microns, about 50 microns to about 100 microns, about 75 microns to about 150 microns, about 150 microns to about 250 microns, or about 200 microns to about 300 microns. In some embodiments, the transducing device comprises silicon, germanium, lead, zirconium, barium, titanium, or a combination thereof. In some embodiments, the transducing device comprises a metal silicide nanowires, metal-oxide, lithium, niobium, indium, tin, $LiNbO_3$, lead zirconate titanate (PZT)/$BaTiO_3$, or combination thereof. In some embodiments, the transducing device comprise at least two spheres in parallel contact and positioned perpendicular to the axis.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination.

Example Methods and Systems for Manufacturing Functional Smart Fibers

Methods and systems for manufacturing functional smart fibers such as the fibers described in the embodiments above now will be presented.

The present disclosure is directed to methods for controlling the 3D architecture of functional fibers. The inventive methods and systems using fiber technology as described herein enable integration of high-performance microelectronic systems within a thin-fiber, thereby enabling fiber device functionalities unattainable otherwise.

In order to realize functional fibers, inspiration for the present disclosure was drawn from VLSI—a digital design and manufacturing technique that gave rise to the modern microprocessor in the 1970s. This technique involves selectively exposing a silicon substrate wafer to photolithography and then chemically or thermally treating the exposed areas of the semiconducting substrate wafer to functionalize the surface of the wafer and define the features of the integrated circuit in this layer (2D). The fabrication of a complete circuit progresses by repeating this process to stack such individual layers in the direction perpendicular to the wafer surface (+1D). Additionally, the electronic doping of individual components of the circuit (+0D) can be controlled by implantation and thermal activation for functionalization of an individual transistor. In this manner, the VLSI technique enables additive/subtractive digital manufacturing of a 3D microprocessor on a silicon wafer. The approach to fibers described herein, dubbed "VLSI for Fibers" or "VLSI-Fi," is analogous: first, additive manufacturing and thermal draw of a preform define the cross-sectional geometry of the fiber device (2D); second, the resulting fiber can later be axially patterned (+1D), allowing for the assembly of arrays of integrated discrete devices from initially continuous but separated cores; and third, segregation-driven structuring of individual in-fiber-embedded devices (0D) can be performed. Table 1 below draws a comparison between the two techniques, highlighting the correspondence between each degree of geometry control made possible by each technique ("2D+1D+0D").

TABLE 1

Comparison Table Between VLSI and the Analogous Approach for Fibers (VLSI-Fi)

Figure 1B:
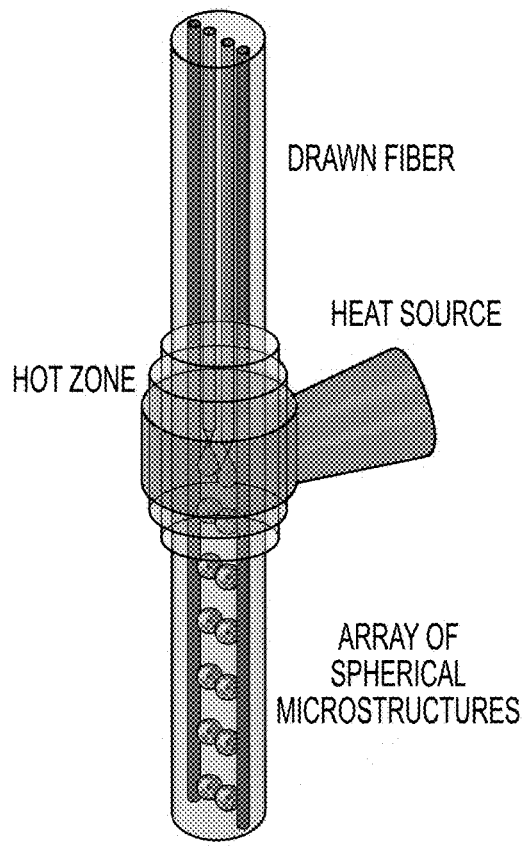
Figure 1C:
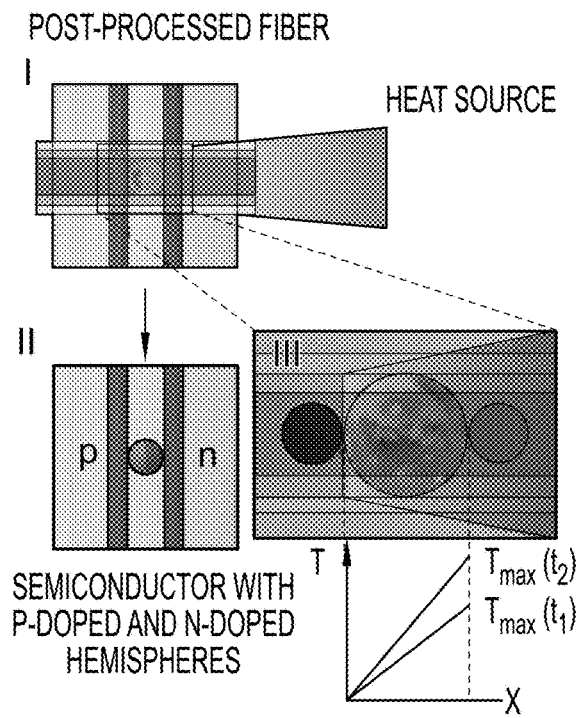

|     | VLSI | VLSI-Fi | Graphical Illustration |
| --- | --- | --- | --- |
| 2D | Wafer surface by photolithography and chemical and thermal treatment | Fiber cross section by 3D printing of preforms and thermal draw | FIG. 1A |
| +1D | Layer-by-layer structuring by vertical stacking | Axial patterning by capillary breakup | FIG. 1B |
| +0D | Doping control by implantation and thermal activation | Segregation-driven structuring by temperature gradient-guided solidification | FIG. 1C |

The schematics of the described steps are shown in detail in FIG. 1, and described below, where examples of possible in-fiber-embedded devices could be realized using the VLSI-Fi technique.

Conceptual schematics of the VLSI-Fi technique representing the "2D+1D+0D" approach are shown in FIG. 1. The preform, which is essentially a scaled-up version of the fiber, can be built using a variety of techniques such as rolling sheets of material like a rug, stacking milled parts like a puzzle, or 3D printing, and then consolidated by a vacuum sintering. This process, for the case of a 3D printed preform, is schematically illustrated in FIG. 1A (I). The 3D printing of the fiber preform defines its two-dimensional cross section. Next, the fiber preform is thermally drawn to scale the cross-sectional features to micrometric or even nanometric scales. FIG. 1A (II) illustrates this drawing process, with the 3D-printed preform (I) being thermally drawn into a long, thin fiber. That is, the preform is heated in a furnace and thermally drawn into a long, thin fiber like a caramel or taffy (see drawing cone in FIG. 1A (II)), while preserving the cross-sectional geometry of the preform (2D) based on a construct's given thermomechanical properties such as viscosities, interface energies, mutual adhesion, and differential thermal expansion (FIG. 1A (III)). Since the fiber draw is a liquid phase process, there are two competing forces at play: viscosity and surface tension. Surface tension works to defy and reshape any cross-sectional feature into a cylinder; i.e., an equilibrium shape with minimal surface energy, while viscosity works to preserve the cross-sectional geometry of the fiber. Thus, in cases where a fiber having a non-cylindrical cross-section is desired, the viscosity force should be kept dominant over surface tension during the drawing process. A typical draw can yield kilometers of fiber with very fine nanoscale cross-sectional diameters around 5 nm. FIG. 1A (IV) illustrates, from left to right, a fiber preform set for draw attached to a borosilicate tube; the initial "bait-off" or "drop" of the preform as drawing begins; and a cross-section of the preform in the furnace compared to a cross-section of the resulting fiber (inset scale bar 100 microns). This illustrates that the cross-section is preserved in the draw process and demonstrates the ability to draw glass fibers with non-equilibrium cross-sections from 3D printed preforms.

In a post drawing step, playing on capillary instabilities, the fiber or portions thereof can be re-liquefied by heating to allow for capillary breakup (+1D) of the cores in a spatially coherent material-selective manner, enabling control over the pattern of the fiber-embedded structures in the axial direction, as illustrated in FIG. 1B. As shown in FIG. 1B, this capillary breakup may result in the assembly of initially continuous, separate cores into arrays of discrete devices (e.g., spherical microstructures, or "microspheres") contacted in parallel. That is, a "device" for the sake of VLSI-Fi may be a multi-spherical assembly whose optoelectronic, piezoelectric, and/or photonic architecture imparts it with some transduction functionality. The axial arrangement of the discrete devices within the fiber may be referred to herein as "axial patterning." Alternative techniques for patterning the cores axially include UV-exposure through photomasks in photopolymeric cores, resulting in non-trivially shaped microparticles. Other hybrid-functionalization techniques include coating the fiber surfaces with functional materials and confinement of a fiber cladding by a draw to an array of optoelectronic devices fabricated by standard complementary metal-oxide semiconductor manufacturing.

Figure 1D:
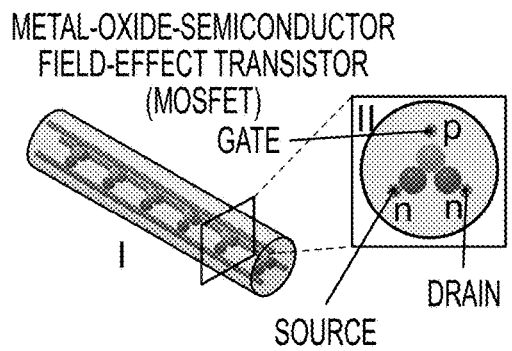

FIG. 1C illustrates segregation-driven control of doping (+0D) in (I) post-breakup semiconducting particles, allowing (II) control of an individual device's internal architecture via (III) thermal gradient. FIG. 1D is (I) a schematic illustration of metal-oxide-semiconductor field-effect transistor (MOSFET) through VLSI-Fi, where the p-type and n-type semiconductors are shown in blue and red, respectively. (II) The golden continuous rods embedded in a silica fiber act as gate, source, and drain. The resulting fiber cross section is shown in (II). Similarly, FIG. 1E (I) shows a schematic picture of a bipolar junction transistor realized by VLSI-Fi, achieved with impinging heat sources from both the emitter and collector sides. The fiber cross section (II) shows the emitter, collector, and base of the bipolar junction transistor (continuous rods embedded in the fiber), with the p-type and n-type semiconductors of the n-p-n junction shown in FIG. 1E. The internal structure of the fiber is, as can be seen from the figures, is an array of npn entities (or pn back-to-back contacted pairs of diodes), which n-doped regions are in contact with source and drain electrodes, while depending on whether the gate electrode is in direct contact with the central p (the "channel") region of such npn entity or offset from it, the entity will function as a bipolar junction or a MOSFET transistor, respectively.

Example Fiber-Manufacturing Methods

This section describes the 3D printing of polycarbonate preforms, followed by recent advances in glass 3D printing using stereolithography ("SLA"). Next, this section addresses the axially patterning of the fibers through a spatially coherent, material-selective capillary breakup, which allows for the assembly of initially continuous, separate cores into arrays of discrete devices contacted in parallel. Finally, this section proposes a biomedical application of biointerfacing fibers, combined with tissue engineering to monitor viable tissue growth in vitro.

As discussed above, conventional preform fabrication techniques, such as thin-film-rolling and stack-and-raw, are limited in producing complex geometrical structures, take up a significant amount of time in the fiber draw process, and require skilled labor and expensive equipment. 3D printing addresses these problems with the help of soluble support material and its partly automated and user-friendly process, thereby enabling the printing of complex geometries with ease in a relatively short period of time.

3D Printing and Thermal Draw of Preforms
Polycarbonate Preforms

Example 1—Effects of Printing and Drawing Angles

In one example, the methods of the present disclosure were implemented to enable assessment of the influence of the printing angle of polycarbonate (Hatchbox 3D) preforms by printing cylindrical and square-shaped rods using a single head Prusa i3 MK2 FDM-printer. The extruder and the print bed temperatures were set to 235° C. and 105° C., respectively, and the printer was set to produce 100% infill preforms with a 0.35-mm nozzle. The orientation of the layers in the preform depends on the horizontal orientation of the part with respect to the print bed, and when the preform is introduced into the furnace during the thermal draw, the heat flow is affected by the layer orientation. To test which orientation was best suited for thermal draw, preforms with 0°, 15°, 30°, 45°, and 90° orientations were printed. All angles were measured between the longitudinal axis of the preform and the horizontal axis. The 3D-printed preforms underwent the thermal draw process in a furnace with three temperature zones of 90° C., 100° C., and 200° C. For the cylindrical preforms, the thermal draw was successful at angles 0° and 45°. The 90° preform draws are known to fail due to layer delamination.

Figure 2A:
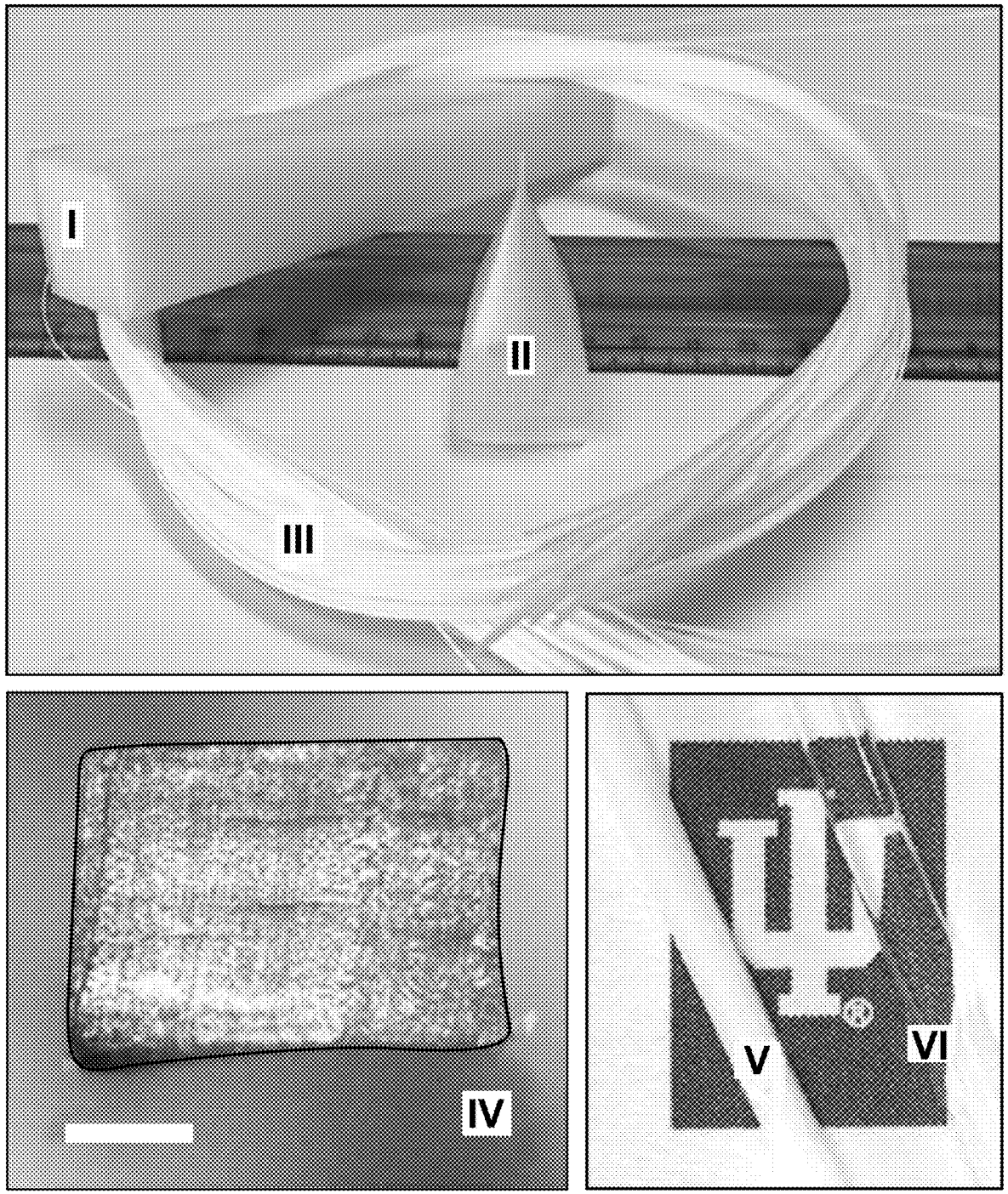
FIG. 2A illustrates aspects of 3D-printed preforms in accordance with this disclosure.

FIG. 2A illustrates 3D-printed preforms. A square-base 3D printed polycarbonate preform is shown in FIG. 2A (I). FIG. 2A (II) illustrates a drawing cone and FIG. 2A (III) illustrates a resulting polycarbonate fiber after thermal draw. Fiber cross section after the draw process are shown in FIG. 2A (IV), with no layer delamination. The cross section is rectangular due to non-isotropic porosity of the infill pattern (scale bar 200 μm). FIG. 2A (V) illustrates a drawn fiber before annealing and FIG. 2A (VI) illustrates a drawn fiber after annealing with apparent optical transparency.

Non-equilibrium structures such as a square rod with an improvised fill pattern (FIG. 2A (I)), where instead of the rectilinear fill pattern, the infill was also set to follow the perimeters and print in ordered structure, were successfully drawn. The 0° square-based preform draw was successful, and although it deformed slightly, the fiber was still able to retain the shape of the preform. Fibers with dimensions as low as 40 μm×60 μm were successfully drawn and are shown in FIG. 2A, having no delamination of layers. Furthermore, all the layers were consolidated properly. An example of a fiber cross section is shown in FIG. 2A (IV), and images of a fiber before and after annealing are shown in FIGS. 2A (V) and 2A (VI), respectively, where it is shown that the annealed fiber achieves optical transparency.

This experiment indicates that the most successful preforms are the ones printed at 0°, whereas those printed at 90° delaminated during the draw process. The consolidation of layers in the thermal drawn fibers improved as the orientation angle of the 3D printed preform decreased.

Example 2—Effects of Annealing

Multimaterial fiber draw is a complex fluid dynamics phenomenon. Materials with dissimilar viscosities, interfacial energies, and cross-sectional feature dimensions, arranged in a complex geometry are expected to flow in an orderly fashion, such that the fiber cross-section geometry, as it is descending from the preform, is preserved. In reality, there is a number of physical mechanisms, from capillary instabilities to radially non-uniform material flow that challenge this expectation. Though complex geometries are achieved by 3D printing, the anisotropic porosity inherent to the 3D printing process and the resulting anisotropic thermodynamic and mechanical behavior of the preforms during the thermal draw is not considered. Yet, porosity is a specific instance of multimaterial arrangement, thus needs to be considered, in an isolated fashion, for structural deformation effects on the fiber draw process. Indeed, it is apparent that the draw of as-printed preforms is prone to significant structural deformation to the fiber cross-section, as stems from the comparison of preforms to the fibers in FIG. 2I, III, IV. Deformation, in turn, can adversely affect the fiber-device performance in cases where the geometry defines the function. To eliminate the influence of porosity on the drawing process, we have introduced an annealing step to the 3D printed preform prior to the draw, which improved the structural and did not diminish the optical properties of the fibers.

FIG. 3A (I) illustrates a 3D printed preform with non-equilibrium cross-section and thermal draw process, resulting in a fiber that Ia deforms into cylindrical shape when surface tension overcomes the viscous forces during thermal draw of the preform or Ib preserves the cross-sectional geometry of the preform when viscous forces dominate surface tension during thermal draw. Pairs of identical preforms with square cross-sections 1 cm×1 cm×25 cm were printed using polycarbonate (Stratasys PC-10) in an FDM printer (Stratasys Fortus 450mc) at different print orientations. Two types of preforms were investigated for the draw-related deformation effect: those in which the 1 cm×1 cm facet is printed in parallel to the print bed (Orientation A (shown in FIG. 3A (I)), and those in which 1 cm×25 cm is printed in parallel to the print bed (Orientation B (shown in FIG. 3A (I)). The construct layer thickness was 177 μm. One of the resulting preforms in each pair was then annealed at 165° C. in a vacuum furnace for 32 h, and the other one was kept non-annealed for reference. In the course of the annealing process, the preforms were manually rotated by 180° around the preform's longest axis at 8-h intervals to minimize the sag caused by the gravity-induced flow, which becomes non-negligible at such proximity to the glass transition temperature. FIG. 3A (II) illustrates optically transparent annealed and opaque non-annealed 3D printed PC preforms with square cross-section, draw cone after fiber draw, and resulting fiber. As shown in FIG. 3A (II), the fiber preforms are initially opaque but turn optically transparent after undergoing annealing due to the inherent gaps introduced during the printing process. The preforms are then thermally drawn into fibers, as is demonstrated in FIG. 3A (I), (II), while the 1 cm×1 cm facet of the preform is perpendicular to the draw direction. The fibers resulting from annealed preforms are compared to those resulting from non-annealed preforms, as is demonstrated in FIG. 3A (III), for investigation of structural effects of annealing on the fiber cross-sectional geometry.

FIGS. 3A (IIIa) and 3A (IIIb) respectively illustrate non-annealed and annealed 3D printed square preform draw analysis: Progression of thicknesses as a function of position along the draw cone in two cross sectional orientations is labelled as X and Y for both non-annealed and annealed draw cones. The ratio of cross-sectional thicknesses is demonstrated for both cases as function of the position along the drawing cone (Y/X). The error bar (Y∝/X∝) shows the asymptotic ratio derived from the resulting fibers' cross-sections analysis. The insets show optical micrographs of fiber cross sections for the non-annealed and annealed 0° preforms, respectively. The residue of 3D printed structure is evident in the cross section of the fiber drawn from non-annealed preform. The draw of non-annealed preforms printed in Orientation A consistently fails due to layer delamination. Fiber rupture due to layer delamination has been previously known and has been verified here. More importantly, annealing is found to eliminate this effect completely. The annealed preforms printed in Orientation A result is successful large-scale draws, in which the square geometry of the cross-section is preserved by the draw: square preform cross-section yields a square cross-section of a fiber.

A qualitatively different effect takes place in the draw of the preforms printed in Orientation B. Fibers from such non-annealed preforms suffer structural deformation of the cross-section: a square preform cross-section yields a fiber with a rectangular cross-section (FIG. 3A (IIIa)). In the drawing process, the cone section, in which the fiber scales down from the preform, the necking is uneven: the 1 cm wide facet that was printed in perpendicular to the print bed scales down faster than the 1 cm facet printed in parallel to the print bed. This effect may occur place due to the anisotropic porosity inherent to the 3D printing process. The infill is denser in-plane with the print bed, corresponding to the cross-section facet designated as Y in FIG. 3A (IIIa), than along the direction perpendicular to the print bed, designated as X. When heated to become a viscose liquid, the viscosity of the draw cone is non-isotropic. It is denser, and thus more viscous along the cross-sectional direction that was printed in-plane with the print bed, i.e. along Y.

In order to study the effect of annealing on the structural deformation of the fiber cross-section, the cross-section scaling along the draw cones of non-annealed and annealed preforms was analyzed in MATLAB by mapping each cross-sectional facet boundaries alone the draw-cone and calculating the evolution of width ratio of orthogonal cross-sectional facets, i.e., Y/X, alone the draw cone, as shown in FIG. 3A (I). The facet width ratio in the non-annealed preform draw-cone increasingly deviates from unity, as descending from the preform into the fiber. This deviation indicates a reshaping of an initially square preform into a rectangular fiber. Conversely, in an annealed preform draw-cone, this deformation effect is within the error range.

FIG. 3A illustrates optical loss comparison of annealed and non-annealed fibers: A collimated laser beam coming from the left is focused on to fibers drawn from 0° annealed and non-annealed PC preforms, where it can be seen that light is emitted by the fiber sides on both cases. Illuminating spots on a white paper, highlighted with dotted circles, indicate that these fibers transmit light. Higher loss is seen in the annealed fiber, despite expectations that reducing the porosity through annealing would decrease the attenuation. These fibers with high dispersion losses, upon laser coupling, lit up the for the entire length of the fiber. In terms of optical transmission loss, there is not a significant difference between fibers resulting from non-annealed vs. annealed preforms, as is evident from FIG. 3A. Both dissipate the light through the circumference, thus can potentially be utilized as side-illumination fibers.

FIG. 3B illustrates the effect of viscosity in a non-annealed fiber. From the general fiber drawing process, it is known that the length of the cone is function of temperature, because the rate of reshaping is dependent on viscosity. For example, lower viscosity corresponds to faster reshaping, which corresponds to higher temperature. In the non-annealed fiber of FIG. 3B, the cross-section of the fiber indicates faster reshaping in the direction that is perpendicular to the print bed, which in turn means the fiber was squeezed in that direction. The viscosity in x thus was lower than the viscosity in y, because 3D printing has inherent non-isotropic porosity and the porosity in the direction perpendicular to the print bed is higher than the porosity in direction parallel to the print bed, which ultimately leads to deformation of the fiber.

Figure 3C:
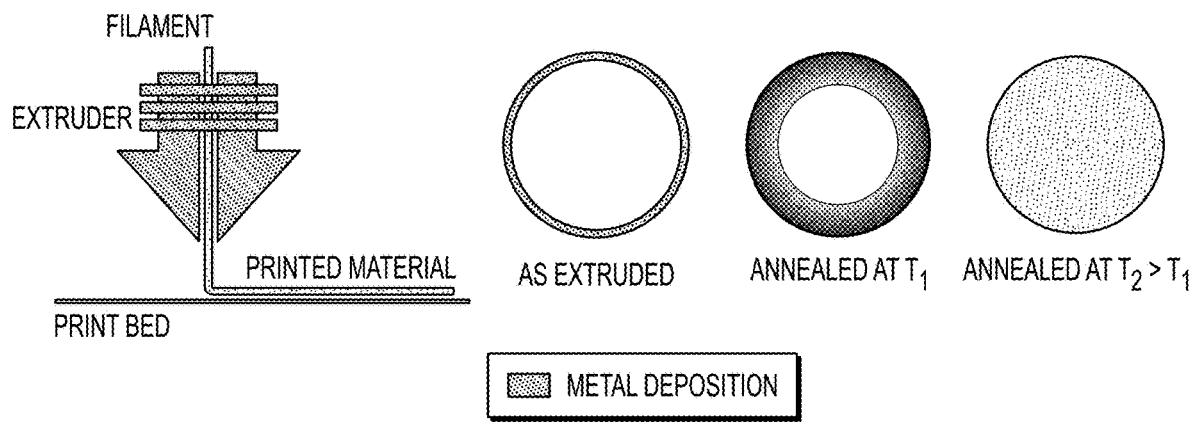
FIG. 3A, FIG. 3B, FIG. C, and FIG. 3D illustrate aspects of the thermal drawing and annealing of 3D-printed preforms in accordance with this disclosure.

FIG. 3C illustrates high dispersion losses in the fibers that may occur due to the presence of metals introduced during the 3D printing process. Since the process of extrusion is done at elevated temperatures, the filament that is extruded from the nozzle is in contact with the metallic nozzle at elevated temperature drags some of the metal from the nozzle at such temperatures. The resulting extrusion line is not entirely pure; instead, its surface is covered with some residues of metal that is dragged from the metal nozzle. When the preform undergoes annealing the metal starts to diffuse into the preform and finally is distributed uniformly around the preform which makes annealed preforms exhibit higher attenuation than non-annealed fibers.

Figure 3D:
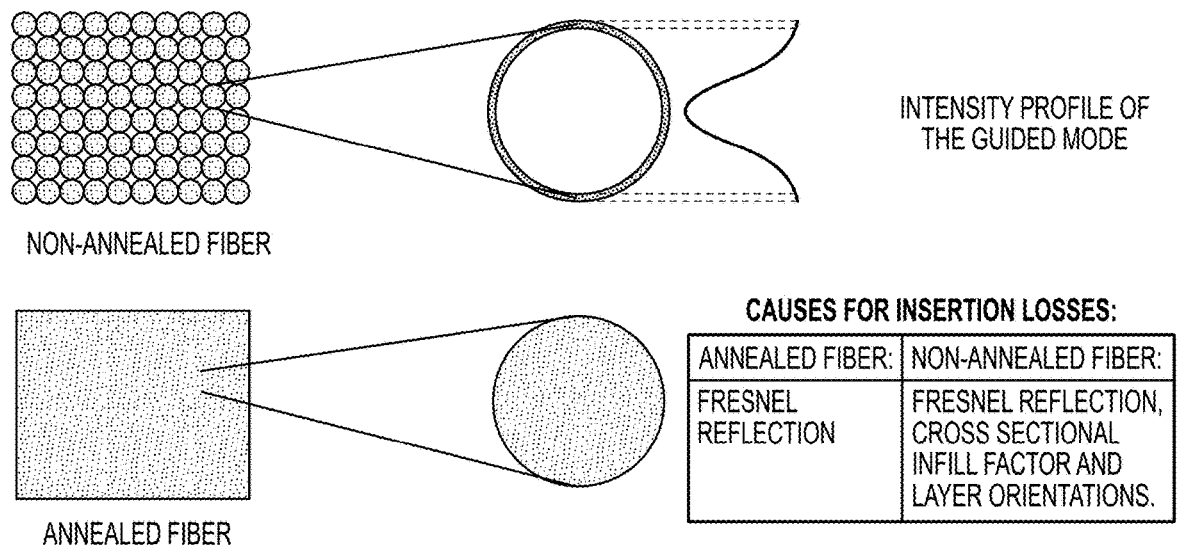

FIG. 3D illustrates, at left, the distribution of the metal from the annealed and non-annealed fibers. In non-annealed fibers, the metal is deposited around the individual filaments in the preform; when a laser is coupled into the fiber, the majority of the field passes through the material free from metal. If each print line is considered as an optical core then the intensity distribution of the guided mode in that optical core will be predominantly in the center of the line as only the tails fill the metal on the circumference. In the case of annealed fiber, however, the field travels through the material with metal deposited all around, which leads to higher propagation losses relative to a non-annealed fiber. In case of insertion losses the annealed fiber has Fresnel reflection losses which account for 4% of the losses. In the case of the non-annealed fiber, other factors (e.g., cross sectional infill factor, layer orientation, and Fresnel reflection losses) all together contribute to higher insertion losses.

This experiment indicates that (1) annealing preserves the cross-section of the fiber; and (2) that although annealing increases the optical transparency, the introduction of metal during the 3D printing process increases optical attenuation in annealed fibers.

3D Printing of Glass Preforms

Beyond thermoplastics, glasses including fused quartz have significant scientific and engineering applications in optics, communications, and electronics. Structured silica fibers could benefit multiple applications, for example dye-less coloration of fabrics for fashion, photonic crystal fibers for optical-chemical detection, or single-mode fibers for telecommunication and tight focusing of light. These fibers are generally fabricated by a 2-step process: the preform fabrication and the thermal draw of the preforms into a fiber. While the draw process is relatively simple and cheap, the preform fabrication, at this point, requires case-by-case treatment, and for each specific preform configuration, a separate technology must be developed and applied.

Figure 4A:
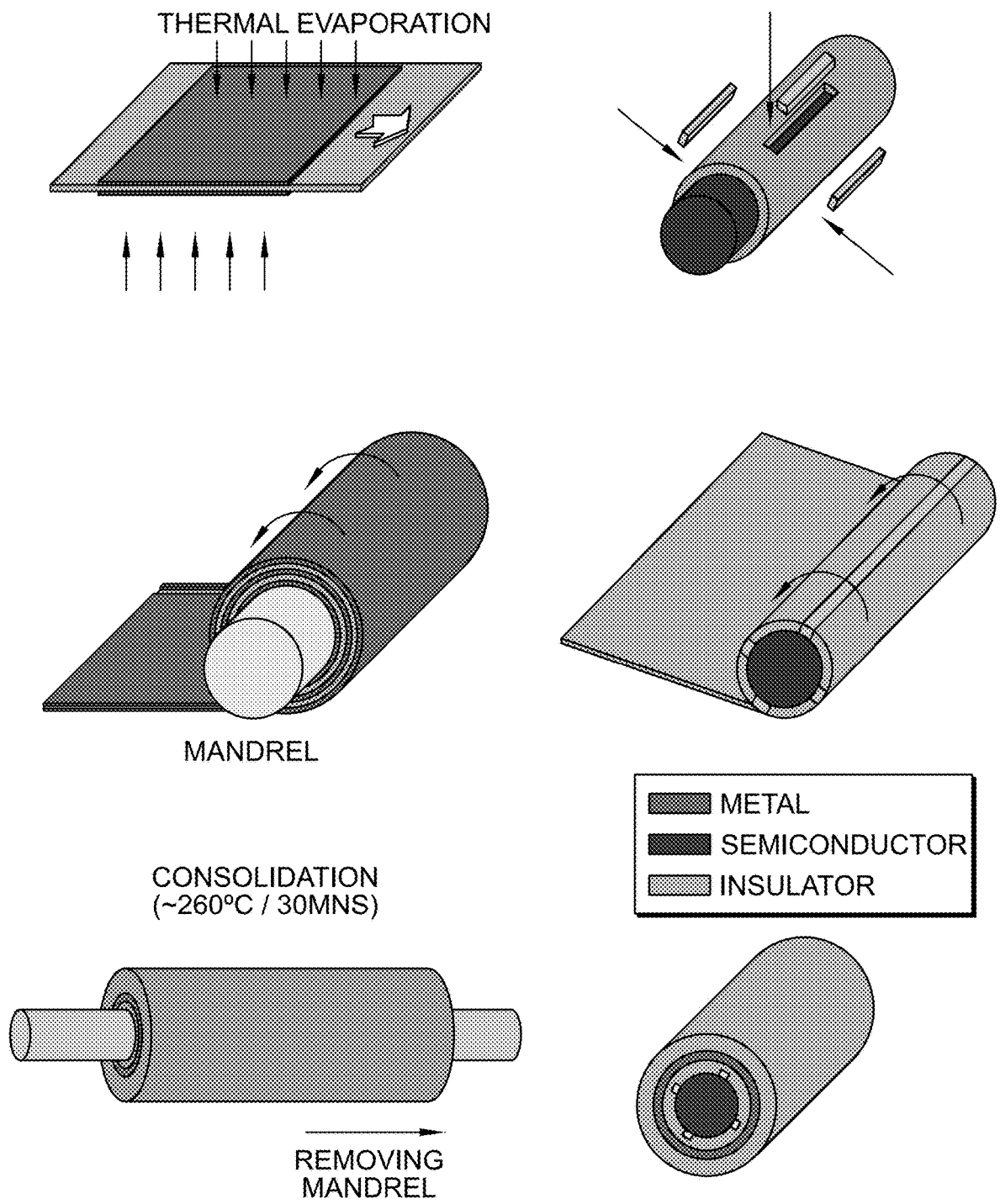
FIG. 4A illustrates aspects of conventional manual methods of assembling multimaterial fiber preforms.
Figure 4B:
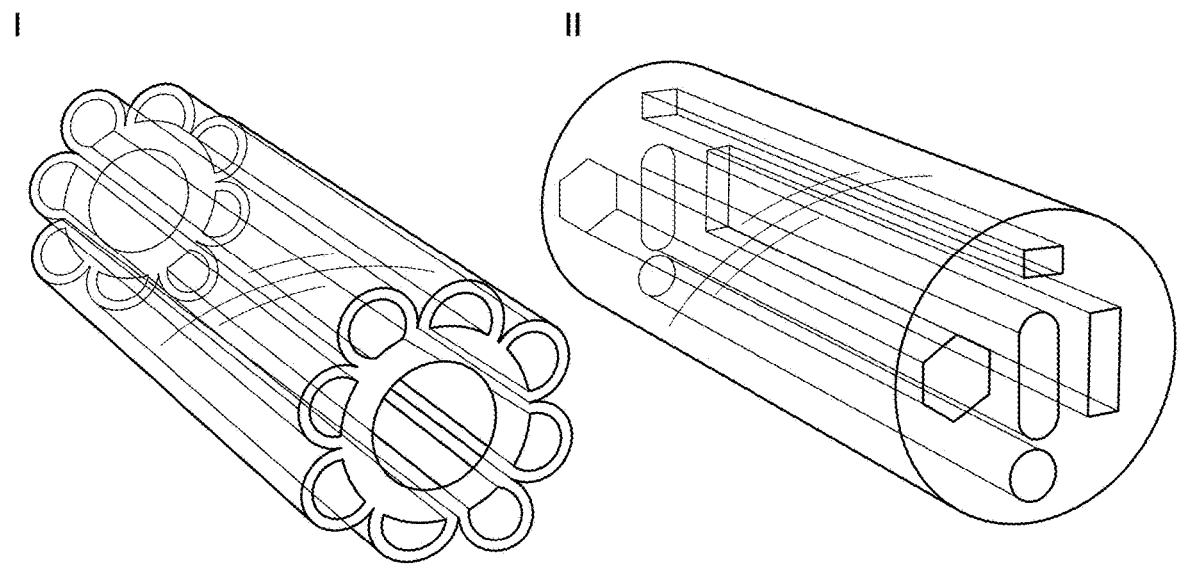

Conventionally, multimaterial fiber preforms are manually assembled, as shown in FIG. 4A, which limits the possibility of obtaining complex fiber geometries. In contrast, 3D printing of preforms may be less labor-intensive, better enable complex, non-equilibrium geometries, and/or cost less than conventional assembly methods. FIG. 4B illustrates computer-aided design ("CAD") models of glass preforms, successfully realized in soda-lime glass with high-precision extrusion-based 3D printing. FIG. 4B (I) illustrates their structure, which mimics blue tarantula hair, where the blue color comes from the structure of the hair itself, not from a dye. The soda-lime glass preform CAD models of FIG. 4B (I) were realized successfully with high precision in extrusion-based printing technology similar to the products described by the company Micron3DP. This material has promising optical properties especially in long wavelengths such as IR making it an interesting candidate for the fabrication of fibers with novel optical functionalities. The preform model shown in FIG. 4B (I) mimics the structure of the blue tarantula hair, similar to the structure presented in FIG. 4B (II). FIG. 4B (II) illustrates a preform model with non-equilibrium cross-sectional geometry (scale bar 1 cm), which is thus prone to reshaping due to surface tension minimization. These models were designed and realized as a verification of the possibility of achieving complex, non-equilibrium preform cross sections. The functional complexity of the fiber device is directly correlated to the complexity of the preform cross section. Thus, 3D printing of preforms represents an advancement of fiber technology beyond the known state of the art.

Since the cladding structure provides mechanical integrity to the fiber during the draw process—being composed of the most viscous material—the efforts described herein have so far been focused on this component of the fiber, with the aim of conservation of the cross-section geometry of the preform. Multimaterial extrusion techniques may also be developed in light of the principles described herein, which will allow the integration of multiple materials monolithically in the same print. Alternatively, the structure may be filled with powdered materials such as Si or Ge. The filled structure can be then sintered in order to obtain the preform. Gumennik et al. have described a similar approach.

One approach to producing a fiber with soda-lime glass as a core material includes printing a suspended-core preform. Suspended-core fibers are of interest for various applications, including sensing and low-loss terahertz guidance, and are typically realized with polymers. In this type of fiber geometry, the core is supported by struts that connect it to the outer layer. After drawing, these structures are reduced to dimensions of the order of the wavelength of interest, in a way that, for the guided light, the effect is that of a suspended core. Monro et al. (Sensing with Suspended-Core Optical Fibers. Opt. Fiber Techncol. 16(6):343-356) have reported suspended-core fibers in various materials such as silica and bismuth glass. They also provide a series of examples of sensing applications of these fibers, particularly in biological and chemical sensing, confirming viability of these fiber geometries.

Figure 4C:
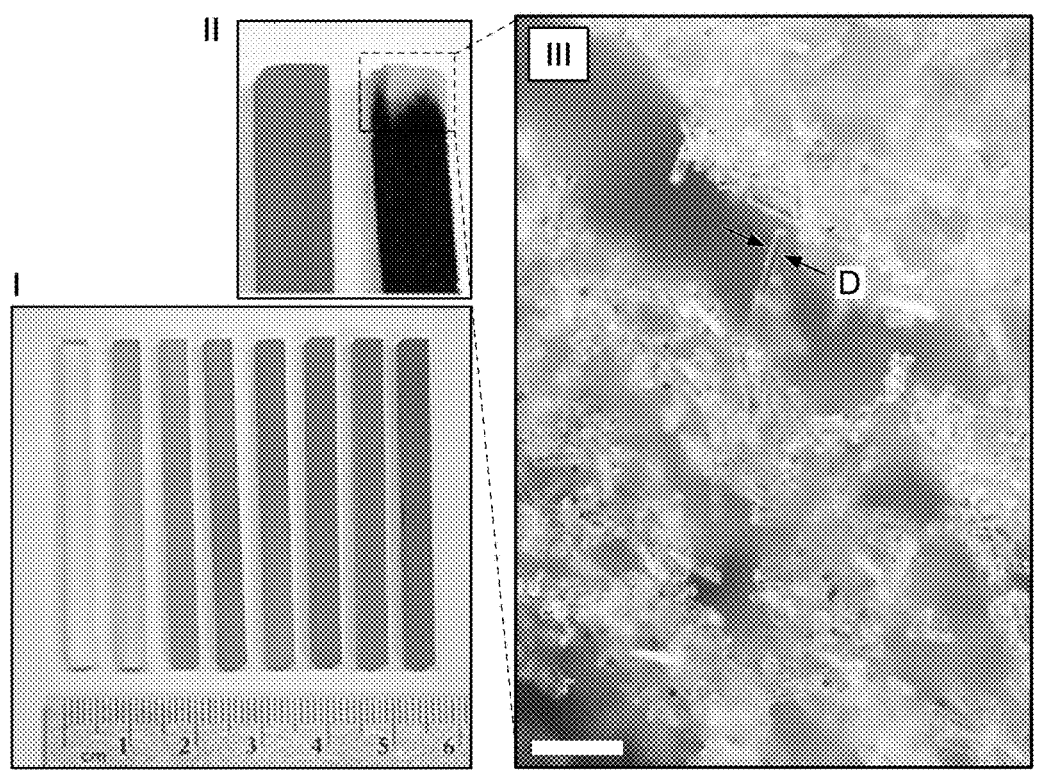

Novel approaches to SLA-based 3D printing of glass using custom resins have been designed using photocurable silica nanocomposite. In one embodiment, glass fiber preforms are fabricated by 3D printing based on off-the-shelf commercial resins. This makes it a cost-effective and simpler method to achieve 3D-printed glass parts using SLA. The SLA printer (Form 2 by Formlabs) operates using a laser with a wavelength of 405 nm to cross-link the resin through the bottom of the vat as the built platform incrementally rises layer-by-layer. That is, the liquid resin contained in the vat solidifies by free-radical polymerization initiated by interaction with the laser beam. In order to obtain glass prints, a mixture of commercial clear resin (Formlabs FLGPCL04 Clear) with 0.79 mm (1/32") borosilicate glass fibers (#38 Fibre Glast) was used for the printing process. This allowed for control of the final print material composition and flexibility in achieving the desired properties of the fiber. The glass fibers were dispersed into clear resin using a magnetic stirrer. The glass was added in small increments and homogenized for around 3 min after each addition. For the printing process, the printer was set to open mode to allow for the use of custom resin. Cuboid preforms of dimensions 4×4×50 mm were printed at 90° orientation. After printing, the parts were immersed in isopropanol for 10 min to remove excess resin, and post cured with ultraviolet ("UV") light for 30 min at 60° C. Cured square-shaped glass preforms with increasing volume ratio of glass fibers mixed into the printing resin (i.e., increasing glass infill from left to right, up to 30% volume) are shown in FIG. 4C (I). The glass preforms shown in FIG. C (I) were printed with SLA technique.

The preforms were then post-processed in order to debind the residual resin and sinter the glass particles, resulting in a part composed entirely of glass. The effects of these processes on the preform are illustrated in FIG. 4C (II), where preforms after curing (left) and after the baking process (right) are shown. In the latter, it is possible to see the black coloration resulting from the baking in an ashing oven, while the tip presents white coloration after debinding. FIG. 4C (III) is an image taken under microscope of the ashed-out section (scale bar 200 µm), where the white coloration is a result of the natural color of the compacted milled fibers in an interconnected porous structure before sintering, where it can be seen that all the resin is indeed baked out of the part, resulting in an interconnected structure formed only by the glass fibers. Moreover, the nominal width of the glass fiber, indicated in the image by d, correlates to the expected values of 16 µm (#38 Fiber Glast).

To obtain these results several parameters should be considered, such as baking temperature and heating profile, in order to control chemical reactions and shrinkage. The thermal debinding of the binder was achieved using an ashing oven. The resulting brown parts were sintered in a high-temperature tube oven. Sintering was performed at a temperature of 1300° C. and pressure of $5 \times 10^{-2}$ mbar, following the prescribed protocol in (Rapp B E, Kotz F, Keller N, Sachsenheimer K, Kirschner N, Nargang T, Richter C (2018) Next generation 3D printing of glass: The emergence of enabling materials (Conference Presentation). Proc. SPIE 10544, Advanced Fabrication Technologies for Micro/Nano Optics and Photonics XI, 1054414). A holding phase at 800° C. was set to evaporate molecular-bound water and surface-bound silanol groups. Sintering under vacuum enhances the optical transparency since it reduces the trapping of air inside the sintered glass part.

After the post processing, the volume and weight of the parts are measured in order to obtain the density. This is then compared to the average density of the print material—composed of the curable resin and glass fiber mixture—which is calculated by:

$$\rho_{avg} = \rho_{resin}(1-\chi_v) + \rho_{glass}(\chi_v),$$

where $\rho_{resin} = 1.17$ g/cm$^3$ is the density of the cured clear resin, $\rho_{glass} = 2.55$ g/cm$^3$ is the density of the milled glass fibers, and $\chi_v$ is the volume ratio of the glass fibers mixed into the resin.

The results are shown in Table 2 below and graphically in FIG. 4D, which is a plot of the printed glass preforms densities (ρ) as function of the volume fraction of glass fibers mixed with resin, along with the average density of the print material.

TABLE 2

Printed parts measurements and expected densities for different volume ratios, as well as measured experimental volume ratios:

| Vol % | Average weight (g) | Density (g/cm$^3$) | Ideal density (g/cm$^3$) | Corrected vol % |
|---|---|---|---|---|
| 0 | 0.94 | 1.17 ± 0.01 | 1.17 | 0 |
| 3.77 | 0.98 | 1.22 ± 0.01 | 1.22 | 3.62 |
| 7.27 | 1.02 | 1.28 ± 0.03 | 1.27 | 7.97 |
| 10.52 | 1.05 | 1.31 ± 0.01 | 1.32 | 10.14 |
| 13.56 | 1.08 | 1.35 ± 0.01 | 1.36 | 13.04 |
| 16.4 | 1.16 | 1.45 ± 0.01 | 1.40 | 20.29 |
| 19.05 | 1.25 | 1.56 ± 0.02 | 1.43 | 28.26 |
| 21.54 | 1.29 | 1.61 ± 0.02 | 1.47 | 31.88 |

Figure 4D:
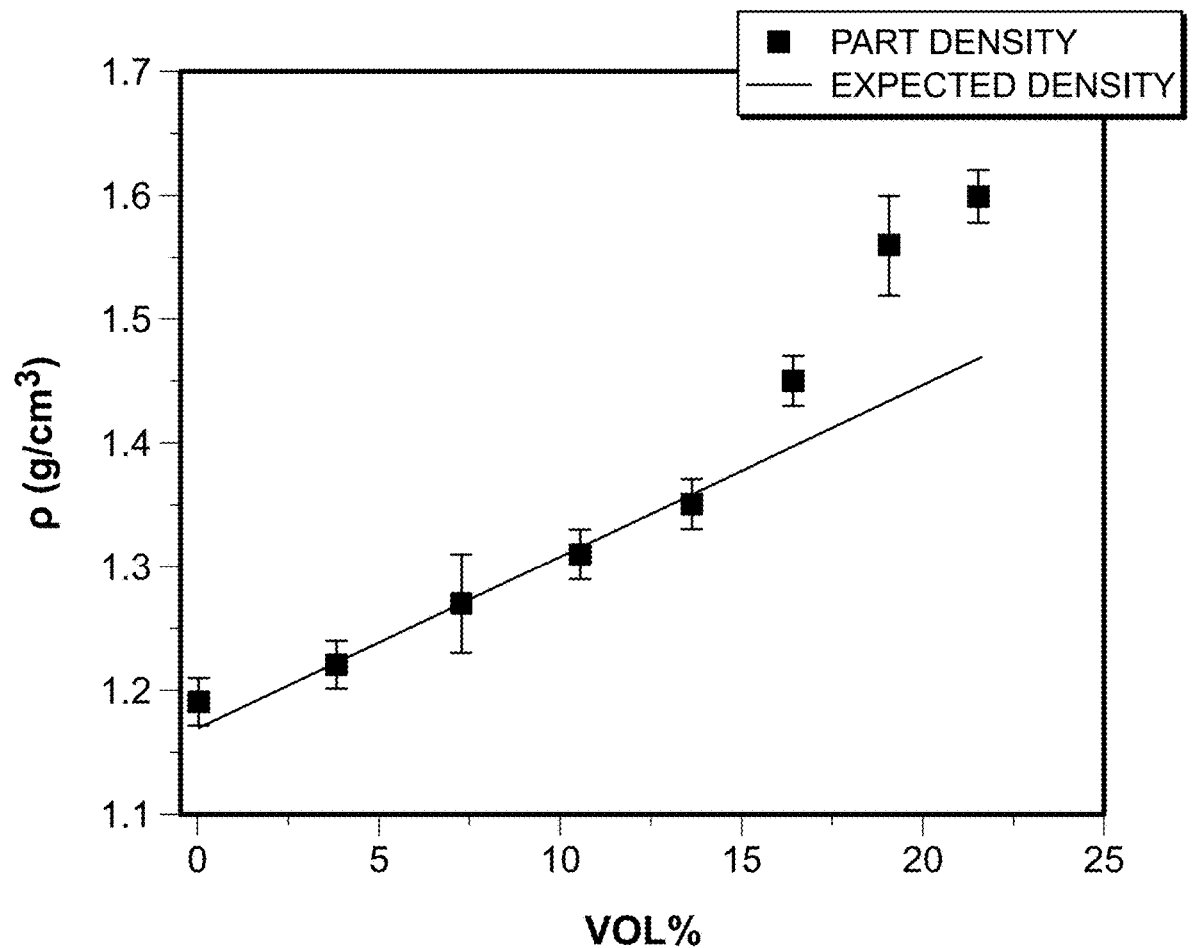

In FIG. 4D, the printed parts density for different volume proportions of glass fiber in the resin, compared to the average density of the print material are presented. For lower volume ratios of glass mixed into the resin, the obtained results fall within the expected values. At higher glass concentrations, however, a deviation from the linear behavior of the ideal density is seen. This is attributed to the sedimentation during the print, which becomes significant at these volume ratios, thus effectively producing higher concentrations of glass in those prints. The printing process happens at the bottom of the tank, where the glass concentration, due to sedimentation is growing constantly during the printing. It begins from (and above) the initial uniform concentration that should fall on the calculated curve. Table 2 shows that at 21.54 vol % milled glass fibers infill parts, the measured density was 1.61 g/cm$^3$, which means the actual volume proportion is 31.88 vol %. During the experiment process, a sample with actual 34.78 vol % milled glass fibers infill was gotten. This result was not far away from the 37.5 vol % silica infill fabricated by others in which a custom resin was developed, in contrast to the commercial resin used in this work.

Once a preform is thermally drawn, the result is a long, thin fiber in which the cross section is preserved, as shown in FIG. 1A (III) and described above. In the case of a fiber with one or more cores, these are axially patterned through a spatially coherent, material-selective capillary breakup process, shown in FIG. 5. While another model knowns as the Tomotika model explores the formation of periodic instabilities in an infinite, uniformly heated cylinder of fluid, accounting for the effects of the surrounding fluid, propagating Rayleigh instabilities introduces the concept of front propagation. Although several examples of mathematical treatments of capillary instabilities can be found in literature, these works mostly focus on isothermal regimens. The present disclosure accounts for the propagation of thermal gradient and the gradient of viscosity. It is probably closer to the marginal instability criterion-driven process, as mentioned in Powers et al. (Powers et al. (1998) Propagation of a topological transition: the Rayleigh instability. Phys Fluids 10(5):1052-1057.) By combining both the computational and experimental results, a mathematical model for the fiber breakup via axial thermal gradient phenomena is established in the present disclosure.

Figure 4E:
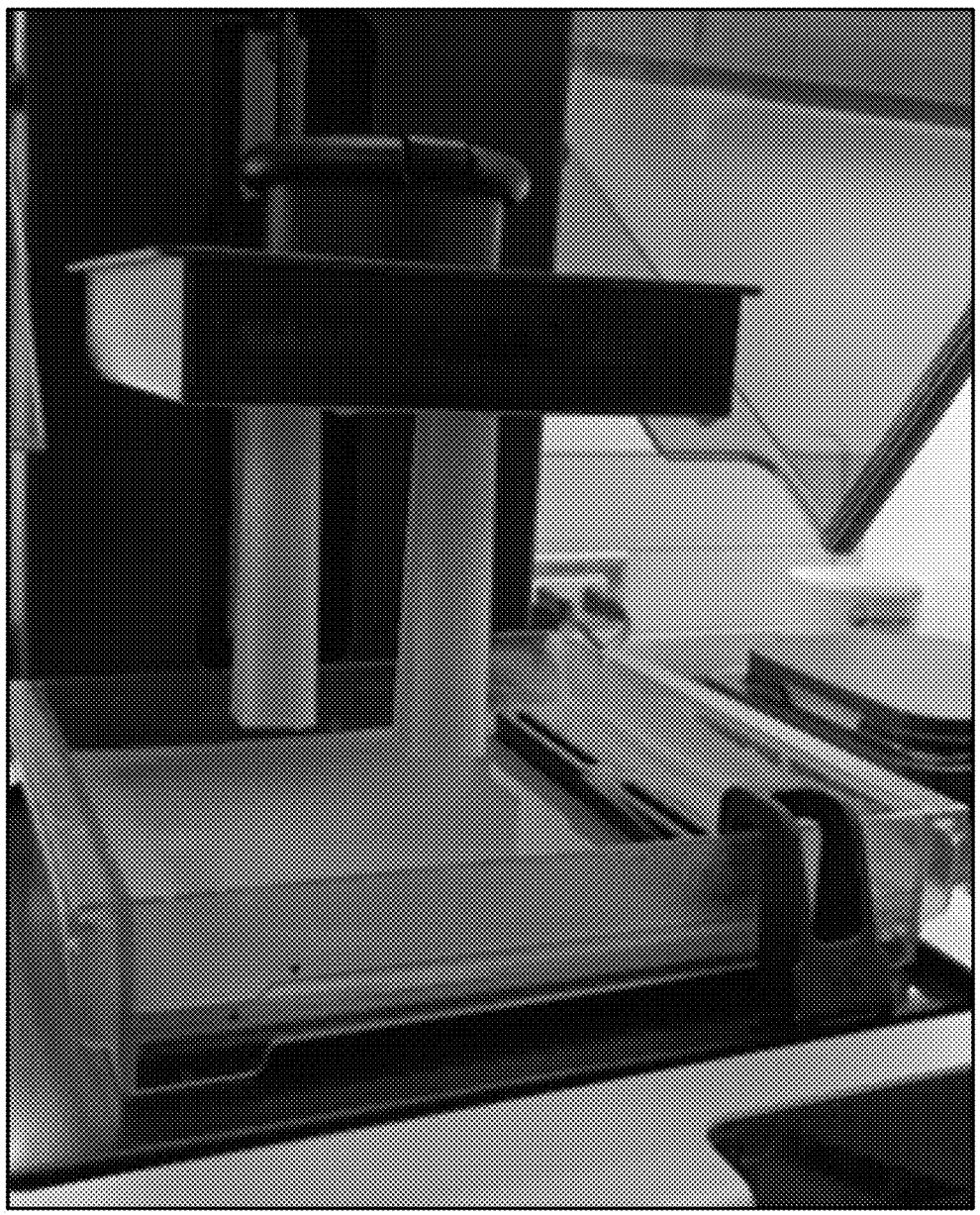
Figure 4F:
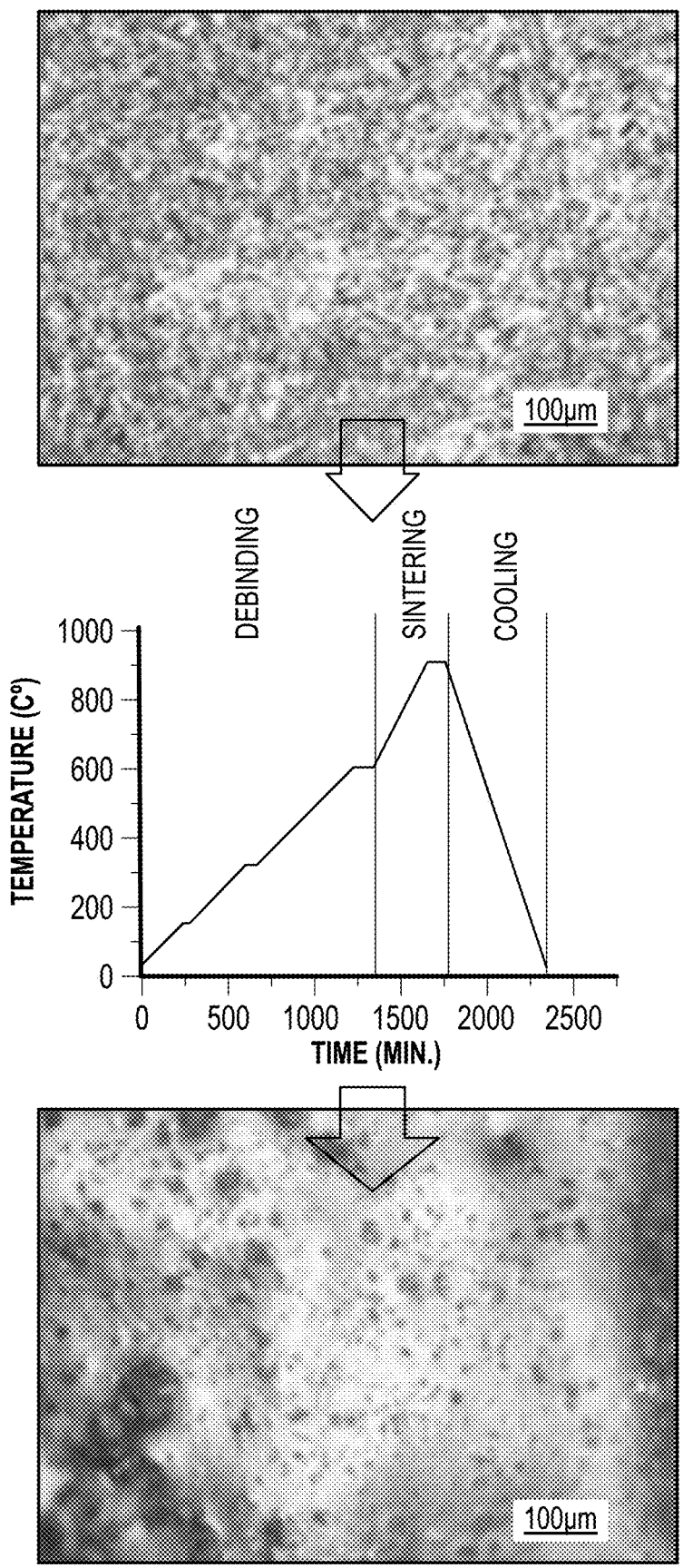

FIGS. 4E-4G illustrate another example of morphology achieved through sintering of preforms and the result of selecting values of the preform's dimensions at the 3D-printing stage that account for sagging that occurs during sintering, to arrive at desired post-sintering preform dimensions. FIG. 4E illustrates two as-printed glass preforms, which in some instances may be up to 17 cm in length and 4 cm in width. FIG. 4F illustrates morphology of the preform achieved through sintering via thermal treatment of the printed preform to burn out the polymer and to sinter the remaining glass, with the as-printed morphology of the preform shown in the top panel of FIG. 4F (milled fibers visible) and the post-sintering morphology in the bottom panel of FIG. 4F (illustrating densified class). The center panel of FIG. 4F illustrates the debinding, sintering, and cooling temperatures applied across time to achieve the densified glass of the processed preform shown in the bottom panel of FIG. 4F. FIG. 4G (I) illustrates shrinking and sagging of the preform that can occur under gravity as the material of the preform is heated above its softening point (e.g., ~650° C. for borosilicate glass). As can be seen in the right panel of FIG. 4G (I), the sintered preform has shrunk and sagged, losing its square-shaped cross section in the process. To address this, values of the dimensions of the as-printed preform (e.g., length, width, height) may be selected to compensate for shrinking and sagging of the preform during sintering. For example, as shown in the left panel of FIG. 4G (II), the as-printed preform has a trapezoidal cross section, which is wider at the top, such that when it sinters, the preform sags into the desired square shape. In this manner, the desired size and shape of the preform can be obtained despite changes that occur during sintering.

FIG. 5 illustrates capillary breakup. FIG. 5A (I) illustrates a fiber section showing Si spheres formed through capillary breakup (scale bar 0.5 µm). FIG. 5A (II) is an image of a single sphere depicting shape quality (scale bar 100 nm), from Gumennik et al. FIG. 5B (I) illustrates an example of metal-semiconductor-metal photodetecting device in a single silica fiber before (FIG. 5B (I)) and after (FIG. 5B (II)) the breakup process, from Wei et al. FIG. 5C (I) illustrates breakup of a double-core fiber into bi-spherical clusters (scale bar 100 µm), from Gumennik et al. FIG. 5C (II) is a schematic representation of the process shown in FIG. 5C (I), with p- and n-type cores shown in blue and red, respectively.

The capillary breakup simulation focuses on the stationary regime. The present disclosure analyzes how instabilities first develop in an initially stationary fiber subjected to a thermal gradient. This process is analogous to the initial step of the capillary breakup experiments performed by Gumennik et al. (Gumennik et al. (2013) Silicon-in-silica spheres via axial thermal gradient in-fiber capillary instabilities. Nat Commun 4:2216), where a silica fiber with a 4-µm-thick Si core is fed through the hot zone of a hydrogen-oxygen flame at flows of 0.3 and 0.1 L/min, respectively. Although the maximum temperature achievable with this type of torch can reach up to 2800° C., the maximum temperature experienced by the fiber must be below the Silica boiling point of 2230° C. Considering that the flame width is between 3 and 3.5 mm and that the fiber has a diameter of about 300 µm, it is easy to understand why it is not feasible to experimentally measure the temperature gradient to which the fiber is exposed. Furthermore, the dynamic nature of the breakup process and the fact that it involves multiple materials with varying emissivities further adds to the complexity of the problem, while the fiber's high aspect ratio and sharp viscosity ratios render the numerical simulation of the full Navier-Stokes equations computationally challenging.

Figure 6C:
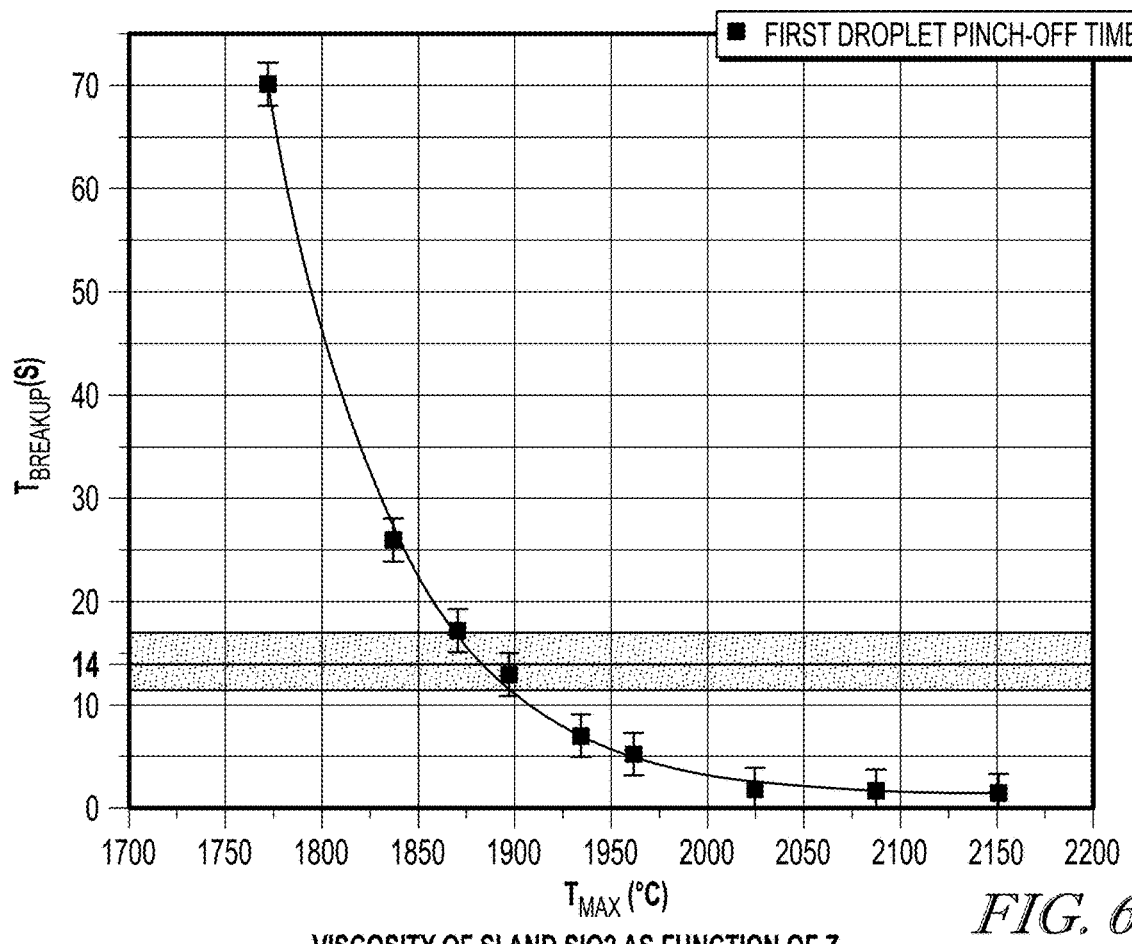

FIGS. 6A-6D illustrate capillary breakup simulations. FIG. 6A is an image of the simulated Si core during the first droplet formation, right before the pinch-off for $T_{max}=1900°$ C. Color scale represents surface velocity (scale bar=50 µm). In the simulations described herein, (using COMSOL Multiphysics® 5.3a, with its Microfluidics and Heat Transfer modules) as shown in FIG. 4A, an axisymmetric fiber with radius $r_{fiber}=140$ µm is assumed, and a fiber composition of a thin Silicon core ($r_{core}=2$ µm) enclosed in a silica cladding is assumed. FIG. 6B is a snapshot of fiber breakup experiment recording just after the first droplet pinch-off, indicating a breakup time of 14±3 s (scale bar=60 µm). Initial heat transfer simulations showed that a fiber length of 15 mm is sufficient to ensure that the fiber extremities remain at room temperature, thus avoiding influence from the boundaries to the breakup process. Through the sweep of different parameters such as heat source length and distance to the fiber surface, as well as power, the changes produced in the breakup behavior is observed. This enables the collection of information about the temperature gradient. The breakup period and speed are important parameters. These are compared to experimental results and used for the refinement of the simulations.

The simulations are performed in two steps: first, the steady-state temperature profile is calculated for different heat source powers, in order to achieve the desired maximum temperature $T_{max}$. The results are then exported to a time-dependent fluid-flow simulation, where the Navier-Stokes equation is solved with time steps of 0.05 s, from 0 s until the first droplet pinch-off ($t_{breakup}$), which is dependent on $T_{max}$, as can be seen in FIG. 6C. FIG. 6C depicts breakup time $t_{breakup}$ for different values of $T_{max}$. The exponential dependence of $t_{breakup}$ on $T_{max}$ is evident, a behavior that is expected due to the dependence of $t_{breakup}$ on the core's viscosity, which in turn depends exponentially on the temperature. The shaded rectangle encompasses the temperature range compatible with this breakup time-scale where $t_{breakup}$ is plotted for different values of $T_{max}$. It is possible to observe that $t_{breakup}$ has an exponential dependence on $T_{max}$, which is expected since $t_{breakup}$ is proportional to the core's viscosity, which in turn is exponentially dependent on the temperature.

The relevant parameters used in these simulations are listed in Table 3 below.

TABLE 3

List of parameters used for numerical simulations

| Parameter | Expression | Value |
| --- | --- | --- |
| Core radius | $r_{core}$ | 2 µm |
| Fiber radius | $r_{fiber}$ | 140 µm |
| Fiber length | $h_{fiber}$ | 15 mm |
| Thermal conductivity of Si | $k_{Si}$ | 149 W/mK |

TABLE 3-continued

List of parameters used for numerical simulations

| Parameter | Expression | Value |
|---|---|---|
| Thermal conductivity of SiO$_2$ | k$_{SiO2}$ | 1.3 W/mK |
| Si—SiO$_2$ surface tension coefficient | σ$_0$ | 1.5 N/m |
| Air-SiO$_2$ surface tension coefficient | σ$_1$ | 0.75 N/m |
| Si tangent coefficient of isothermal expansion | α$_{Si}$ | 2.5 × 0$^{-6}$K$^{-1}$ |
| Softening temperature of SiO$_2$ | T$_S$ | 1710° C. |
| Melting temperature of Si | T$_m$ | 1414° C. |

Preliminary simulations indicate that the phase transition of the Si core has no significant influence on the steady-state temperature pro le obtained, neither on the subsequent fluid-flow simulations since, in the entire region where the capillary instabilities occur, the temperature is higher than the melting point of Si. Therefore, in order to maintain the model as less computationally intensive, a core of liquid Si was simulated as a first approximation.

Figure 6D:
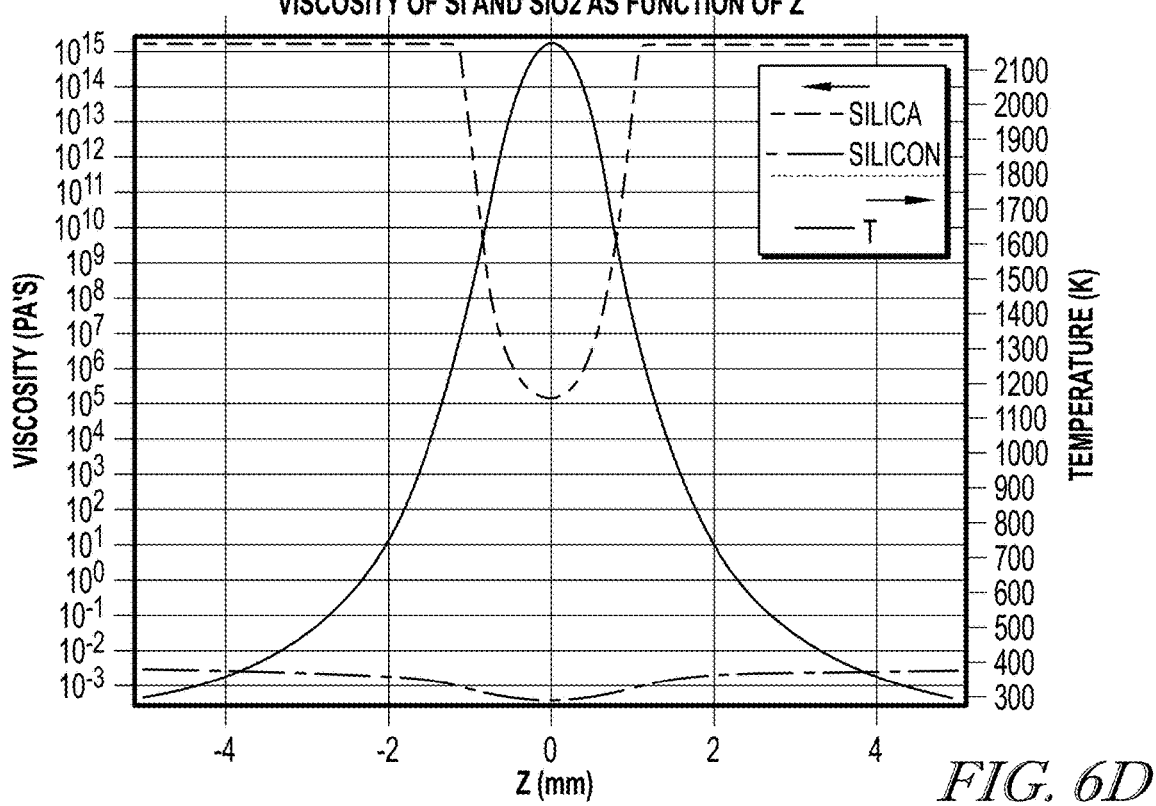

Moreover, although a fully coupled heat transfer and fluid-flow simulation is preferable, it is considered that the effects of coupling bring second-order corrections to the solution, and thus, can be neglected at this stage. An image of the simulated core during the first droplet formation, right before the pinch-off, is shown in FIG. 6C, for T$_{max}$=1900° C. A plot of the densities of silica and silicon, as a function of the axial position (in the simulation, the z-axis) for this particular simulation, is presented in FIG. 6D with the temperature profile over-imposed. FIG. 6D depicts Si core and SiO$_2$ cladding viscosities as a function of axial position, with temperature pro le over-imposed, for T$_{max}$=1900° C.

The results outlined in the present disclosure allow for the definition of the ranges of viscosities for which the time scales for breakup are comparable to those observed experimentally, thus assessing qualitatively the temperature profile imposed on the fiber. FIG. 6B shows a snapshot of a fiber breakup experiment recording just after the first droplet pinch-off, at the frame corresponding to t=39 s. Since the resolution of the images before this frame is not ideal, judging on the basis of the symmetry of the breakup behavior, it is possible to assess that the pinch-off of the first droplet occurs at t=35±3 s, which translates to a breakup time after the temperature steady-state regime is achieved, of 14±3 s. The shaded rectangle in FIG. 6C encompasses the temperature range compatible with this breakup time-scale, from which it can inferred that the maximum temperature to which the fiber is exposed is 1885±15° C. With the collection of statistics on the breakup behavior, a procedure for the temperature measurement of the process is developed. Such procedure is otherwise unattainable by conventional means.

Figure 7A:
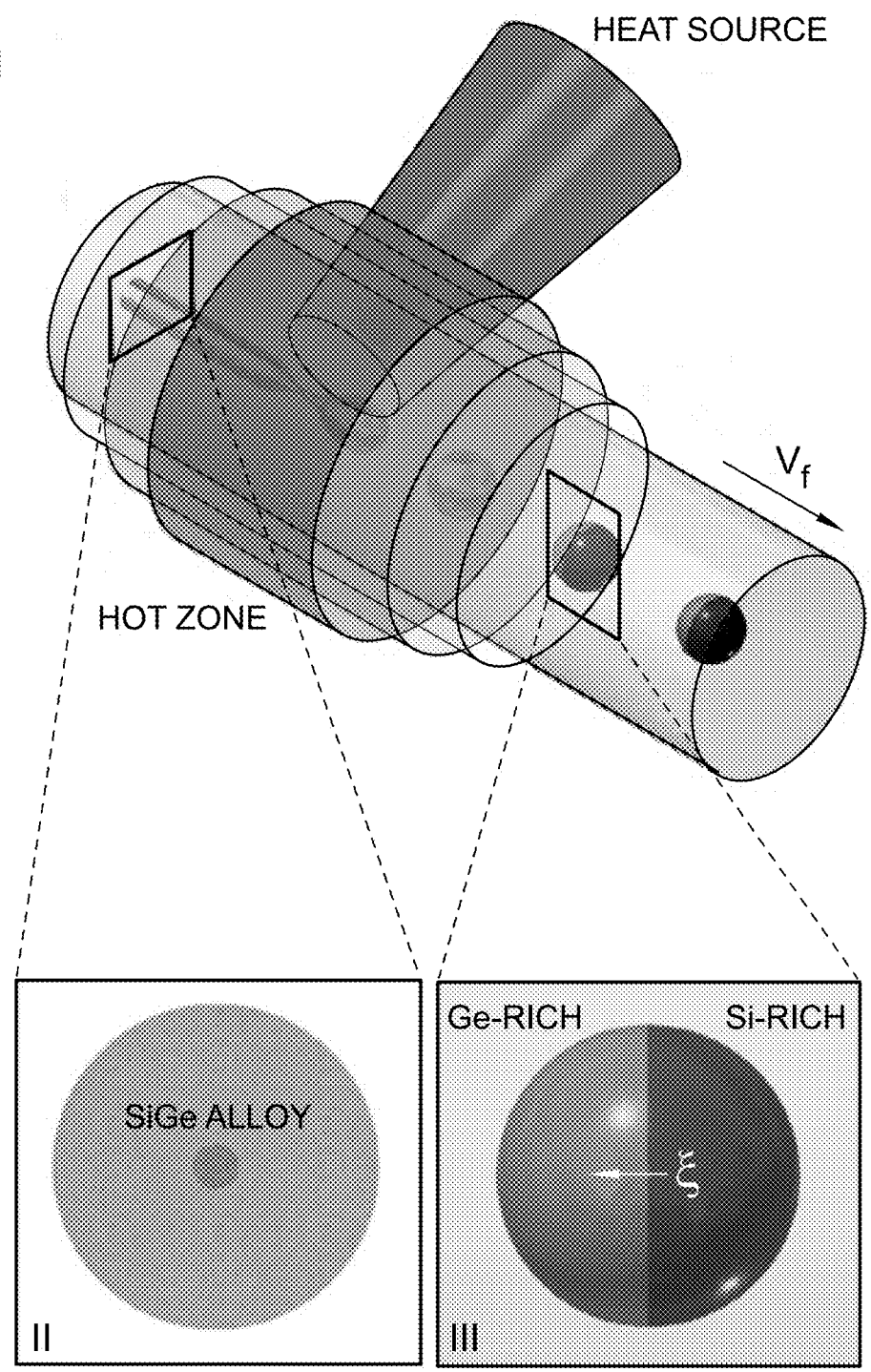
FIG. 7A and FIG. 7B illustrate aspects of segregation control of doping in post-breakup semiconducting particles in accordance with this disclosure.
Figure 7B:
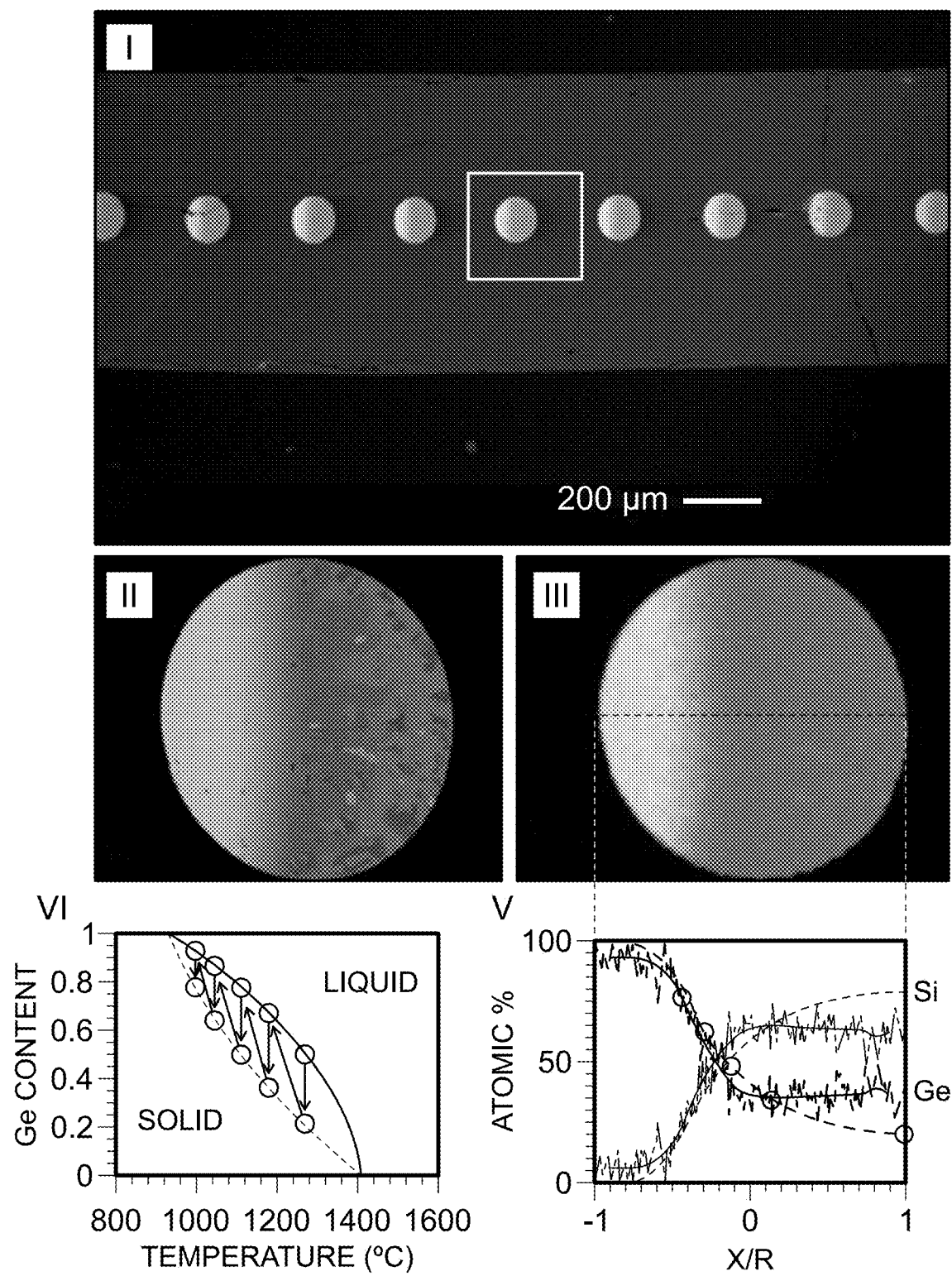

FIG. 7 illustrates segregation control of doping. FIG. 7A (I) is a schematic illustration of the segregation-driven control of doping in post-breakup semiconducting particles. Details: cross section of a Ge-rich Silicon continuous core in silica fiber (FIG. 7A (II)) and post-breakup schematic drawing of doping-segregated sphere, or Janus particle, with the Ge-rich side indicated in green (FIG. 7A (III)). FIG. 7B (I) is a Scanning Electron Microscope image in backscattered mode of the fiber, polished along its axis, showing an array of Janus particles. FIG. 7B (II) illustrates detail of single Janus particle cross section. FIG. 7B (III) is an energy-dispersive X-ray spectroscopy map of a Janus particle, indicating non-homogeneous distribution of Ge along the cross section, from overlaid maps of Si (in red) and Ge (in green). FIG. 7B (IV) is a Si—Ge equilibrium phase diagram, depicting liquidus (solid line), and solidus (dashed line). FIG. 7B (V) is diagram depicting SiGe atomic content distribution along the dashed line in FIG. 7B (III). (From Gumennik et al.).

Figure 1E:
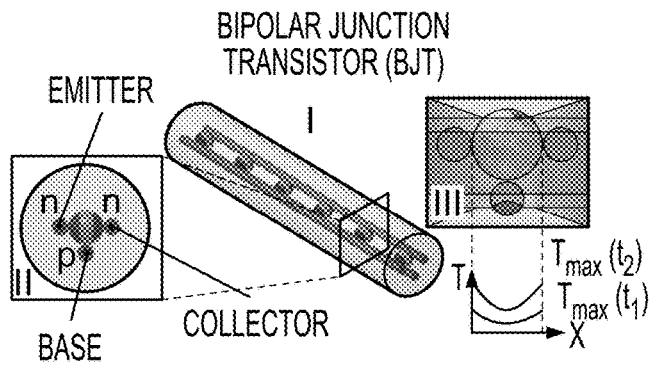

Thus, segregation-driven control of doping in post-breakup semiconducting particles is attainable, allowing to control an individual device's internal architecture. It is possible to control the structure of a single sphere, as shown in FIGS. 7A and 7B. When the droplet is exiting the flame, it experiences a thermal gradient: it is colder on the end distant from the flame, and consequently, it is expected to solidify laterally, starting from the colder side. If the sphere is doped with a material that is more soluble in a liquid than in a solid, this dopant will be repelled into the liquid as the solidi cation front propagates, collecting predominantly on the hot side. This effect is shown schematically in FIGS. 1C and is used to synthesize structured particles, composed for example of Ge-rich Si, (as shown in FIG. 7A). Starting with 50:50 Si—Ge mixture in the fiber core, after the breakup the sphere will solidify, such that the Ge is extruded into the melt as the solidification evolves, leading to anisotropic distribution and resulting in axially oriented Janus particle heterojunctions. This method is useful in assembling complex fiber-embedded devices such as heterojunctions, as shown in FIGS. 1D and 1E.

Example Applications of Functional Smart Fibers

Example Biomedical Application

Biomedical applications for fibers produced according to the methods described above will now be presented. It should be understood that the following applications are exemplary in nature and in no way limit the many potential applications, medical and non-medical, of the fibers described herein.

Fiber technology is frequently utilized in various biomedical applications as chemical, biological, and physical sensors. For example, fiber-embedded sensors have been designed to monitor physical parameters such as stresses, temperature, pressure, and humidity or chemical parameters such as pH level, oxygen concentrations, and carbon dioxide concentrations. Fiber bundles advantageously may be used to embed multiple sensors together in a single system and in increasing signal reception levels, resulting in higher signal-to-noise ratios in such applications.

Lightness, flexibility, and unique optical properties are the main characteristics that lead the demand for fiber sensors in biomedical studies. To meet clinical usage requirements, preforms must be fabricated from biocompatible, non-toxic, and chemically inert materials to prevent immune reaction from the patient. Examples of smart fiber development include a neural fiber probe composed of a polymer and metal core composition that enables flexibility and bending stiffness of the neural probe as it provides in vivo optogenetic stimulation and delivers drugs as an input in order to record feedback electrical and physiological output signals. Another example is a fiber integrating microfluidic principles with complex cross-sectional geometries and meter-long microchannels which analyzes cell separation by dielectrophoresis. Live and dead cells are separated by inertial and dielectrophoretic forces by sheathless, high-throughput microfluidic cell separator which contains conductive materials in the microchannels.

Figure 8:
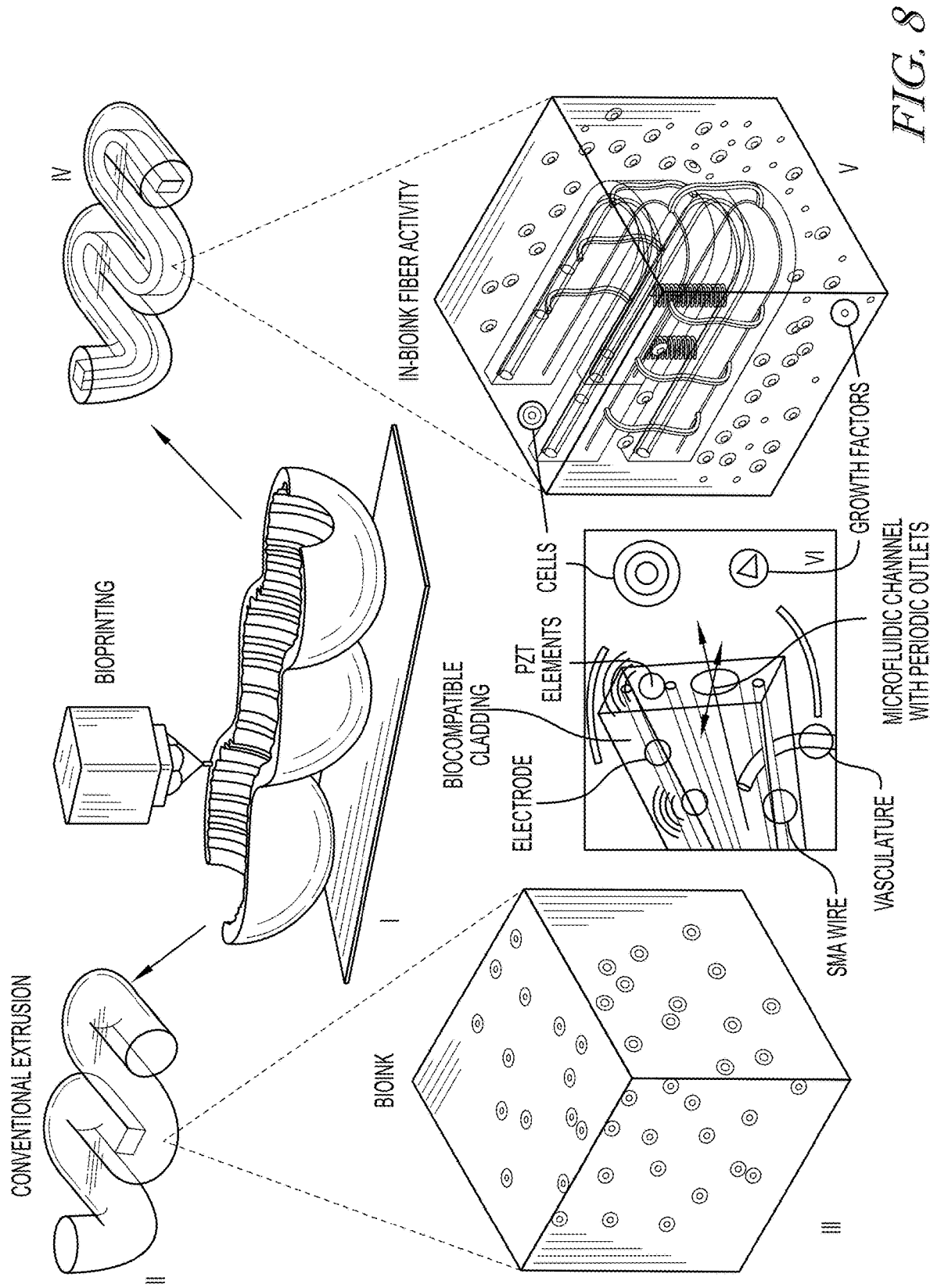
FIG. 8 illustrates an example biomedical application of the fibers described herein in accordance with this disclosure.

Smart fibers also may be used in the design of biosynthetic tissues to address challenges in tissue engineering and may enable a better understanding of the tissue climate and environmental growth. FIG. 8 illustrates biological interfacing of smart fibers with other components of biosynthetic tissue as compared to conventional biosynthetic tissues that do not contain smart fibers. FIG. 8 (I) illustrates three-dimensional bioprinting of a tissue. With today's progress in tissue engineering, a variety of functionalities can be integrated in bioinkcoated fibers co-extruded using a bioprinter for tissue fabrication, as shown in FIG. 8 (I). Traditionally, bioprinting research aims at creating tissue grafts for regenerative medical practice and does so by carefully designing the hydrogel (FIG. 8 (II)) with the appropriate nutrition and signaling molecules for the type of cells required based on the application (FIG. 8 (III)). However, tissue engineering is very challenging to study as the whole biology of the system completely changes microseconds after the experiment has been launched. Monitoring and regularly tuning a tissue's maturation remains very complex.

To address these issues with tissue engineering, smart fibers, produced in accordance with the present disclosure, may be embedded in the design of biosynthetic tissue to provide a better understanding of the climate and environmental growth in the biosynthetic tissue. This may be accomplished via novel coaxial microextrusion of biointerfacing fiber coated in bioink as shown in FIG. 8 (IV). FIG. 8 (V) is a close-up view of fiber where biointerfacing occurs: epithelial cells and vascular epithelial growth factors are excreted from different microchannels and result in cellular self-assembled vasculature between two orifices; piezoelectric elements measure surrounding cell density by ultrasound; and shape memory alloy wires provide peristaltic motion in the tissue. The embedded fibers of this example application may provide multiple functionalities, as shown in FIG. 8 (VI), such as inducing vasculogenesis, ultrasonic imaging, peristaltic movement, and microfluidic flow. Control of the microenvironment takes place via the fibers hooked to syringe pumps and wired to an analytical software. In this manner, the fibers produced in accordance with the present disclosure may enable monitoring and tuning of the microenvironment within biosynthetic tissue, thereby enabling growth and maturation of the tissue.

Example Aerial and Aquatic Surveillance Application

In modern maritime warfare, imaging and transducing systems are stand-alone, well-delineated components, with fixed performance figures, such as sensitivity, signal intensity, and resolution, occupying valuable space on board, or as a towed component. Their localized nature makes them vulnerable to attack. The proposed research, enabled by VLSI-Fi, leads to nanostructured sensing and transducing textiles that coat like a second skin, allowing a conceptual shift from stand-alone systems towards amorphous, conformal, distributed systems characterized by an areal density of performance, scaling with the area of a textile. These systems can be seamlessly integrated into external coatings of the existing vehicles, such as ships, helicopters, aircrafts, and tanks, in a manner resembling the integration of a tactile sensory layer into a multi-layered epidermis. As distributed systems, they would be hard to target: to eradicate such systems the entire outer surface of the vessel would need to be destroyed. Additionally, imparted with energy generating capabilities, these textiles can form autonomous surveillance systems, freely drifting in the form of "fishnets". The cost of such sensory textiles, when produced in bulk, is driven mostly by the energy consumed in their fabrication, converging towards single cents per square foot.

For example, an ultrasound textile transducer would turn the whole outer surface of a vessel below the waterline into sonar. An optically-sensing textile that coats surfaces above the waterline would form an aerial surveillance system and could be used for atmospheric turbulence imaging through scattered laser sensing, improving the collection of environmental information critical for coordinated SEAD operations. Additionally, textiles for magnetic gradiometry could become a universal marine activity detector, identifying dynamic anomalies in Earth's magnetic field lines. Nautical mines, ships, and submarines, made of ferro- or paramagnetic materials, deform magnetic field lines, creating detectable deviations against the background field. Furthermore, even the movement of non-metallic bodies is in principle detectable in oceanic water because its salinity induces ionic currents accompanying local aqueous streams created by the movement of such bodies. These ionic currents, if pronounced enough, subsequently induce detectable magnetic fields, usually on the nT scale. Finally, imparting piezo-generating properties to textiles with the sensing and transduction capabilities described above would allow turning them into autonomous surveillance "fishnets", suspended in water and converting the mechanical energy of waves into electricity powering the sensors and transducers. The piezo-generating textiles power lightweight radio frequency (RF) transmitters to communicate the collected data to a coastal standoff hub. As described herein, fibers with piezoelectric cores can also provide shape detection. Textiles made of such fibers that coat jet wings would provide real-time data on their deformation and creep under stress during flight.

Figure 9:
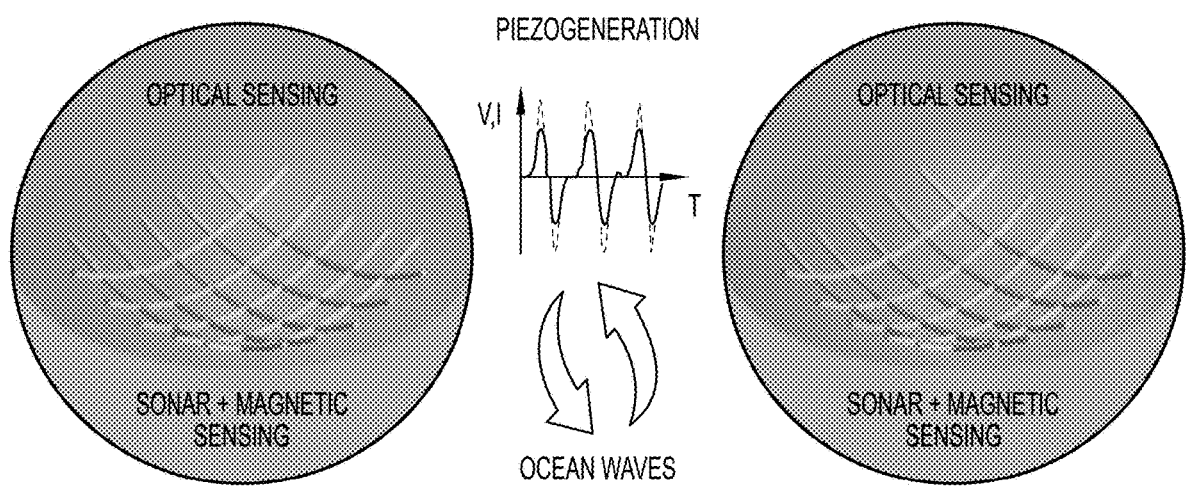
FIG. 9 is a conceptual schematic of the principle of operation of an autonomous 4π-solid angle double-hemisphere surveillance fishnet in accordance with this disclosure.

This approach enables a complete system for aerial and aquatic surveillance realized in the form of drifting fishnets, sensing the whole $4\pi$ of solid angle, in which all functionalities are woven into a single piece of fabric floating on the water surface, as is schematically depicted in FIG. 9. FIG. 9 is a conceptual schematic of the principle of operation of an autonomous $4\pi$-solid angle double-hemisphere surveillance fishnet. Such a system may comprise four interwoven components:

1) "Electrooptic Fishnet" imaging the aerial hemisphere;
2) "Sonar Fishnet" imaging the underwater hemisphere;
3) "Magnetic Gradiometer Fishnet" remotely sensing water currents; and
4) "Piezogenerating Fishnet"—autonomous power-supply for sensing and transduction systems.

Electrooptic Fishnet: FIG. 10 illustrates aspects of an electrotroopic fishnet. FIG. 9A illustrates a coherent selective breakup assembly on pn-diodes contacted in parallel by metallic buses, in accordance with the smart fiber manufacturing methods described above. FIG. 10B illustrates a data retrieval scheme for imaging via an electrooptic fishnet. FIG. 10C provides schematics of the deployment of an imaging setup comprising an electrooptic fishnet, utilizing a Fresnel zone plate imprinted on a transparent fabric as an imaging objective.

Figure 10A:
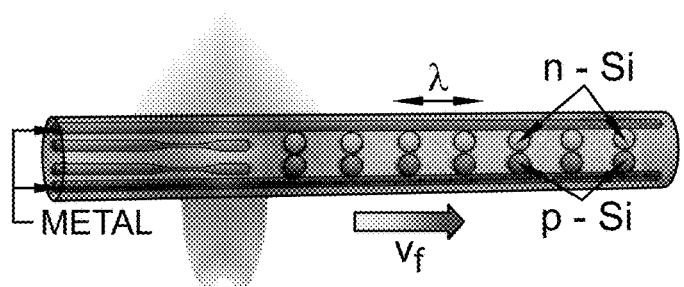
FIG. 10A, FIG. 10B, and FIG. 10C illustrate aspects of an electrooptic fishnet in accordance with this disclosure.
Figure 10B:
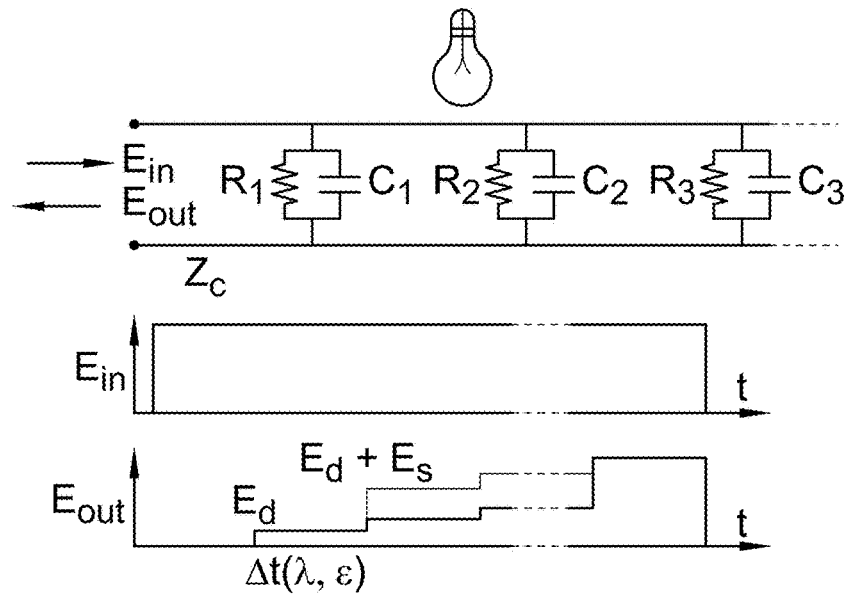
Figure 10C:
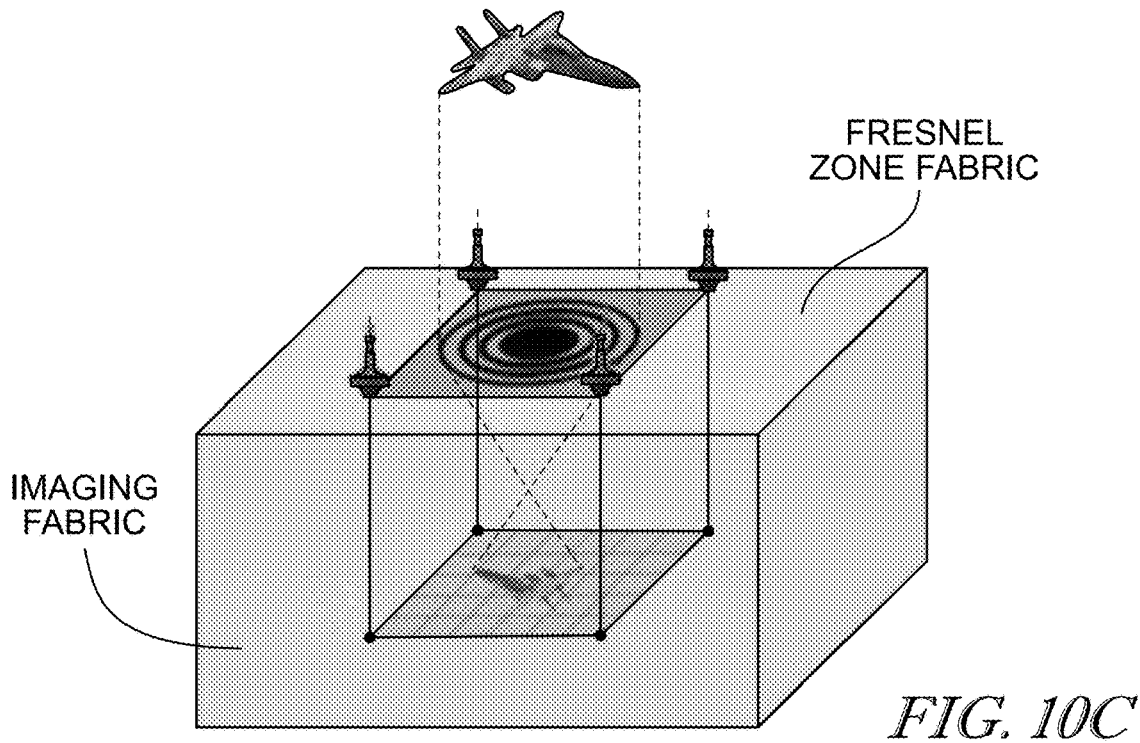

To create a fabric that will serve as an imaging array of the electrooptic fishnet, fibers are drawn in which two Si cores—p- and n-doped—are surrounded by two metallic electrodes, spaced close enough for assembly by selective spatially-coherent capillary instability into an array of pn diodes contacted in parallel, as is demonstrated schematically in FIG. 10A. The choice of materials for realization of the fiber device is Si for semiconducting cores (melting point—1414° C.), platinum, vanadium, or titanium for electrodes (melting points—1770, 1900, and 1670° C. respectively), and fused silica (softening point—1600 to 1650° C.) for the cladding. The draw will be performed at 2100° C., where the silica is viscous enough to provide structural support to the cores, which are all liquid at this temperature. The breakup will be performed above the softening point of silica but below the melting point of metal, such that the electrodes stay crystalline and thus immune to the capillary instability. The resulting device can be woven into 2D fabric and serve as an imaging array.

Previously, 2D imaging has been demonstrated in fabrics constructed from axially uniform chalcogenide-based optoelectronic fibers, including lens-less imaging. An axially uniform line photodetector is incapable of spatially resolving the point of illumination along the detector, thus, imaging necessitated special data collection or processing techniques such as tandem arrangement of multiple spectrally sensitive arrays and illumination of object with multiple lasers of various discrete wavelength, or a collection of multiple projections of the same object and application of image reconstruction algorithms. The situation, for the first time, is different for the fiber devices fabricated using VLSI-Fi. It is important to note that despite the fact that the fiber is, in essence, a line entity, the fact that the actual diodes packed into it are discrete devices, allows for a pixelated resolution by Time Domain Reflectometry (TDR). The data retrieval approach for imaging can be based on the fact that metallic contacts are forming a transmission line, along which the photodiodes are distributed as RC shunts at discrete locations, as is shown in FIG. 8B. If an electromagnetic pulse is sent along the transmission line, every shunt will create a back-reflection. Measuring the time delay between the incoming pulse $E_{in}$ forefront and the back-reflected signal from the shunt, the location of the shunt along the fiber is resolved. The interval between the reflections from neighboring shunts in the back-reflected signal $E_{out}$ is $\Delta t(\lambda,\varepsilon)=2\lambda\sqrt{\varepsilon}/c$, where $\lambda$ is the breakup period, $\varepsilon$ is the dielectric constant of cladding, and c is the speed of light.

Assuming silica cladding with $\varepsilon=3.9$ and $\lambda=1$ mm, $\Delta t(\lambda, \varepsilon)=13$ ps. The rise time of the incoming pulse should be shorter than $\Delta t (\lambda, \varepsilon)$, and the bandwidth of the oscilloscope for the back-reflection measurement should have a sampling rate faster than $1/\Delta t (\lambda, \varepsilon)$. TDR cost scales roughly as 1 GHz/$1 k, which means that for the configuration above it would be of the order of $100 k. For the demonstration of an imaging system on the lab bench, this is a hard requirement due to space constraints. Fortunately, for imaging arrays deployed in the ocean the important factor is the overall number of pixels rather than absolute dimensions of the array. Thus, resolution can be preserved by increasing the distance between the sensors, which would allow reducing the bandwidth and thus the cost of TDR by orders of magnitude.

Figure 11A:
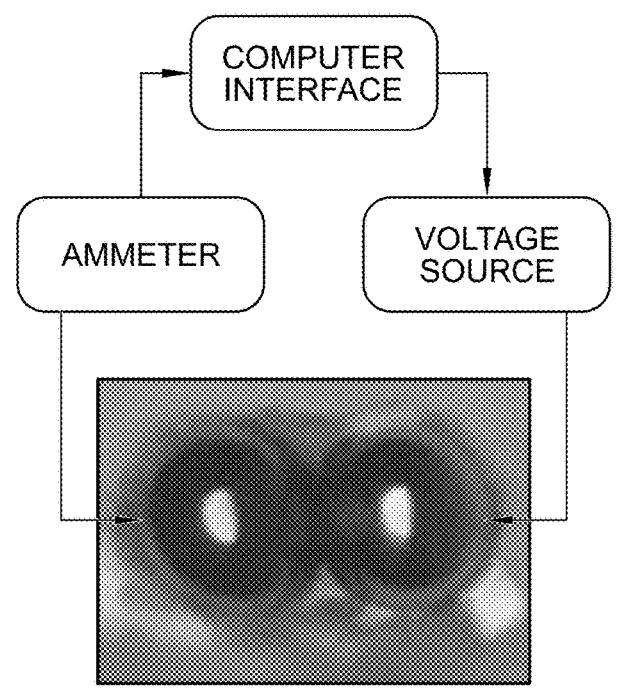
FIG. 11A and FIG. 11B illustrate aspects of coherent material breakup in accordance with this disclosure.
Figure 11B:
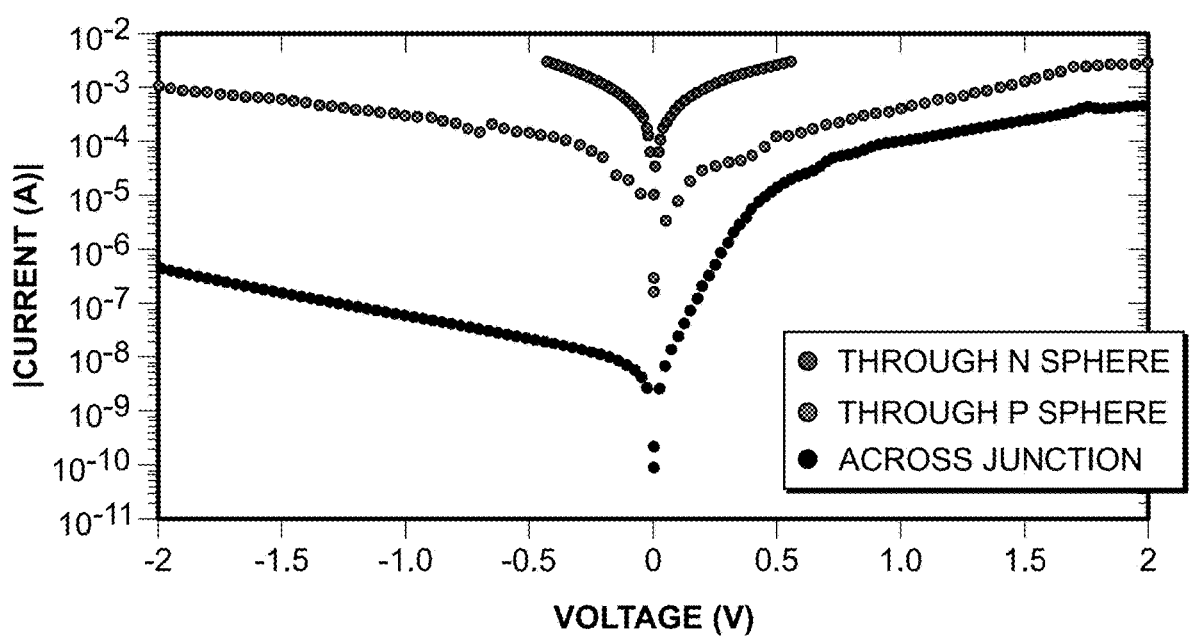

FIG. 11A illustrates coherent axial temperature gradient (ATG) breakup, while FIG. 11B illustrates an I-V curve of a pn molecule. An ideality factor of the diode n≈2 is useful for microelectronics. The reflection coefficient by a single diode is $\Gamma=Z_0/(Z_0+2Z_d)$, where $Z_0$ is the characteristic impedance of the transmission line and $Z_d$ is the impedance of the shunt. First quantify $Z_0$, which is given by $Z_0=377/(\pi \sqrt{\varepsilon} \cdot a \cos h(D/d)) \cdot [\Omega]$, where D is the distance between the electrodes or the size of the diode, and d is the diameter of the electrode. The typical ratio D/d is 10 for fiber devices fabricated by VLSI-Fi, which results in $Z_0=182\Omega$. $Z_d$ is the resistance of the diode $R_n$, except for the transient time at the edge of back reflection, which duration is $T_t=C_n Z_0 R_n/(Z_0+R_n)$ for in-parallel RC shunt, where $C_n$ is the junction capacitance of the diode. $R_n$ for the reverse-biased diode is of the order of $10^7 \Omega$, as is evident from FIG. 10B. $R_n \gg Z_0$ allows approximating $T_t \cong C_n Z_0$. Junction capacitance is given by $C_n=\varepsilon_0 \varepsilon_{si} A/W$, where $\varepsilon_0=8.9\times 10^{-12}$ F·m$^{-1}$ is vacuum permittivity, and $\varepsilon_{si}=12$ is the dielectric constant of silicon. $A\approx 100$ μm$^2$ is the junction area, estimated from FIG. 11A, and w≈1 μm is the typical value of the width of the diode depletion region. The junction capacitance is thus $C_n=10^{-14}$ F, resulting is transient times $T_t=1.8$ ps, which is significantly shorter than the sampling resolution. The last enables treatment of the diode as a simple variable resistor, in which resistivity changes with the level of exposure to light, resulting in an increase $E_s$ in the reflected signal (FIG. 11A). Additionally, since $Z_0 \ll R_n$, $\Gamma=Z_0/2R_n$ can be approximated. For reverse bias in dark $\Gamma \approx 10^{-5}$ is equal for all the diodes. Assuming $E_{in}=1$ V, the last results in reflection of $E_d=10$ μV from a single diode in the dark.

The dominant noise in the system is the Johnson noise, given by $E_{noise}=\sqrt{4 K_B T \cdot Z_0 \cdot \Delta f}=(4 \cdot 293$ K$\cdot 1.38\times 10^{-23}$ m$^2$·kg·s$^{-1}$ 182 $\Omega \cdot 100\times 10^9$ sec$^{-1}$)$^{1/2}=523$ μV. This is significantly higher than $E_d=10$ μV, which means that thermal noise rather than dark current is the limiting factor for our contrast resolution. Under an exposure to the light, the resistance of the diode can decrease by multiple orders of magnitude; the dynamic range in our case is limited by the noise level and the input voltage signal. As the input signal propagates along the line, the remainder of the signal for reflection decreases at every diode by the reflection coefficient at that diode, which means that the signal decreases exponentially, even if the reflection coefficient is very low. For input of $E_{in}=1$ V a maximum of $E_{in}/E_{noise}$ of illuminated pixels may be resolved, under a very special type of illumination profile, an intensity of which increases by a rate of the reflection coefficient at every consecutive diode to compensate for the decrease of the propagating signal due to reflection at that diode. The reflection signal resulting from illumination of a particular diode $E_s$ (FIG. 8B) should exceed $E_{noise}$. A maximal number of resolvable pixels at $E_s/E_{noise}$≡SNR=1 thus is about 2000, which desirably enables a sensing array of 4 megapixels by weaving the fibers into a square lattice of 2 m×2 m. Larger 4-megapixel arrays will reduce the TDR cost.

For the sake of calculations above, it is assumed that the propagation loss and dispersion over such a short distance (~2 m) are negligible. Thermal noise can be improved by increasing the distance between the diodes, which would allow us to further decrease the TDR measurement bandwidth and cost. The absolute area of the imaging fabric will increase accordingly. The noise can be further improved by decreasing the distance between the electrodes, which would result in a lower $Z_0$. The resulting imaging fabric can be used both for the lens-less sensing scheme, where direct illumination/shading incident on the fabric is detected, and for sensing with imaging optics. Schematics of possible imaging setup is shown in FIG. 10C. Here, sensing array fabric is immersed in water to the depth comparable to the array dimensions, and a Fresnel zone lens, imprinted on a transparent fabric of polymer sheet is used as an objective, projecting the images of objects passing above on the sensing array.

Sonar Fishnet: FIGS. 12A-12E illustrate aspects of fishnet sonar. To create a fabric with ultrasound generation and transduction capabilities a fiber design may be employed where the piezoelectric PMN-PT or BaTiO$_3$ core (melting points of 1285 and 1625° C. respectively) is surrounded by two metallic electrodes with melting point higher than the softening point of silica (1600° C.), which again can be the material of choice for cladding. Fabrication of the acoustically sensing/transducing fiber is illustrated in FIG. 12A. After drawing this fiber, the piezoelectric core will be axially patterned into an array of spheres that create a contact with metallic electrodes, as is shown in FIG. 12A. Since the post-breakup solidification happens under axial thermal gradient conditions, it is expected to propagate laterally across an individual piezoelectric particle. The piezoelectric elements are thus expected to have a distinct crystallographic orientation of c-axis aligned along the fiber axis, similarly to "Confined In-Fiber Solidification and Structural Control of Silicon and Silicon-Germanium Microparticles" by Gummenik et al., *Proceedings of the National Academy of Sciences of the United States of America* 114, no. 28 (2017): 7240-7245. Application of slow cooling from an elevated to a room temperature under an electric voltage applied to electrodes will allow functionalizing the fiber, as is shown in FIG. 10B, by poling the piezoelectric elements. A typical dimension of the piezoelectric elements is expected to be of the order of 100 μm, resulting in acoustical resonances at tens of MHz, which is proportional to the speed of sound in the generating medium and counter proportional to its dimensions. For PZT-4, frequently used in naval applications, the speed of sound $C_0$=4600 m/sec, which results in a resonant frequency $$f \sim \frac{c_0}{D} = 46 \text{ MHz},$$

where D~100 μm is the single piezoelectric sphere diameter. Sonar-generated image resolution improves when increasing the frequency, but the penetration depth into the water decreases. FIG. 12C illustrates fishnet weaving with a characteristic feature tuned to a desired resonant frequency of an individual loop, D. The detail of the individual loop is shown in FIG. 12D, where it can be seen that the resonant fishnet feature forms a radial mode ring transducer. Sonar transducers' operation is based on resonant mechanical coupling, while the optimal range of frequencies for imaging sonar operation is 0.1-1 MHz. That is why it may be advantageous to knit the fiber in a fishnet with typical cell size L of 1-10 mm, such that every individual knotted loop serves as a typical mechanical resonant feature at the frequency range of interest.

Assuming that an individual loop is approximately circular, metrics may be developed that allow assessment of the performance of the fishnet sonar. Zooming into an individual loop (FIG. 12D), that the electrodes and active material are arranged in a manner closely resembling a standard radial mode piezoelectric ring, or so-called 31-mode ring. The ring, or short thin-walled cylinder, is one of the most common forms of an underwater transducer which is used for both transmitters and receivers. Almost omnidirectional as a transmitter, it may be stacked and formed into a line array, end-capped and air-backed, or free-flooded. As hydrophone, a ring is one of the most common designs because of its high sensitivity, wide-band smooth response up to and possibly through resonance, generally low impedance, good hydrostatic pressure capability and simplicity.

In our case, the ring is not a monolithic piezoelectric ring, but rather composed of mostly piezoelectric sections mediated by cladding material distributed in a periodic manner with a period λ. Assuming only small difference between the sphere diameter D and the outer diameter of the fiber, such that the silica cladding doesn't restrict the expansion and contraction of the piezoelectric sphere, a single loop may be treated as being approximately equivalent to the geometry shown in FIG. 12E. Here the resulting ring resonator has an inner diameter ID=L, outer diameter OD=L+th, with thickness th=D, and piezoelectric material fill factor f=D/λ. Since the piezoelectric spheres result from the capillary breakup, f is limited from above. Assuming that prior to the breakup the initial piezoelectric core thickness is l, the shortest wavelength of capillary instability is limited to λ=πl. Due to volume conservation, after the breakup, this results in spheres of diameter $$D = \sqrt[3]{3\pi/(2)} \cdot l.$$

The maximal fill factor thus is $$f = D/\lambda = \sqrt[3]{3/(2\pi^2)} \approx 0.53.$$

Further assuming that silica, a low impedance acoustic material, does not damp the expansion and contraction of the ring as a whole, for performance assessment we switch to an equivalent ring with fill factor 1, for which the piezoelectric coefficient and thus radial displacement for a given voltage applied to the electrodes is lower by a factor of 1/f=λ/D≈1.9

Let us now choose a commercially available radial mode piezoelectric ring used for similar application and make a relative comparison to a single loop of the fishnet sonar. The device to which the single loop of fishnet sonar is compared is STEMINC SMR1005T20111—a radial mode ring with the inner diameter of 5 mm, the outer diameter of 10 mm, and the thickness of 2 mm. The active material is PZT-4. The resonant frequency is 142 KHz±4 KHz, which is in the range of interest. If operating as a transmitter, the ring generates power W=(xA)²ω⁴ρ/4πc), where x is the radial displacement, A=2π·OD·th is the radiating area, ω is the operation frequency, ρ and c are density and speed of sound in the medium respectively. The power generated by a single loop in a fishnet sonar with an active core made of PZT-4, $W_{fn}$ compared to that generated by the reference standard ring transducer Wr will be $$\frac{W_{fn}}{W_r} = \left(\frac{x_{fn}A_{fn}}{x_r A_r}\right)^2 = \left(\frac{A_{fn}}{fA_r}\right)^2.$$

Assuming similar outer diameter for both rings $$\frac{W_{fn}}{W_r} = \left(\frac{D}{f \cdot th_r}\right),$$

where $th_r$ is the thickness of the reference ring. The typical diameter of the sphere is D=100 μm, which gives $$\frac{W_{fn}}{W_r} = \left(\frac{0.1 \text{ mm}}{1.9 \cdot 2m}\right)^2 \approx 40^2.$$

In other words, a square piece of 40 cm×40 cm of fishnet sonar will have a power output comparable to that generated by a typical standard radial mode piezoelectric ring transducer with OD=1 cm. If operating as a receiver, the hydrophone sensitivity of the ring is M=OD·$g_{31}$, where $g_{31}$ is the piezoelectric coefficient for radial displacement under the given electrodes' orientation. Thus, hydrophone sensitivity of the fishnet sonar loop will be only about half that of a typical standard device of the same OD.

Sonar phased array fishnet can be fabricated by stacking ID arrays of loops, each made of individual fiber section, similar to schematics on FIG. 12C. Each ID array can be controlled individually, thus cylindrical focusing and ID scanning can be applied to the beam by controlling the relative phase of the driving voltage, in a phased array manner. 2D imaging can be performed by two fishnets like that overlaid such that the scanning directions of the two are orthogonal.

Magnetic Gradiometry Fishnet: Implementation of a macro-scale magnetic gradiometer with sub-nT sensitivity is currently a challenge without a solution. Magnetometers of sufficient sensitivity are implementable using manufacturing techniques that are not easily scalable. While highly sensitive point detectors are available, their systemic integration into high-resolution, large area dynamic monitoring systems has not yet been accomplished.

One such point detection scheme is magnetometry using nitrogen-vacancy (NV) centers in diamonds. Negatively charged NV centers are fairly well thermodynamically isolated from the environment even at a room temperature resulting in long coherence time of the individual electron spins and sharp resonances of individual energy levels, and thus the high-contrast Zeeman splitting of the sublevels in an application of external magnetic fields. High-sensitivity point magnetometers measuring the detuning of absorption/emission resonances of NV centers induced by Zeeman splitting have been successfully implemented.

Figure 13A:
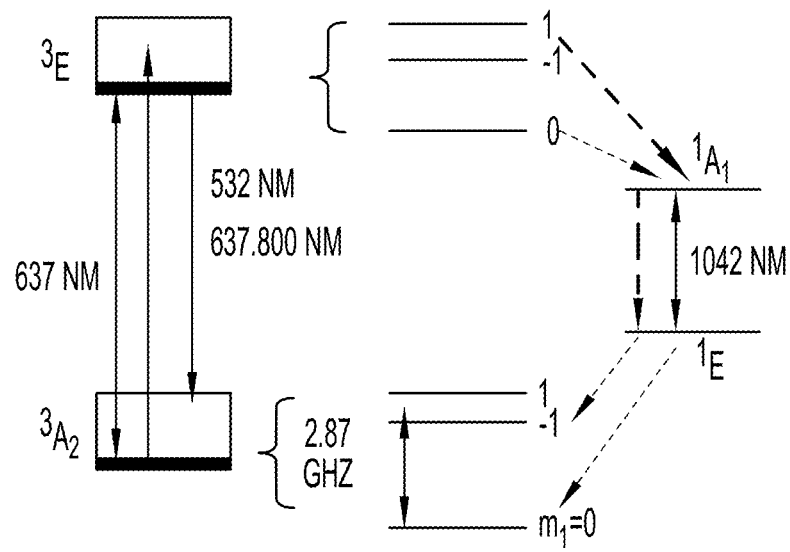
FIG. 13A, FIG. 13B, FIG. 13C, and FIG. 13D illustrate a point magnetometer and an integrated fiber implementation of a magnetic gradiometer in accordance with this disclosure.

The level structure of NV centers is shown in the FIG. 13A. Electron spin-triplet and spin-singlet states are labeled $^3A_2$, $^3E$ and $^1E$, $^1A_1$, respectively. The NV center can be excited optically from the ground state $^3A_2$ to the state $^3E$. From the $^3E$ state, the NV center can decay to the $^3A_2$ state through a spin-conserving transition which leads to fluorescence in the 637-800 nm wavelength range. It can also decay to the upper singlet state $^1A_1$ through a spin-nonconserving transition, which occurs with a higher probability for the $m_s=\pm 1$ states compared to the $m_s=0$ state. From the $^1A_1$ state, the NV center decays through a 1042 nm transition to the metastable $^1E$ singlet state, which has a lifetime of ~200 ns at room temperature. The NV center then decays from the $^1E$ state back to the $^3A_2$ ground state. Under continuous wave (CW) illumination with sufficiently strong green pump light at 532 nm, the NV center is mainly in the $^3A_2$ $m_s=0$ ground state and the $^1E$ metastable singlet state. Because of the spin-dependent transition rates, application of microwaves on resonance with the $m_s=0 \leftrightarrow m_s=\pm 1$ transitions, which is about 2.825 GHz, leads to an increased population of the $^1E$ metastable singlet state. Absorption of 1042 nm light can, therefore, be used as a probe of the transitions within the spin-triplet ground state, sensitive to Zeeman splitting in an application of a low-frequency external magnetic field.

Figure 13B:
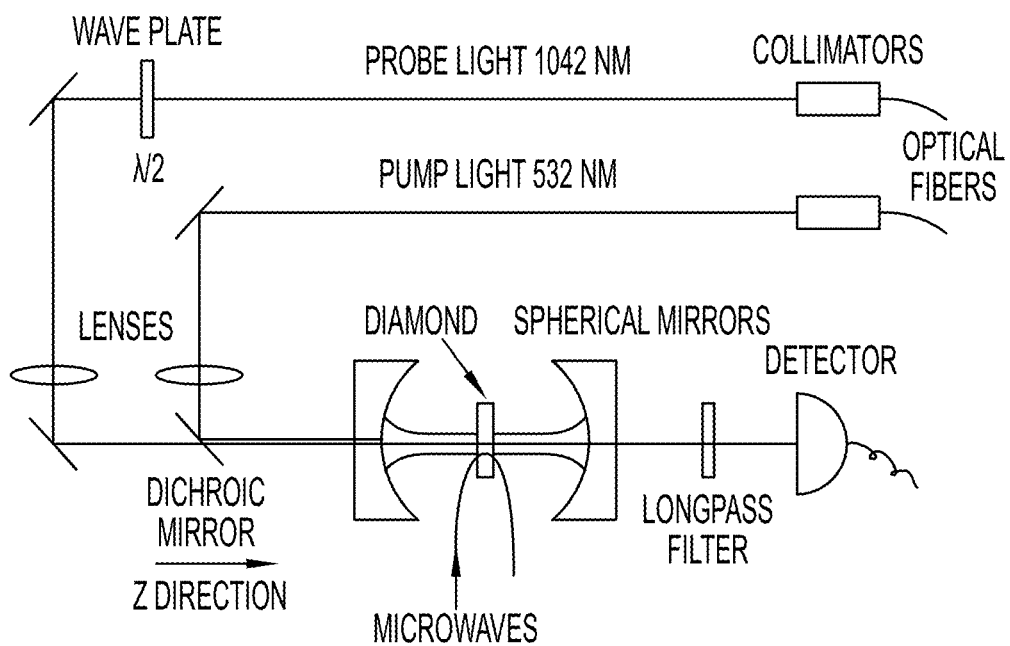

Implementation of a point magnetometer exploiting the 1042 nm absorption as a probe for the detection of Zeeman splitting is demonstrated in FIG. 13B. A high purity diamond wafer is irradiated by relativistic electrons and annealed at 700° C. to convert the neutral NV° defects into charged NV⁻ defects (commonly called "NV centers"). The wafer is placed in a cavity tuned to a double-resonance at 532 and 1042 nm to enhance the NV center absorption at those wavelengths. Detection of a magnetic field is implemented by periodic swap at radio frequency (RF) around the resonance at 2.825 GHz and lock-in measurement of 1042 nm transmitted signal at this swap frequency. For free space configuration, a sensitivity of 2.5 nT/$\sqrt{Hz}$ was previously demonstrated and an ultimate shot-noise detection limit of 70 pT/$\sqrt{Hz}$ was argued.

An integrated large-scale, high resolution, high sensitivity implementation of an NV center gradiometer in a fiber form may be achieved using the VLSI-Fi approach. NV center magnetometers are usually realized in free-space optics that are prone to mechanical vibrations, creating noise. FIG. 13B illustrates free space implementation of a point magnetometer. A free space apparatus as demonstrated in FIG. 13B can be multiplied in a periodically distributed integrated manner internal to a fiber as is demonstrated in FIG. 13C, which illustrates an integrated-fiber implementation of a magnetic gradiometer. In fibers using VLSI-Fi, a nanodiamond magnetic gradiometer can be realized in an integrated manner that is potentially more sensitive. The integrated-fiber implementation of a magnetic gradiometer of FIG. 13C includes (I) a NV nanodiamond-doped hollow capillary; (II) an RF line; and (III) optical cores. Silica cladding of a preform for such a fiber would host a hollow capillary in the center into which nanodiamonds are premixed, surrounded by two optical cores and two electrodes. The preform is drawn into a fiber, and the hollow capillary is broken up into periodically distributed bubbles by ATG breakup, as is demonstrated in FIG. 13C. The breakup is possible due to significant surface tension between the nanodiamond-doped silica and the air interfacing the hollow capillary.

The requirement for the size and concentration of the nanodiamonds will be driven by specific requirements for the performance of the final system. The general requirement is that the dimensions of individual nanodiamonds are much smaller than the wavelengths in use, such that the mean field approximation for the radiation propagation can be applied, and the scattering is insignificant. Refractive index (RI) of the diamond is 2.4, which is significantly higher than that of silica. Thus, if the concentration of the nanodiamonds is such that the mean free path for photon between nanodiamond encounters is much shorter than the wavelength, the premixed nanodiamonds may be treated as a doping that effectively increases the RI of the capillary. After the breakup, each bubble thus forms a spherical (i.e., discrete) optical resonator, in which nanodiamond doped core of higher RI is cladded on the bubble outside by a lower RI pristine silica, and on the inside by the air. If of a sufficient thickness, typically a few microns, the resonator can confine a light to the nanodiamond doped region by the total internal reflection, increasing the interaction efficiency.

Figure 13C:
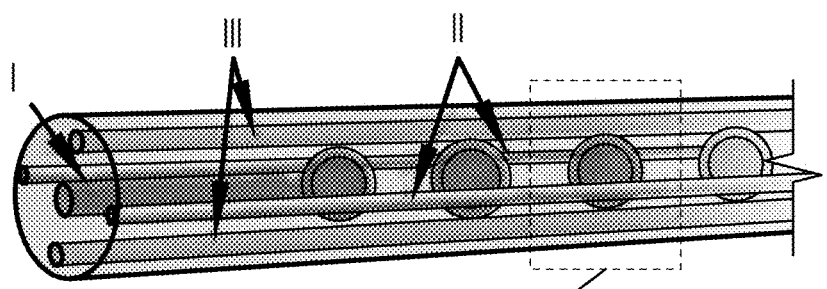
Figure 13D:
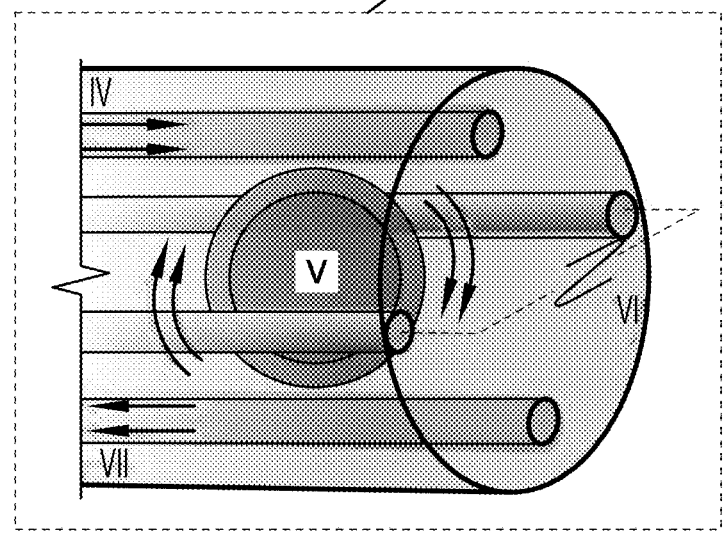

FIG. 13D illustrates the magnetic gradiometer principle of operation. As shown in FIG. 13D, the integrated fiber implementation of the gradiometer includes (IV) an input port, through which pump and probe are coupled to the NV resonator (V) and is subjected to RF excitation (VI). An outlet port (VII) through which the signal and pump residue are guided to the detector, where the signal is pass-filtered using an optical notch filter. The optical cores surrounding the resonator will be used to couple and decouple the radiation into the cavity modes of the resonator and the electrodes—to apply the RF stimulation, as is demonstrated in FIG. 13D. Optical cores can be prepared by introducing Ge-doped silica inserts into the preform, while electrodes can be made of platinum, which is liquid during the draw at 2100° C., and remains solid during the resonators fabrication at 1750° C.

A large area gradiometer may be implemented using fibers, as in FIG. 13C, arranged in a square net matrix in which each fiber is individually coupled with RF, 532 nm pump, and 1042 nm probe and monitored for output at 1042 nm. The anomalies will be located in 2D by registering changes in the magnetic field reading at a specific row and column intersection of the matrix. Since the operation of the gradiometer for its highest sensitivity needs CW pump and probe operation and lock-in measurement at the RF swap frequency, TDR techniques for localized measurements along the fiber applied to pump, probe, or RF are possible, and will result in increased spatial resolution, but on account of decrease in magnetic field sensitivity. This trade-off between the signal-to-noise ratio and the spatial resolution can be considered for optimal implementation of each specific application.

The sensitivity of the NV center magnetometer depends on a number of factors, including the intensity and the frequency noise of the pump, the probe, and the finesse of the cavity. Shorter cavities have a decreased noise floor due to the lower sensitivity of the setup to laser frequency noise, which together with cavity vibrations are the main sources of the noise. Free-space implementation of magnetometer usually involves cavities a few cm in length. Thus, fiber implementation in which the cavity is only a few tens to few hundreds of microns in circumference and is monolithic, and thus immune to the vibrations, is expected to take the noise floor much closer to the ultimate limit dictated by shot-noise, improving SNR for magnetic field measurement.

Shot-noise performance can be further improved by co-doping the resonator with Er and Yb. Pumping of Yb at 1042 nm would create a population inversion, and with a proper design, there will be an efficient transition of excited Yb electrons to the excited Er level, which then can lase at telecom wavelength. In normal magnetometer operation, the change in magnetic field is detected by a small change in transmission of high-intensity probe at 1042 nm due to Zeeman splitting of the triplet base level in NV centers. In an Er/Yb co-doped scheme 1042 nm intensity can be set such that it pumps the cavity just above the lasing threshold of Er at telecom frequency. The magnetic field detection would be identified by a disappearance of the telecom lasing line in the output signal, due to a slight increase in NV center absorption of 1042 nm, which would reduce the pumping of the cavity Yb. Since the shot-noise for a small signal is proportional to the square root of the baseline intensity, a small signal on the dark background is detected with a much better signal to noise ratio (SNR) than the same small signal on the very bright background.

In conclusion, the fiber magnetometer may provide a significantly improved noise floor of sub-nT/$\sqrt{Hz}$ when compared to free-space implementation, due to a shorter and monolithic cavity, which may increase the ultimate shot-noise detection limit by enabling a secondary detection of magnetic-field-induced NV-center absorption through the loss of Er-lasing in a Er/Yb co-doped cavity. Ability to fabricate a magnetometer in a fiber form-factor significantly decreases the power consumption, enabling a stand-alone operation. The main power consumption of the system comes from the pump laser, which at operational conditions provides a flux of ~10 MW/m$^2$. While for the free space operation this results in pump intensity of the order of tens of watts, since the typical fiber core area is of the order of 100 µm$^2$, the intensity of pump needed for the magnetometer operation is only of the order of single mW. Even considering wall plug efficiency of a typical 532 nm laser, for instance that of Nd:YAG, to be of the order of 10%, such a device still can be powered by the piezogenerating fishnet discussed in the next section.

Figure 14A:
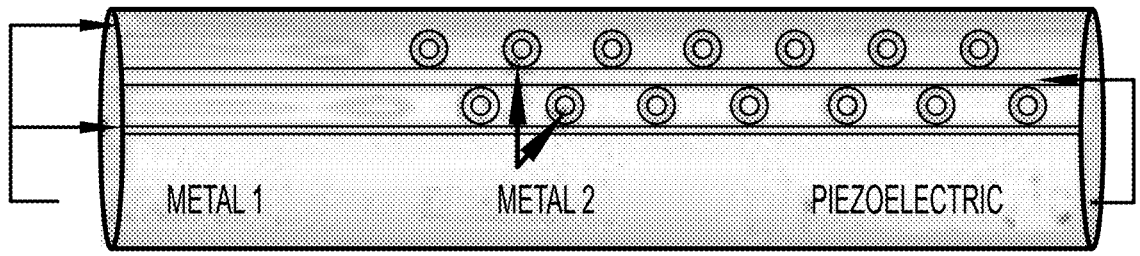
FIG. 14A, FIG. 14B, and FIG. 14C illustrate a fiber piezogenerator in accordance with this disclosure.

Piezogenerating Fishnet: FIGS. 13A-14C illustrate aspects of a fiber piezogenerator. FIG. 14A illustrates schematics of fiber design and fabrication. To fabricate a fiber piezogenerator, fibers may be drawn such that a piezoelectric core, off-center with regard to fiber axis, is surrounded by two pairs of metallic cores, as is shown in FIG. 14A. Electrodes are shifted comb electrodes fabricated with two different metals, one of which is selectively broken up to create contacts. The inner pair, closer to the piezoelectric core, is made with a metal of a lower melting temperature than that of the piezoelectric and the outer pair metal, but higher than the softening point of the cladding glass. A possible combination of materials includes: cladding—Pyrex, with softening point of 820° and melting point of 1300°, lower melting temperature metal—silver, with melting point of 961°, higher melting temperature metal—copper, with melting point of 1084° C., and piezoelectric—PMN-PT with melting point of 1285°. The draw may be performed slightly above 1300°, such that borosilicate is viscose enough to mechanically support the whole structure, but all the core materials are liquid. Then selective breakup of the lower temperature metal may be performed at a temperature that allows all other components to remain crystalline. The breakup may be performed on each low melting temperature metallic core selectively by feeding the fiber through a laser focused on the individual core under processing. The desired breakup is such that the arrays of spheres resulting from the two broken up metallic cores are in antiphase axially, as shown in FIG. 14A. The spacing between the cores is such that the broken up metal connects the continuous metallic electrodes to the piezoelectric core.

Figure 14B:
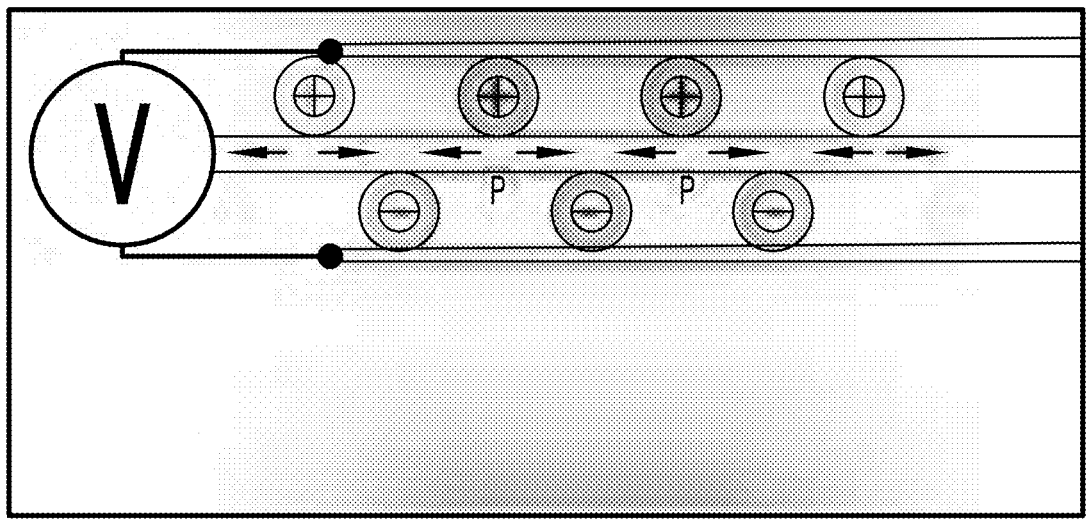
Figure 14C:
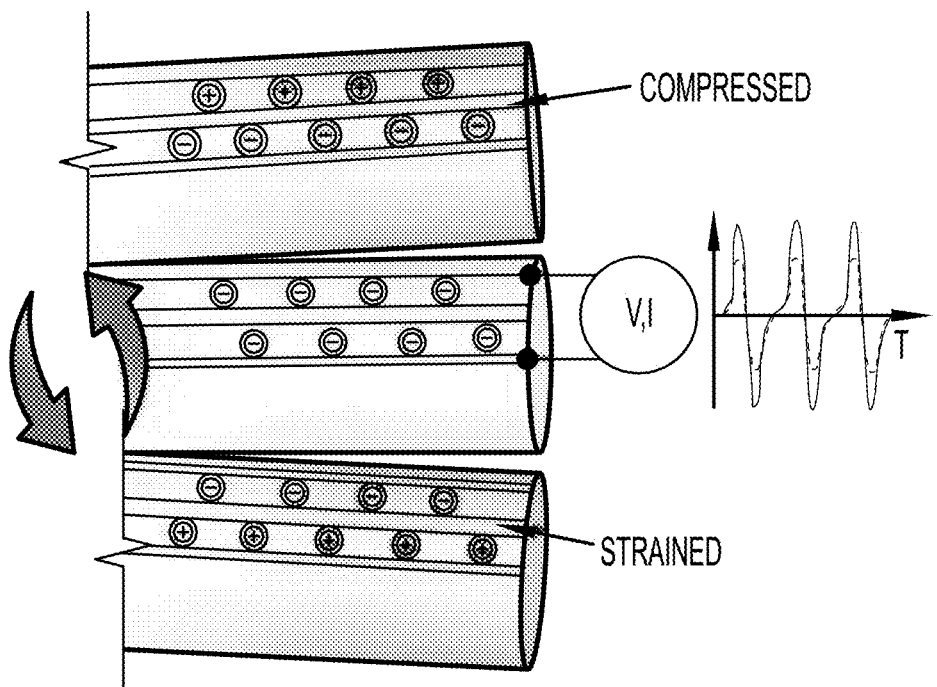

FIG. 14B illustrates functionalization and poling of the fiber, which may be conducted at elevated temperature. Periodic poling is created in the piezoelectric core by application of a kV/cm—level voltage to the electrodes, and slow cool-down of the whole system from 500° to room temperature (FIG. 14B). The result is a fiber, generating electrical power when periodically bent towards and away from the piezoelectric core, as shown in FIG. 14C. The operational principle is that since the piezoelectric core is offset from the concentric geometry, once the fiber is bent toward the piezoelectric core, it is axially compressed, and once it is bent away from the piezoelectric core it is axially strained, resulting in a generation of electromagnetic power. The voltage generated by such a fiber may be proportional to the length of a single polled domain, while the current may be proportional to the number of such domains. In other words, the power, a product of voltage times current, is proportional to the fiber length so the performance of the fiber piezogenerator scales with the length of the fiber.

Typical power densities for PZT based generators are of the order of 200 mW/cm$^3$, including at frequencies of ~1 Hz, comparable to the frequency of the ocean waves. To assess the power density for the fiber, let us assume that the piezoelectric core is PZT 100 µm in diameter. For 1 cm$^3$ of active material, $$\frac{1 \text{ cm}^3}{\pi \cdot (50 \text{ µm})^2} \approx 78 \, m$$

is needed. This means that 400 m of fiber will generate 1 mW of power. To power a transmitter for communicating the data from the surveillance net to a remote hub, or a laser, acting as a turbulence probe or illumination source for lens-less imaging, at least an order of 100 mW of electrical power is needed. This makes 40 km of piezogenerating fiber to transform the surveillance fishnet to an autonomous system. Let us assume that for typical overall fiber thickness of 300 μm, the piezogenerated fiber can be woven into a square lattice fabric with the cell size of 1 mm×1 mm. In that case, 40 kilometers of fiber will result in 40 km×1 mm/2=20 m² of fabric. In other words, a floating square sheet of fishnet piezogenerator with a side of 4.5 m will transform a surveillance fishnet into an autonomous system, with optical imaging and data communication capabilities at least. The power consumed by the system with sonar fishnet will have to be scaled up for a particular application in line with the desired acoustic power output. When compared to other types of energy harvesting schemes, such as electrostatic, triboelectric, electrowetting, electromagnetic, magnetostrictive or even batteries or fuel cells, piezogenerators outperform or perform in a comparable manner to all those in terms of power density. Solar cells outperform piezoelectrics by orders of magnitude but, obviously, depend on the availability of sunlight. PZT piezoelectric nanogenerators (PENG) constantly improve in terms of power density, achieving tens of milliwatts per cubic centimeter. Applications of advanced miniaturization techniques, such as "stack-and-draw" method, to the fiber fabrication and post-processing might bring further improvement in the future to the power harvesting schemes suggested in this project.

It should be noted that due to asymmetric voltage response to up vs. down bending, the fiber of FIGS. 14A-14C also can be used for gesture sensing if integrated into a uniform. This is especially useful in restricted spaces, such as aircraft cockpits, where it can serve as a cyber-physical interface instead of a keyboard or joystick. Furthermore, integrated into hardware, it can monitor its integrity. For instance, it can be used in wings of jets to monitor unusual, abrupt changes in shape under load. To extend such stress measurement data, the fiber of FIGS. 14A-14C can be combined with sonar fiber in FIG. 13, which mechanically coupled to the wings of a jet would measure the fatigue-induced change in their mechanical resonances.

In summary, a set of material processing techniques, dubbed VLSI-Fi, have been described which enable fabrication of conformal 2D sensors and transducer arrays for all-around maritime acoustic, magnetic, and optical surveillance, and piezogenerators for conversion of the mechanical power of ocean waves into electrical power, which transform the sensing and transducing textiles into autonomous systems. The combination of the sonar fabric, sensing the amplitude of the sound pressure wave, with piezogenerating fabric, in which the sign of the generated voltage depends on the direction from which the pressure is applied, suggests a novel platform for the realization of shape sensing, gesture recognition, and acoustic vector sensing. The fiber and fabric devices described herein, fabricated in standard piezoelectric, electro- and magneto-optic materials and scalable in performance with the length of the fiber, create more adaptable and less vulnerable distributed sensory systems compared to stand alone configurations, which have the capacity to outperform current industry standards, both in quality and cost.

The sensing and transducing textiles described herein are broadly relevant for naval applications such as Code 32, Ocean Battlespace Sensing. Piezoelectric fiber nets deployed in glaciers can sense the movement in coastal lines, while magnetic gradiometers can sense tidal streams and monitor littoral mine and submarine warfare. Sonar fishnets can be used to investigate the influence of ultrasound on marine bio-spheres and for fundamental physics research related to underwater sound. Electrooptic fishnets can be used for monitoring atmospheric turbulence. The deliverables in this proposal are especially relevant for Division 321, Maritime Sensing Program, targeting development of acoustic, magnetic, shape, and electrooptic sensors systems for awareness of the maritime battlespace. Proposed systems can be carried as on-board equipment by Navy surface ships, submarines, aircrafts, and unmanned vehicles, utilized as sensor coatings for ships and submarines or be deployed from those platforms as ocean-drifting and aerial surveillance systems operating under autonomous control. In addition to directly addressing many of the Code 32 basic research interests (including high-efficiency, high-performance, non-acoustic sensor technologies, components and assemblies and innovative sensor delivery and deployment concepts), the embodiments of the present disclosure enable the next generation of acoustic, magnetic, and electrooptic surveillance and sensor systems. Sensing fabric coatings turn every surface into a distributed sensor, solving the inherent instability and maneuverability limitations imposed by stand-alone systems, and will produce substantial cost-savings for the Navy while improving readiness and performance.

Example In-Fiber Integrated Quantum Device Circuit Application

Another implementation of the smart fibers manufactured according to the VLSI-Fi approach described herein provides an alternative and potentially revolutionary approach to a material-agnostic integration of multiple quantum components to realize new types of quantum devices. Any quantum photonic device is a combination of a waveguide and a photonic structure. Both may be realized using VLSI-Fi. Known high-performance devices of various kinds are realized in systems comprising different materials. For example, a system with memory elements in Nd:YAG and gates in Si, since they need high dielectric constant to focus a single photon to interact with the gate non-linearly so it can switch its behavior for an additional photon. As another example, a single photon detector configured with superconducting nanowires, such as tungsten or niobium silicide. If realized by conventional complementary metal-oxide-semiconductor (CMOS) technology, different materials are not easily combinable because the choice of substrate material limits the system to that material system. Thus the conventional approach is not material-heterogeneous. In fibers produced according to the VLSI-Fi techniques described herein, multiple cores may be drawn from very different materials, if they are molten at the draw temperature. The fiber then may be tapered at desired right locations to create coupling, or even create re-circulators by breaking up some sacrificial cores. This may enable the integration of separate devices into integrated systems, raising questions pertaining to the characterization of systemic error statistics and error correction schemes.

As discussed above, the processing approach is based on a thermal draw of preforms commonly used for a fabrication of telecom optical fibers. A fiber preform (a macroscopic (thick and short) rod, with a cross-section incorporating multiple cores comprised of various materials) is heated to become a viscous liquid and is drawn like caramel into a thin and long fiber that preserves the geometry of the preform cross-section. A primary technical requirement is that at the draw temperature the viscosity of the core materials is lower than that of the cladding which provides the structural integrity. To be able co-draw materials the cladding should be viscous liquid, and the cores should not be more viscous than the cladding. To be able to co-draw materials, while preserving the cross section, the capillary instabilities, gravity induced convection of materials, and chemical reactions at the material interfaces need to be suppressed. This comes down to an interplay between time constants: the rate of the capillary instability, the rate of convection, and the rate of chemical reactions, which all have to be much slower than the throughput rate of the preform material through the hot zone of the furnace. That is, for a given draw temperature, the draw has to be fast enough to suppress the capillary instabilities, convection, and chemical reactions. Multi-material fiber fabrication technology thus allows for an integration of multiple cores comprised of materials with very disparate properties (semiconductors, metals, insulators) into a single fiber. The fiber cores can span its entire length, typically kilometers long, while in the fiber cross-section the features can be scaled down to the nanometer regime. While the resulting fiber cores are not guaranteed to be monocrystalline, laser-induced recrystallization can be applied to the fiber cores as a post-processing step if needed. Fiber cores can be axially patterned to create high contrast photonic gratings that will serve as building blocks for resonant cavities, essential for the realization of photonic quantum devices.

Fibers with multiple semiconducting and metallic cores with Si, Ge, and Pt have been demonstrated herein, and both material-selective and spatially coherent patterning into arrays of integrated devices have been realized by means of controlled capillary instability. Using silicon-core silica fiber as a demonstration platform, this processing approach may be used to develop submicron structures, where the fiber cores can be as thin as 300 nm and their capillary breakup results in micron-pitched gratings of submicron-sized spheres of core material embedded in silica cladding. This approach to material processing may be extended to cores and gratings made of ferroelectrics (LiNbO$_3$), garnets, Nd:YAG, as well as silicon- and silica-based blends of nonlinear and superconducting nanowires, such as Indium-Tin-Oxide (ITO) and NbSi$_x$/WSi$_x$. ITO nanowires may be synthesized through a bottom-up approach using chemical vapor deposition, a versatile technique for nanomaterial growth.

The growth mechanism may be the sophisticated metal-catalyzed vapor-liquid-solid (VLS) growth. In brief, a catalytic liquid particle absorbs vapor to a supersaturation level, leading to subsequent growth of solid crystal from the nucleate site at the bottom of the liquid particle. The VLS process can provide a large quantity of nanowires with controlled diameters, essential for quantum device applications. The metal silicide (e.g. NbSi$_x$ and/or WSi$_x$) nanowires will be fabricated by combining bottom-up synthesis with top-down nanofabrication. Films of the corresponding metals (e.g. tungsten_lm for WSi$_x$) will be deposited on silicon substrates by pulsed laser deposition. Then, a solid state reaction takes place between the metals and silicon at an elevated temperature, resulting in silicide films. Nanopatterns that define the position and dimension of nanowires may be created via lithography. A selective etching process may be applied to produce metal silicide nanowires or nanowire arrays of high uniformity. For this combined approach, nanowire compositions are determined primarily in the bottom-up process, while the orientation, position, and size of nanowires are controlled by the top-down nanofabrication. Nanowires then may be blended into materials with a lower melting point, such as Si. The silica fiber can be drawn at around 1900° C., which is lower than melting points of both high-temperature ITO and of silicide. While being drawn into fiber, the nanowires will naturally align with respect to the material flow direction along the fiber axis. The cross-sectional concentration of nanowires in the fiber cores can be controlled by predefining the correct initial concentration in the blend on the preform level. This concentration may be nominally brought to a single wire by scaling the core toggle-wire thickness during the draw. The ability to draw and pattern into gratings and resonant cavities semiconductors, ferroelectrics, garnets and nanowire blends may provide a complete set of building blocks for in-fiber integrated quantum circuitry.

Figure 15:
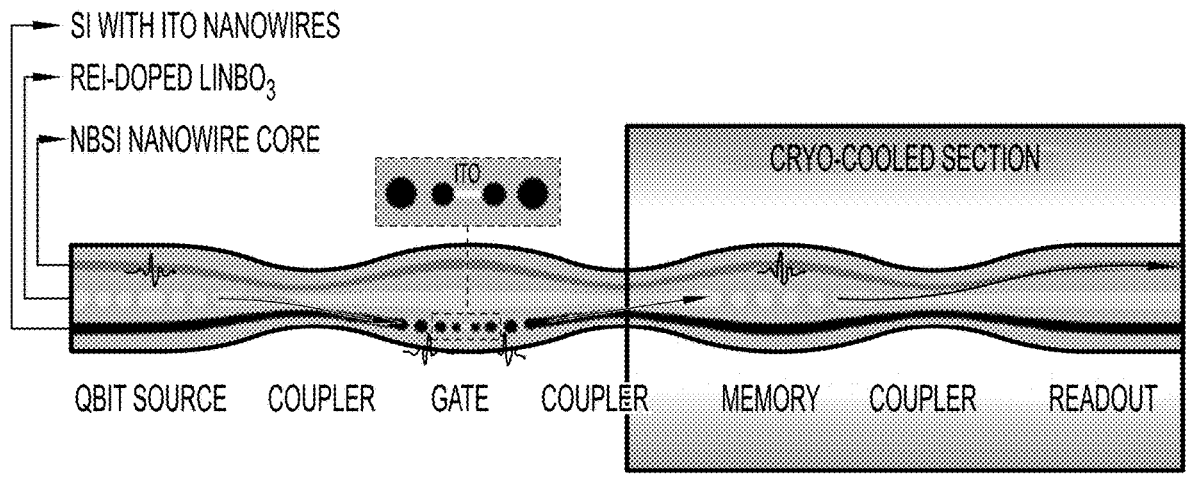
FIG. 15 is a conceptual schematic of an in-fiber integrated quantum device circuit in accordance with this disclosure.

FIG. 15 is a conceptual schematic of an in-fiber integrated quantum device circuit. From left to right in FIG. 15 are shown a pulsed-laser pumped resonant cavity in a ferroelectric crystal that will generate Kerr frequency comb used as a qubit source. Qubits then may be coupled into a Si-based nanocavity gate. The results then may be coupled to a rare-earth-ion (REI)-doped memory element that can later be read-out by the superconducting nanowire detector. As schematically exemplified in FIG. 15, ferroelectric cores may enable the realization of frequency combs for use as qubit sources, and quantum memories. Resonators with ITO nanowires blended into them would enable the realization of quantum gates, while cores containing superconducting NbSi$_x$ and/or WSi$_x$ nanowires will be used for the quantum memory readout. Interaction and coupling between the cores may be controlled by tapering the fiber at predefined locations and monitoring decoherence in such structures provides exquisite sensing capabilities.

The integration and success of the hierarchical experimental platform described above relies heavily on a thorough theoretical understanding of the fundamental principles behind the physical phenomenology and functionality one is trying to achieve. A solid theory of scattering that deals with entangled projectile photons and neutron beams may be developed from fundamental principles to enable interpretation of those experimental outcomes. To this end, smart fibers manufactured according to the VLSI-Fi approach described herein may enable the development of toy models of entangled probes impinging on well-known strongly correlated states of matter, including states with potential quantum spin liquid correlations and topological states of matter, such as Laughlin quantum Hall fluids. These models may advance understandings of how to interpret the outcomes obtained from the ion-trap simulators and neutron-scattering cross sections. It is important to characterize the degree of entanglement of the proposed neutron probe, and investigation of generalizations of the Mach-Zehnder quantum interferometer, as applied to entangled beams, may provide such a precise characterization. Another important and complementary theoretical proposal is the development of quantum self-testing protocols for the quantum measurements proposed. This requires serious, computationally-intensive, statistical analysis validating the supposedly quantum regime. The previously-described ability to generate quantum states with a custom degree of entanglement and the integration of this technology into devices that realize elementary quantum building blocks constitute the foundation necessary for quantum computation.

Example Fiber-Ion Trap Application

Approach and Methodology: Developing fiber-ion traps. Trapped ions offer an individually addressable platform with long coherence times and tunable long-range interactions naturally suited for quantum simulations of quantum materials. However, in their current realizations, their scalability is limited due to the difficulty of controlling large numbers of co-trapped ions with high fidelity, and the low efficiency of networking separate ensembles of co-trapped ions together. Quantum light is another powerful platform for quantum information processing, especially when guided in optical fiber structures that allow single-photon manipulation and communication while maintaining long coherence times. However, lack of multi-photon processes necessary for universal quantum gates limit existing proposals for photonic quantum technologies.

The present disclosure addresses these challenges in a quantum simulator that integrates ions and photons in monolithic, custom-designed optical-fiber structures. This Integrated Fiber-Ion Quantum Machine (IFIQM) is scalable in a manner similar to silicon chips, since fiber structures can be drawn with potentially unlimited ion traps connected natively by the fiber itself. Compared to an interfaced design, where optical fibers are simply interlaced within existing traps, the integrated-design approach described herein offers several advantages. These include: (i) eliminating decoherence due to interfacial defects, (ii) flexibility in leveraging series and parallel classical and quantum operations, (iii) near complete optical signal collection, going beyond the typical limits set by numerical aperture. Thus, the IFIQM described herein lowers the computational overhead of exploiting physically distinct components while maintaining their respective advantages and unleashes the transformative potential of entanglement between them.

Atomic ions trapped in radio-frequency (RF) electric fields have been a workhorse of quantum information processing for over 2 decades. In part, this is due to the simplicity of RF traps: their underlying classical theory has been known for over half a century, and their ability to trap ions persists across an enormous range of possible trap geometries and atomic species. For a prototypical RF trap, the stable trapping regime can be determined analytically; in more complicated configurations, the range of trapping parameters is easily determined via finite element analysis of the trap geometry.

Once the trapping electric fields have confined the ions, they can be cooled and manipulated with laser light. It is routine to cool ions to mK temperatures using Doppler cooling techniques, which prepare the ions in a quantum harmonic oscillator state. Raman sideband cooling further reduces the ion motion to its quantum ground state. Likewise, the internal electronic state of the ion can be initialized into a desired state by laser-driven optical pumping. State readout can be accomplished at near-unit fidelity using spin-dependent fluorescence techniques, which have been long-established.

171Yb+ ions may be used for this system, which carry three primary advantages. First, 171Yb+ ions contain a hyperfine-split pair of states that can form a near-ideal qubit. These states are insensitive to external magnetic field noise (to first order) with demonstrated coherence times of over 10 minutes. Second, entangling interactions between neighboring 171Yb+ ions are routinely driven using 355 nm light, a wavelength for which high-power, turn-key laser sources are commercially available. Third, Ytterbium is easily dopable into an optical fiber and can be desorbed from silica using laser light, providing a local atomic source of atoms within the fiber cavities.

Trapping 171Yb+ ions within an optical fiber offers both scientific and engineering advantages. Since the ions will be trapped with fiber cavities, the ion-photon coupling rates can be greatly enhanced. Importantly, every photon released by an excited atom can be collected and guided within the fiber, and detected. This feature would overcome a current limitation of ion-trap systems, where free-space light collection and fiber coupling impose significant photon losses. The engineering advantage of this approach lies in its scalability: the fiber manufacturing technique can fabricate arbitrarily large numbers of coupled cavities in a controllable and repeatable process. A silica preform then may be fabricated, incorporating a concentric optical core surrounded by a quadruple of metallic electrodes and hollow cores. Next, the preform may be drawn into a fiber by a thermal draw, as in optical fiber fabrication. The hermetically sealed vacuum micro-chamber for ion trapping may then be fabricated by the following sequence of four post-processing steps, which are described below with respect to FIG. 16.

Figure 16A:
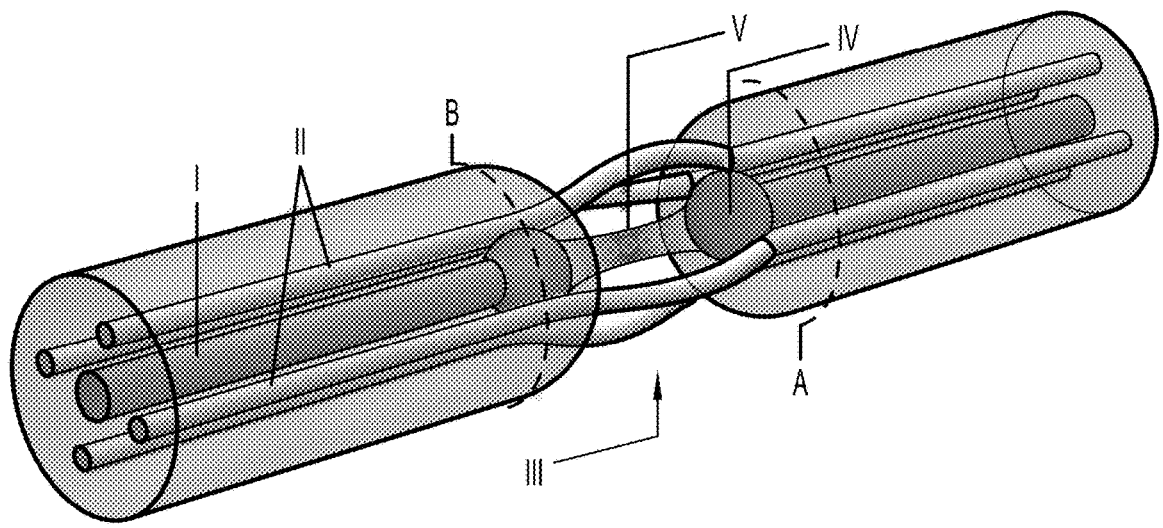

FIG. 16A (I) illustrates the schematics of an in-fiber open-chamber ion micro-trap. The open-chamber ion micro-trap of FIG. 16A (I) comprises: an optical core I; metallic electrodes II; open microchamber III, which may be created by a localized hydrofluoric acid etching; a spherical micro-lens IV; and an array of trapped ions V, which may be pumped/probed by laser emission guided along the optical core and coupled into and out of the free space of the micro-chamber using spherical micro-lenses. Heating locations "a" and "b" are adapted for creation of lenses by the silica liquefaction and the surface tension-driven reshaping of it into half-spherical caps. The closed-chamber ion micro-trap of FIG. 16A (I) may be fabricated as follows:

A silica preform is fabricated, incorporating a concentric optical core, surrounded by a quadruple of vanadium electrodes, as is demonstrated in FIG. 16A. The preform is then drawn into a fiber by a thermal draw at 2000° C. familiar from optical fiber fabrication. For the draw the core materials need to be liquid, which is the case for vanadium, melting at 1910° C. Then multiple open micro-chamber ion traps interconnected by photonic links may be defined at desired axial locations on a fiber by the recurring sequence of three post-processing steps:

1. Opening of a sub-mm gap in a silica cladding along the fiber axis between the locations (a) and (b) on FIG. 16A (I) by a local exposure of silica to hydrofluoric acid (HF), which attacks fused silica selectively, not affecting vanadium.

2. Heating of the fiber between locations (a) and (b) on FIG. 16A in an inert environment, such as an argon-purged tube furnace, above the softening point of silica (~1650° C.) but below the melting point of vanadium (1910° C.). Softening the silica would allow the surface tension to reshape the cladding caps facing the gap into semi-spherical micro-lenses (IV in FIG. 16A (I)) while keeping the vanadium electrodes intact and preventing the vanadium oxidation. The resulting micro-lenses serve as couple-in/couple-out collimators, preventing the light, which emerges from and is coupled back into the optical core, from diffracting while interacting with the ions trapped in the microchamber. The curvature of the micro-lenses is designed to minimize the coupling loss.

3. Immobilize the section of the fiber to the right of a and to the left of b on FIG. 16A (I) on a V-groove holder for the permanent monolithic alignment along the single optical axis.

The resulting fiber with multiple traps may be coiled as desired and encased in a vacuum chamber with a Yb-ion source for the traps' loading, with optical windows for free-space coupling as needed for the conventional traps' addressing, while the ends of the fiber may be fed-through the chamber walls for external electrical and optical addressing.

The choice of vanadium for the Paul trap electrodes is not random: the electrode metal has to be liquid at the draw temperature of 2000° C. and remain solid above the softening point of silica during the micro-lenses fabrication step. Candidates aren't many—platinum, chromium, and vanadium. With the highest melting point among the three, vanadium provides the largest working window of temperatures for the microlens fabrication, and hasn't been drawn before. Thus, to show the feasibility of fabrication of the on-fiber traps, the draw of vanadium quadrupole in silica is illustrated in FIG. 16A (II) and (III). FIG. 16A (II) illustrates a side view optical micrograph (scale bar—1 mm) of a vanadium quadrupole cane while FIG. 16A (III) illustrates a cross-sectional view optical micrograph (scale bar—200 µm) of the vanadium quadrupole cane.

Scalability of the Fabrication and Optimal Operation of the Ion Traps:

1. The drawing process may be optimized for geometry and functionality control. Fiber drawing is a liquid phase process. As such, it's prone to fluid-dynamic effects, such as convection and capillary instabilities. Those effects, affecting the fiber cross-section's axial uniformity, are highly non-linear and challenging to control for the increasing metal-to-silica ratio in the fiber cross-section. Thus, on the one hand, thinner cores (~5 µm thick) are likelier to draw uniformly over long distances (hundreds of meters). On the other hand, for transmission of RF with a reasonable impedance needed for ion trapping, the thickness of electrodes must be in the range of hundreds of microns. Thus, material processing vs. trap functionality requirements are competing yet need to be met simultaneously.

2. The optical core (I on FIG. 16A (I)) may be optimized for minimized photonic linking of multiple on-fiber traps. For simplicity, the optical core is schematically represented by a single cylindrical thread, yet its optimization for functionality may result in a complex structure, such as solarization-resistant single-mode Photonic Crystal Fiber (PCF), suitable specifically for UV transmission used in communicating to the trapped ions and providing low-loss PCF with integrated metallic cores.

FIG. 16B illustrates the schematics of an in-fiber closed-chamber ion micro-trap. The open-chamber ion micro-trap of FIG. 16B comprises: an optical core I; metallic electrodes II; enclosed microchamber III; a spherical micro-lens IV; and an array of trapped ions V, which may be pumped/probed by laser emission guided along the optical core and coupled into and out of the free space of the micro-chamber using spherical micro-lenses. Heating locations "a" and "b" are adapted for creation of lenses by the silica liquefaction and the surface tension-driven reshaping of it into half-spherical caps. The closed-chamber ion micro-trap of FIG. 16B may be fabricated via the following four post-processing steps:

1. Heating of a fiber above the softening point of silica at location (a) in FIG. 16B and applying a negative pressure P to the hollow cores. This will cause the hollow cores to collapse at the heated spot along the fiber axes, creating a seal at this spot.

2. Heating of a fiber above the softening point of silica between locations (a) and (b) in FIG. 16B and applying a positive pressure P to the hollow cores. This will cause the hollow cores to expand, eventually merging into one single bubble at the heating location, the surface of which, as it grows, will bow the electrodes and will eventually surpass them, leaving them exposed within the void.

3. Heating of a fiber above the softening point of silica at location (b) in FIG. 16B, while applying deep vacuum to the hollow cores. This will cause the hollow cores to collapse at location (b), leaving behind a hermetically sealed micro-chamber (III) in FIG. 16B pumped to a high vacuum. Spacing between the hollow cores may be designed such that the optical core in the micro-chamber will remain intact.

4. Focusing a mid-infrared laser on the optical core section internal to the micro chamber. A $CO_2$ or a quantum-cascade laser at 4.6 µm are possible, cost effective options for this purpose. The outer walls of the micro-chamber may be cooled convectively to prevent them from heating, while the heat dissipation of the optical core section hanging in a vacuum inside the micro-chamber may remain limited. Laser emission absorbed by the optical core may cause it to heat up, soften, and break up by a capillary instability into two threads within the micro-chamber. For the breakup to occur, a surface tension between the heated thread and the surrounding medium should exist. There is a significant surface tension between silica optical core and vacuum of the micro-chamber, while there is substantially no surface tension between the silica of the optical core and the surrounding silica cladding outside of the micro-chamber. Thus, the breakup may occur in the micro-chamber only, causing the broken ends to reshape into micro-spheres by a surface tension. Additional options, such as excessive doping to enhance selective absorption of the optical core to promote its selective breakup by irradiation though micro-chamber wall will be explored. It is known for instance that excessive Ge doping of optical core will enhance its absorption in the vacuum ultraviolet region, while bare silica micro-chamber walls will remain transparent to this wavelength.

The fiber cladding will be doped with 171Yb, which will be ablated by a pulsed near-infrared laser from the interior of the chamber in a minuscule quantity when the trap needs to be reloaded, subsequently ionized by ultraviolet irradiation through the micro-chamber wall and captured by a trapping electrical potential applied to the electrodes. The array of ions than can be exited/probed axially using the optical core, or transversely by irradiation through the micro-chamber wall.

Figure 17:
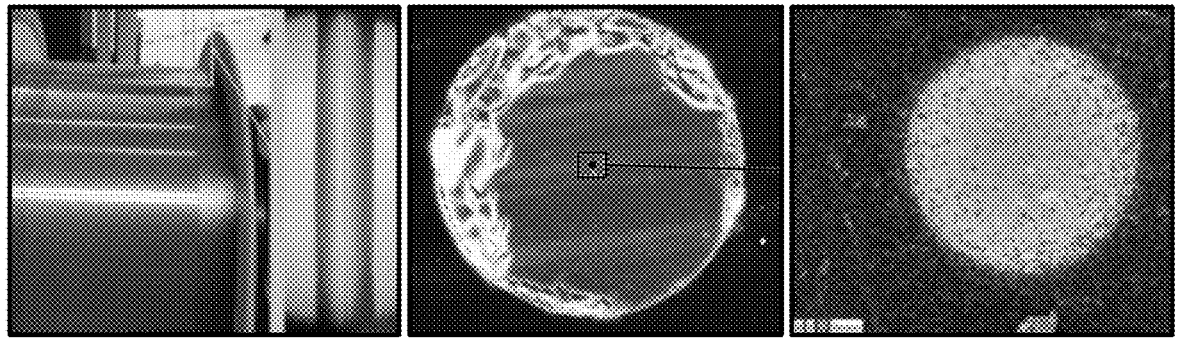
FIG. 17 illustrates and example result of the drawing of vanadium electrodes in a silica fiber.
Figure 18:
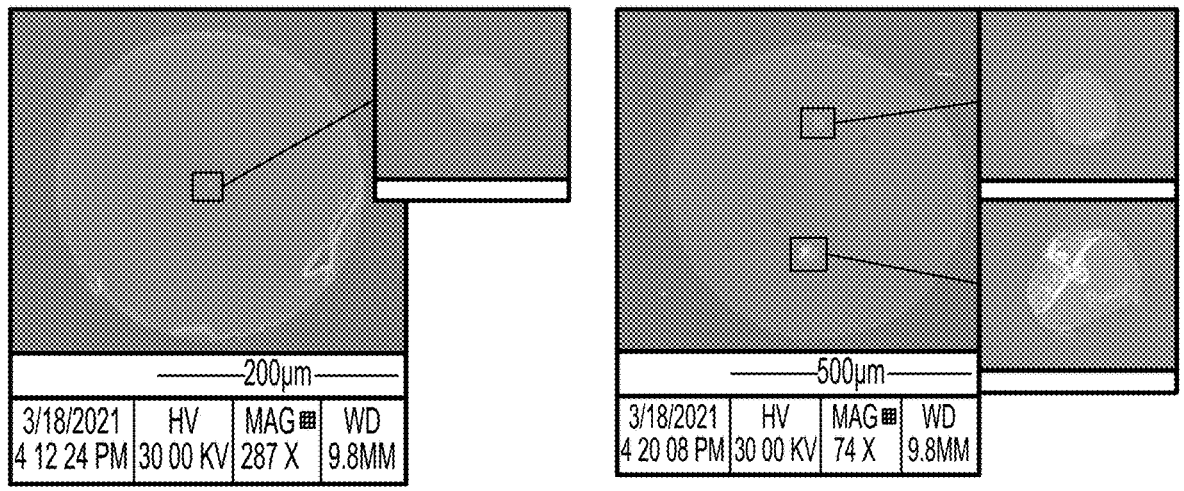
FIG. 18 illustrates and example result of the drawing of vanadium electrodes in a silica fiber.

FIGS. 17 and 18 illustrate example results of the drawing of vanadium electrodes in a silica fiber.

Computational modeling and abstraction: Abstract mathematical models of computation are essential to every aspect of modern computing. It is not practically feasible to design algorithms, prove their correctness, design programming languages, or build reusable software libraries, if every aspect of the current choice of materials and hardware technology is visible to higher levels of abstraction. This separation allows revolutionary advances in the logical view of the computation and in the underlying technology to happen simultaneously without advances in each domain dramatically disturbing the other.

Today and in the foreseeable future, there are, and may continue to be, several competing technologies for quantum simulation and quantum computing. Each technology combines the promises of significant advantages and significant challenges. While advances in each technology may produce a "best" standardized candidate, a more likely development is the availability of a variety of different technologies with different trade-offs.

Figure 19:
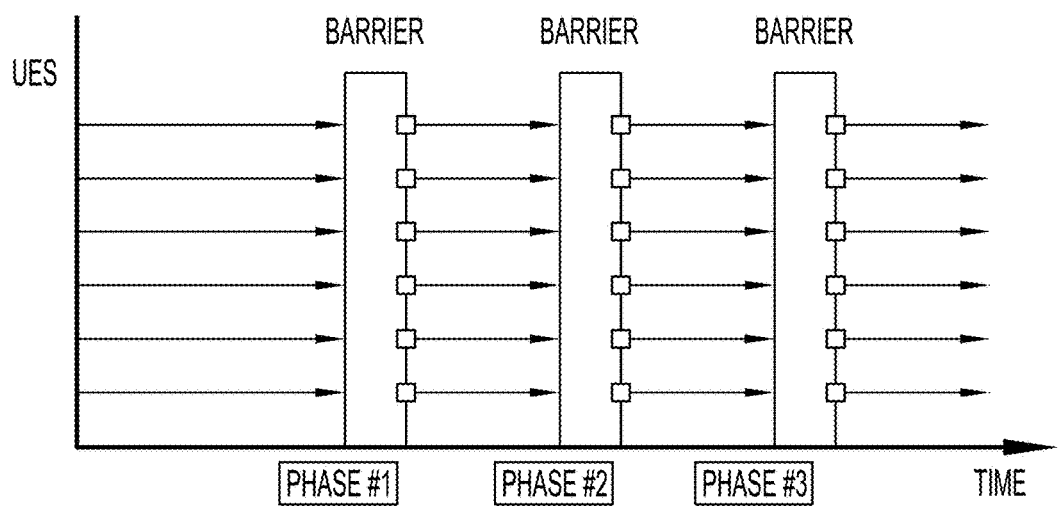
FIG. 19 illustrates a barrier synchronization computation model in accordance with this disclosure.

Among the many competing properties of ions and fibers, the present disclosure focuses on the following difference: (i) fibers are preferably tuned for "long" computations with no interactions among the particles, and (ii) ions are preferably tuned for "short" computations with significant interactions among the particles. An appropriate abstraction for this hybrid combination of technologies may be an adaptation of programming models for parallel algorithms. Intuitively, parallel algorithms divide the solution to a computational problem into multiple concurrent tasks. These tasks can execute independently unless it is desirable for them to exchange information with another task; i.e., unless it is desirable for them to synchronize. Extensive experience with parallel computations shows that frequent synchronizations at irregular intervals are not only inefficient but also make it difficult to design robust predictable parallel algorithms. Barriers are a popular programming abstraction that is used to manage the complexity of synchronization in large parallel systems. FIG. 19 illustrates a barrier synchronization model. As shown in FIG. 19, computations proceed independently until one of them reaches a barrier. At that point, everyone waits for everyone else, a global exchange of communication occurs, and then computation proceeds to the next phase. The literature on parallel algorithms includes a rich collection of techniques for designing algorithms that take maximum benefit from such a programming model.

The analogy to ions and fibers should be evident: fibers correspond to the phases in which parallel computations execute independently, and ions correspond to the barrier phase in which the computations exchange information. The smart fibers manufactured according to the VLSI-Fi approach described herein may enable development of a family of quantum simulations that is well-suited for execution under such a regime.

Based upon the foregoing disclosure, it should now be apparent that the systems and methods for controlling the 3D architecture of fibers described above will carry out the objects set forth hereinabove. Namely, these systems and methods are capable of providing a versatile hybrid-fabrication methodology that assembles in-fiber material architectures typical to integrated microelectronic devices and systems in silica, silicon, and high-temperature metals. It is, therefore, to be understood that any variations evident fall within the scope of the present disclosure and thus, the selection of specific component elements can be determined without departing from the spirit of the invention herein disclosed and described.

Additional embodiments are also contemplated:

Clause 1. A microstructured fiber comprising: a cladding material surrounding at least one core material, wherein the at least one core material comprises an array of discrete devices contacted in parallel.

Clause 2. The microstructured fiber of clause 1, wherein each of the at least one core materials has a higher melting temperature than the cladding material.

Clause 3. The microstructured fiber of clause 1, wherein the cladding material comprises a polycarbonate.

Clause 4. The microstructured fiber of clause 2, wherein the cladding material comprises glass.

Clause 5. The microstructured fiber of clause 4, wherein the glass comprises soda-lime glass or borosilicate glass.

Clause 6. The microstructured fiber of clause 1, wherein each of the at least one core materials comprises a metal.

Clause 7. The microstructured fiber of clause 1, wherein the microstructured fiber is configured to function as a metal-oxide-semiconductor field-effect transistor.

Clause 8. The microstructured fiber of clause 1, wherein the array of discrete devices contacted in parallel comprises a plurality of microspheres of the at least one core material.

Clause 9. The microstructured fiber of clause 8, wherein the plurality of microspheres comprise a plurality of Janus particles.

Clause 10. The microstructured fiber of clause 8, wherein the microstructured fiber is configured to function as a bipolar junction transistor.

Clause 11. A method of producing a microstructured fiber, the method comprising: 3D-printing a fiber preform; thermally drawing the fiber preform into a fiber that preserves the cross-sectional geometry of the fiber preform; and axially patterning the fiber into a microstructured fiber comprising an array of discrete devices contacted in parallel.

Clause 12. The method of clause 11, further comprising sintering the fiber preform before thermally drawing the fiber preform into a fiber that preserves the cross-sectional geometry of the fiber preform.

Clause 13. The method of clause 12, wherein at least one dimension of the fiber preform has a first value before sintering and a second, lesser value after the sintering, the method further comprising, prior to 3D-printing the fiber preform, selecting the first value of the at least one dimension of the fiber.

Clause 14. The method of clause 11, wherein the fiber preform comprises plurality of materials, the plurality of materials comprising at least one core material and at least one cladding material.

Clause 15. The method of clause 11, wherein the microstructured fiber is configured to function as an array of metal-oxide-semiconductor field-effect transistors contacted in parallel.

Clause 16. The method of clause 11, wherein the microstructured fiber is configured to function as an array of bipolar junction transistors contacted in parallel.

Clause 17. The method of clause 11, wherein the axial patterning of the plurality of fibers is at least partially achieved by spatially-coherent, material-selective capillary break-up of the at least one core material.

Clause 18. The method of clause 17, wherein the array of discrete devices contacted in parallel comprises a plurality of microspheres of the at least one core material, wherein the plurality of microspheres are formed by the capillary break-up of the at least one core material.

Clause 19. The method of clause 18, further comprising doping the plurality of microspheres under segregation-driven control such that the plurality of microspheres comprise a plurality of Janus particles.

Clause 20. The method of clause 11, wherein at least one material of the fiber preform comprises a polycarbonate.

Clause 21. The method of clause 11, wherein at least one material of the fiber preform comprises glass.

Clause 22. The method of clause 21, wherein the glass comprises soda-lime glass or borosilicate glass.

Clause 23. The method of clause 22, wherein at least one material of the fiber preform comprises a metal.

Clause 24. A sensory textile comprising at least one of:
an electrooptic portion configured to function as an imaging array, comprising:
at least one first microstructured fiber comprising a cladding material surrounding at least one core material, the at least one core material comprising a p-doped Si core comprising a first plurality of microspheres and an n-doped Si core comprising a second plurality of microspheres, wherein the at least one first microstructured fiber of the electrooptic portion further comprises two metallic electrodes collectively surrounding the p-doped silicon core and the n-doped silicon core;
a sonar portion configured for ultrasound generation and transduction, comprising:
a plurality of second microstructured fibers comprising a cladding material surrounding a core material, the at least one core material comprising a piezoelectric material, wherein each of the plurality of microstructured fibers of the sonar portion further comprises two metallic electrodes collectively surrounding the piezoelectric material, wherein each of the plurality of microstructured fibers of the sonar portion comprises a series of substantially circular loops and wherein the plurality of microstructured fibers of the sonar portion are woven together;

a magnetic gradiometer portion comprising:

at least one third microstructured fiber comprising a cladding material surrounding a core material and defining a central hollow capillary, the core material comprising a nanodiamond-doped silica central core, wherein the at least one third microstructured fiber of the magnetic gradiometer portion further comprises:

two metallic electrodes collectively surrounding the central core; and two optical cores collectively surrounding the central core; and a piezogenerating portion configured to generate a voltage, comprising:

at least fourth one microstructured fiber comprising a cladding material surrounding a core material, and defining a central hollow capillary, the core material comprising a piezoelectric core positioned off-center with respect to a longitudinal axis defined by the at least one microstructured fiber, wherein the at least one microstructured fiber of the piezogenerating portion further comprises:

two pairs of metallic cores collectively surrounding the piezoelectric core and comprising an inner pair and an outer pair, wherein a melting temperature of the metal of the inner pair is lower than the melting temperatures of both the piezoelectric core and the metal of the outer pair, wherein the metal of the inner pair is axially broken up into a second plurality of spheres and wherein the metal of each metallic core of the outer pair is continuous.

Clause 25. The sensory textile of clause 24, wherein the first plurality of microspheres of the at least one first microstructured fiber comprise a plurality of diodes contacted in parallel and configured to enable axially distributed pixelated sensing by time domain reflectometry.

Clause 26. The sensory textile of clause 24, wherein the two metallic electrodes of the electrooptic portion comprise at least one of platinum, vanadium, and titanium.

Clause 27. The sensory textile of clause 24, wherein the microspheres comprising the piezoelectric core of the electrooptic portion are patterned into an array of spheres in contact with the metallic electrodes.

Clause 28. The sensory textile of clause 24, wherein the microspheres comprising the piezoelectric core of the electrooptic portion are patterned into an array of spheres in contact with the metallic electrodes.

Clause 29. The sensory textile of clause 24, wherein each of the two metallic electrodes of the electrooptic portion is continuous.

Clause 30. The sensory textile of clause 24, wherein the central hollow capillary of the magnetic gradiometer portion comprises a nitrogen-vacancy nanodiamond doped hollow capillary that is broken up into a plurality of discrete resonators.

Clause 31. The sensory textile of clause 24, wherein the microspheres of the piezogenerating portion are contacted in parallel by continuous metallic cores forming circular loops are arranged substantially as a plurality of standard radial mode piezoelectric rings.

Clause 32. The sensory textile of clause 24, wherein the at least one microstructured fiber of the piezoelectric portion is configured to become axially strained and generate the voltage when a fiber of the at least one of the microstructured fiber of the piezoelectric portion is bent away from the piezoelectric core.

Clause 33. An in-fiber integrated quantum device circuit, comprising:

a microstructured fiber comprising a plurality of cores extending longitudinally through the microstructured fiber, the plurality of cores comprising:

a first core comprising metal silicide nanowires;

a second core comprising rare-earth-ion doped $LiNbO_3$; and a third core comprising Si and indium-tin-oxide nanowires, wherein the microstructured fiber is configured to function as a qubit source, a nano-cavity gate, and a quantum memory.

Clause 34. An in-fiber ion trap, comprising:

a microstructured fiber comprising a plurality of cores extending longitudinally through the microstructured fiber, the plurality of cores comprising:

an optical core formed in two longitudinal segments with a vacuum micro-chamber defined therebetween, wherein the ends of the two longitudinal segments that face one another and define the vacuum micro-chamber each comprise a spherical micro-lens; and a plurality of metallic electrodes surrounding the optical core, wherein the vacuum micro-chamber encloses an array of trapped ions configured to be probed by a laser emission when the laser emission is guided along the optical core and coupled into and out of free space within the vacuum micro-chamber using the spherical micro-lenses.

Clause 35. The in-fiber ion trap of clause 34, wherein the trapped ions are 171Yb+ ions.

What is claimed is:

1. A method comprising:

a) providing a preform having a cross-sectional geometry, the preform comprising a core extending along a first axis and a cladding extending along the first axis, and wherein the cladding surrounds the core;

b) thermally drawing the preform to form a fiber, wherein the cross-sectional geometry of the preform remains in the fiber; and (c) inducing capillary breakup in a first portion of the fiber and not in a second portion of the fiber adjacent the first portion of the fiber so that a segmented device having a transduction functionality forms in the first portion of the fiber and does not form in the second portion of the fiber.

2. The method of claim 1, wherein the step of inducing is performed by applying heat to the first portion of the fiber.

3. The method of claim 2, wherein the step of applying heat to a first portion of the fiber liquefies the core and the surrounding cladding of the first portion so that the liquefied core and surrounding cladding undergo capillary breakup to generate the segmented device.

4. The method of claim 2, wherein heating the first portion of the fiber liquefies the core in the first portion of the fiber and the heating softens the cladding surrounding the core in the first portion of the fiber.

5. The method of claim 4, wherein the core comprises Si and the cladding comprises $SiO_2$.

6. The method of claim 3, wherein the core of the fiber in step (b) comprises a silicon-germanium alloy which melt to form a Si/Ge to form a Janus particle during step (c).

7. The method of claim 6, wherein a Si portion of a first Janus particle is located between a Ge portion of the first Janus particle and a Ge portion of a second Janus particle.

8. The method of claim 7, wherein the fiber further includes at least two metallic cores extending along the first axis, and each metallic core comprises an electrode material selected from the group consisting of platinum, vanadium, and titanium.

9. The method of claim 2, wherein the core comprises semiconducting Si and the cladding comprises fused silica.

10. The method of claim 2, wherein the core comprises a piezoelectric core of PMN-PT or $BaTiO_3$ and the fiber further comprises two metallic cores.

11. The method of claim 2, wherein the cladding comprises pyrex, the core comprises a piezoelectric material and is positioned off-center, and the fiber further comprises two metallic cores.

12. The method of claim 2, wherein the cladding comprises a first material and the core comprises a second material are liquid and store energy at an interface.

13. The method of claim 1, wherein the segmented device is spherical or roughly spherical.

14. The method of claim 1, wherein cladding surrounding the first portion of fiber surrounds the segmented device as it forms by capillary breakup and separates the segmented device from the core of the preform.

15. The method of claim 1, further comprising applying heat to the second portion of the fiber to generate a second segmented device located spaced apart along the first axis from the first segmented device.

16. A fiber comprising:
a cladding having an outer surface wherein the cladding extends along a first axis;
a segmented core coextensive with the cladding along the first axis and surrounded by the cladding;
wherein the segmented core comprises a transducing device;
a first spacer and a second spacer, wherein the device is located between the first and second spacer.

17. The fiber of claim 16, further comprising two metallic cores extending along the first axis and positioned to each contact the transducing device.

18. A sensory textile comprising at least one of:
an electrooptic portion configured to function as an imaging array, comprising:
at least one first fiber comprising a cladding material surrounding at least one first core material, the at least one first core material comprising a p-doped Si core comprising a first plurality of microspheres and an n-doped Si core comprising a second plurality of microspheres, wherein the at least one first fiber of the electrooptic portion further comprises two metallic electrodes collectively surrounding the p-doped silicon core and the n-doped silicon core;
a sonar portion configured for ultrasound generation and transduction, comprising:
a plurality of second fibers comprising a cladding material surrounding a second core material, the at least one second core material comprising a piezoelectric material, wherein each of the plurality of fibers of the sonar portion further comprises two metallic electrodes collectively surrounding the piezoelectric material,
wherein each of the plurality of the second fibers of the sonar portion comprises a series of substantially circular loops and wherein the plurality of second fibers of the sonar portion are woven together;
a magnetic gradiometer portion comprising:
at least one third fiber comprising a cladding material surrounding a third core material and defining a central hollow capillary, the third core material comprising a nanodiamond-doped silica central core, wherein the at least one third fiber of the magnetic gradiometer portion further comprises:
two metallic electrodes collectively surrounding the central core; and
two optical cores collectively surrounding the central core; and
a piezogenerating portion configured to generate a voltage, comprising:
at least one fourth fiber comprising a cladding material surrounding a fourth core material, and defining a central hollow capillary, the fourth core material comprising a piezoelectric core positioned off-center with respect to a longitudinal axis defined by the at least one fourth fiber, wherein the at least one fourth fiber of the piezogenerating portion further comprises:
two pairs of metallic cores collectively surrounding the piezoelectric core and comprising an inner pair and an outer pair, wherein a melting temperature of the metal of the inner pair is lower than the melting temperatures of both the piezoelectric core and the metal of the outer pair, wherein the metal of the inner pair is axially broken up into a second plurality of spheres and wherein the metal of each metallic core of the outer pair is continuous.

19. The sensory textile of claim 18, wherein the first plurality of microspheres of the at least one first fiber comprise a plurality of diodes contacted in parallel and configured to enable axially distributed pixelated sensing by time domain reflectometry.

20. The sensory textile of claim 18, wherein the two metallic electrodes of the electrooptic portion comprise at least one of platinum, vanadium, and titanium.

* * * * *